United States Patent
Hayashi et al.

(10) Patent No.: US 9,522,323 B2
(45) Date of Patent: Dec. 20, 2016

(54) STORAGE MEDIUM HAVING STORED THEREON INFORMATION PROCESSING PROGRAM, INFORMATION PROCESSING APPARATUS, INFORMATION PROCESSING SYSTEM, AND INFORMATION PROCESSING METHOD

(75) Inventors: Yugo Hayashi, Kyoto (JP); Kazuya Sumaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 64 days.

(21) Appl. No.: 13/362,289

(22) Filed: Jan. 31, 2012

(65) Prior Publication Data

US 2012/0229513 A1    Sep. 13, 2012

(30) Foreign Application Priority Data

Mar. 8, 2011 (JP) ................................ 2011-050039
Apr. 5, 2011 (JP) ................................ 2011-083453
(Continued)

(51) Int. Cl.
*G09G 5/00* (2006.01)
*A63F 13/211* (2014.01)
(Continued)

(52) U.S. Cl.
CPC .............. *A63F 13/211* (2014.09); *A63F 13/06* (2013.01); *A63F 13/214* (2014.09); *A63F 13/26* (2014.09);
(Continued)

(58) Field of Classification Search
CPC ........ A63F 13/06; A63F 13/428; A63F 13/26; A63F 13/211; A63F 13/5255; A63F 13/214; A63F 2300/105; A63F 2300/301; A63F 2300/403; A63F 2300/6045; A63F 2300/6676; A63F 2300/6684; G06F 3/011; G06F 3/04815; G06F 3/04842; G06F 3/0346; G06F 3/0484; G06F 3/14; G06T 3/60; G06T 3/20; G06T 11/60

See application file for complete search history.

(56) References Cited

U.S. PATENT DOCUMENTS 5,838,909 A    11/1998    Roy et al.
5,853,324 A    12/1998    Kami et al.
(Continued)

FOREIGN PATENT DOCUMENTS

EP    1 726 342 A2    11/2006
EP    2 218 485        8/2010
(Continued)

OTHER PUBLICATIONS

Nov. 21, 2012 Office Action from U.S. Appl. No. 13/271,510, 22 pages.
(Continued)

*Primary Examiner* — Devona Faulk
*Assistant Examiner* — Xilin Guo
(74) *Attorney, Agent, or Firm* — Nixon & Vanderhye, P.C.

(57) ABSTRACT

On the basis of data output from a portable display apparatus, it is determined whether or not a direction of a predetermined axis set in the portable display apparatus is included in a predetermined range. When it has been determined that the direction of the predetermined axis is included in the predetermined range, an action of an object placed in a virtual world is controlled in accordance with the direction of the predetermined axis. Further, when the direction of the predetermined axis is included in the predetermined range or present outside the predetermined range, an action of a first virtual camera for generating an image of the virtual world is controlled in accordance with the direction (Continued)

of the predetermined axis. Then, a first image representing the virtual world viewed from the first virtual camera is displayed on the portable display apparatus.

28 Claims, 20 Drawing Sheets

(30) Foreign Application Priority Data

| Apr. 5, 2011 | (JP) | 2011-083454 |
|---|---|---|
| Apr. 5, 2011 | (JP) | 2011-083455 |
| Apr. 5, 2011 | (JP) | 2011-083456 |
| May 24, 2011 | (JP) | 2011-115402 |
| May 24, 2011 | (JP) | 2011-115403 |
| May 24, 2011 | (JP) | 2011-115404 |
| May 27, 2011 | (JP) | 2011-118901 |
| May 27, 2011 | (JP) | 2011-118902 |
| Jun. 1, 2011 | (JP) | 2011-123644 |
| Jun. 1, 2011 | (JP) | 2011-123645 |
| Jun. 1, 2011 | (JP) | 2011-123646 |
| Oct. 13, 2011 | (JP) | 2011-225538 |

(51) Int. Cl.

| G06T 3/20 | (2006.01) |
|---|---|
| G06T 3/60 | (2006.01) |
| G06T 11/60 | (2006.01) |
| A63F 13/214 | (2014.01) |
| A63F 13/428 | (2014.01) |
| A63F 13/26 | (2014.01) |
| A63F 13/5255 | (2014.01) |
| G06F 3/01 | (2006.01) |
| A63F 13/20 | (2014.01) |
| G06F 3/0481 | (2013.01) |

(52) U.S. Cl.
CPC ......... *A63F 13/428* (2014.09); *A63F 13/5255* (2014.09); *G06F 3/011* (2013.01); *G06T 3/20* (2013.01); *G06T 3/60* (2013.01); *G06T 11/60* (2013.01); *A63F 2300/105* (2013.01); *A63F 2300/1068* (2013.01); *A63F 2300/301* (2013.01); *A63F 2300/403* (2013.01); *A63F 2300/6045* (2013.01); *A63F 2300/6676* (2013.01); *A63F 2300/6684* (2013.01); *A63F 2300/8005* (2013.01); *G06F 3/04815* (2013.01)

(56) References Cited

U.S. PATENT DOCUMENTS

| 6,201,554 | B1 | 3/2001 | Lands | |
|---|---|---|---|---|
| 6,225,977 | B1 | 5/2001 | Li | |
| 6,290,600 | B1 | 9/2001 | Glasson | |
| 6,416,410 | B1* | 7/2002 | Abou-Samra et al. | 463/31 |
| 6,450,886 | B1 | 9/2002 | Oishi et al. | |
| 6,483,540 | B1 | 11/2002 | Akasawa et al. | |
| 6,500,070 | B1 | 12/2002 | Tomizawa et al. | |
| 6,540,614 | B1 | 4/2003 | Nishino et al. | |
| 6,712,703 | B2* | 3/2004 | Miyamoto et al. | 463/43 |
| 6,762,746 | B2 | 7/2004 | Fukuda | |
| 6,908,388 | B2 | 6/2005 | Shimizu et al. | |
| 6,966,837 | B1 | 11/2005 | Best | |
| 7,326,117 | B1 | 2/2008 | Best | |
| 7,588,498 | B2 | 9/2009 | Iizuka et al. | |
| 2002/0006827 | A1 | 1/2002 | Ogata et al. | |
| 2002/0022518 | A1 | 2/2002 | Okuda et al. | |
| 2002/0140666 | A1 | 10/2002 | Bradski | |
| 2002/0155889 | A1 | 10/2002 | Miyamoto et al. | |
| 2002/0165028 | A1 | 11/2002 | Miyamoto et al. | |
| 2003/0134665 | A1 | 7/2003 | Kato et al. | |
| 2003/0216176 | A1 | 11/2003 | Shimizu et al. | |
| 2003/0220142 | A1 | 11/2003 | Siegel | |
| 2004/0046736 | A1 | 3/2004 | Pryor et al. | |
| 2004/0092309 | A1 | 5/2004 | Suzuki | |
| 2004/0219980 | A1 | 11/2004 | Bassett et al. | |
| 2004/0229687 | A1 | 11/2004 | Miyamoto et al. | |
| 2005/0014543 | A1* | 1/2005 | Itoi et al. | 463/8 |
| 2005/0119053 | A1 | 6/2005 | Suzuki et al. | |
| 2005/0130738 | A1 | 6/2005 | Miyamoto et al. | |
| 2005/0187015 | A1 | 8/2005 | Suzuki et al. | |
| 2005/0255900 | A1 | 11/2005 | Takahashi et al. | |
| 2006/0017692 | A1 | 1/2006 | Wehrenberg et al. | |
| 2006/0040740 | A1 | 2/2006 | DiDato | |
| 2006/0046848 | A1 | 3/2006 | Abe et al. | |
| 2006/0262120 | A1 | 11/2006 | Rosenberg | |
| 2006/0262210 | A1 | 11/2006 | Smith et al. | |
| 2006/0266200 | A1 | 11/2006 | Goodwin | |
| 2007/0007143 | A1 | 1/2007 | Hayashi et al. | |
| 2007/0008298 | A1* | 1/2007 | Ohta | 345/173 |
| 2007/0015577 | A1 | 1/2007 | Hsu | |
| 2007/0018968 | A1 | 1/2007 | Iwamoto et al. | |
| 2007/0072662 | A1 | 3/2007 | Templeman | |
| 2007/0073196 | A1 | 3/2007 | Tanaka et al. | |
| 2007/0208528 | A1 | 9/2007 | Seo et al. | |
| 2007/0265085 | A1 | 11/2007 | Miyamoto et al. | |
| 2008/0009332 | A1 | 1/2008 | Kake | |
| 2008/0042973 | A1 | 2/2008 | Zhao et al. | |
| 2008/0062198 | A1 | 3/2008 | Takahashi et al. | |
| 2008/0070686 | A1 | 3/2008 | Satsukawa et al. | |
| 2008/0096654 | A1 | 4/2008 | Mondesir et al. | |
| 2008/0096657 | A1 | 4/2008 | Benoist | |
| 2008/0102951 | A1* | 5/2008 | Eto et al. | 463/32 |
| 2008/0216974 | A1 | 9/2008 | Pitcher et al. | |
| 2008/0254821 | A1 | 10/2008 | Kusuda et al. | |
| 2008/0261696 | A1 | 10/2008 | Yamazaki et al. | |
| 2008/0268956 | A1 | 10/2008 | Suzuki | |
| 2008/0274813 | A1 | 11/2008 | Sato | |
| 2008/0318681 | A1 | 12/2008 | Rofougaran et al. | |
| 2009/0002391 | A1 | 1/2009 | Williamson et al. | |
| 2009/0069096 | A1* | 3/2009 | Nishimoto | 463/43 |
| 2009/0070093 | A1 | 3/2009 | Nakanishi et al. | |
| 2009/0093305 | A1 | 4/2009 | Okamoto et al. | |
| 2009/0156308 | A1 | 6/2009 | Hsu | |
| 2009/0187371 | A1 | 7/2009 | Ohta | |
| 2009/0244064 | A1 | 10/2009 | Inokuchi et al. | |
| 2009/0298585 | A1 | 12/2009 | Cannon et al. | |
| 2009/0303204 | A1 | 12/2009 | Nasiri et al. | |
| 2010/0045666 | A1 | 2/2010 | Kornmann et al. | |
| 2010/0045667 | A1 | 2/2010 | Kornmann et al. | |
| 2010/0048357 | A1 | 2/2010 | Nakagawa et al. | |
| 2010/0053322 | A1 | 3/2010 | Marti et al. | |
| 2010/0058254 | A1 | 3/2010 | Narita | |
| 2010/0081505 | A1 | 4/2010 | Alten et al. | |
| 2010/0087248 | A1 | 4/2010 | Takahashi | |
| 2010/0137063 | A1 | 6/2010 | Shirakawa et al. | |
| 2010/0169110 | A1 | 7/2010 | Sawano et al. | |
| 2010/0178988 | A1 | 7/2010 | Izuno et al. | |
| 2010/0188937 | A1 | 7/2010 | Watanabe | |
| 2010/0214216 | A1 | 8/2010 | Nasiri et al. | |
| 2010/0245236 | A1 | 9/2010 | Takayama | |
| 2010/0245685 | A1 | 9/2010 | Onodera et al. | |
| 2010/0279770 | A1 | 11/2010 | Ikeda | |
| 2010/0283723 | A1 | 11/2010 | Konishi | |
| 2010/0285882 | A1 | 11/2010 | Hsu | |
| 2010/0292006 | A1 | 11/2010 | Terrell et al. | |
| 2010/0302238 | A1 | 12/2010 | Yonemori et al. | |
| 2010/0304857 | A1 | 12/2010 | Suzuki et al. | |
| 2011/0039618 | A1* | 2/2011 | Ichiyanagi et al. | 463/31 |
| 2011/0054359 | A1 | 3/2011 | Sazonov et al. | |
| 2011/0070953 | A1 | 3/2011 | Konishi | |
| 2011/0077088 | A1 | 3/2011 | Hayashi et al. | |
| 2011/0092289 | A1 | 4/2011 | Dagman et al. | |
| 2011/0159960 | A1 | 6/2011 | Ueshima et al. | |
| 2011/0169928 | A1 | 7/2011 | Gassel et al. | |
| 2011/0172013 | A1 | 7/2011 | Shirasaka et al. | |
| 2011/0244956 | A1 | 10/2011 | Sakakibara et al. | |
| 2011/0244957 | A1 | 10/2011 | Nishimura et al. | |
| 2011/0250964 | A1 | 10/2011 | Kulas | |
| 2011/0250965 | A1 | 10/2011 | Kulas et al. | |
| 2011/0281650 | A1 | 11/2011 | Yamazaki et al. | |

(56) References Cited

U.S. PATENT DOCUMENTS

| | | | |
|---|---|---|---|
| 2011/0300930 | A1 | 12/2011 | Hsu |
| 2011/0306425 | A1 | 12/2011 | Rivard et al. |
| 2012/0014558 | A1 | 1/2012 | Stafford et al. |
| 2012/0017236 | A1 | 1/2012 | Stafford et al. |
| 2012/0079080 | A1 | 3/2012 | Pishevar |
| 2012/0086630 | A1 | 4/2012 | Zhu et al. |
| 2012/0086631 | A1 | 4/2012 | Osman et al. |
| 2012/0115596 | A1 | 5/2012 | Otani |
| 2012/0115609 | A1 | 5/2012 | Sugiyama et al. |
| 2013/0017876 | A1 | 1/2013 | Koumbourlis |
| 2013/0038532 | A1 | 2/2013 | Okura et al. |

FOREIGN PATENT DOCUMENTS

| | | |
|---|---|---|
| EP | 2 497 545 A2 | 9/2012 |
| EP | 2 497 545 A3 | 10/2012 |
| EP | 2015854 | 11/2013 |
| GB | 2 442 259 | 4/2008 |
| GB | 2 442 259 A | 4/2008 |
| JP | H07-36612 A | 2/1995 |
| JP | H9-091110 | 4/1997 |
| JP | H09-294260 | 11/1997 |
| JP | H11-90043 A | 4/1999 |
| JP | 2000-316143 | 11/2000 |
| JP | 2000-325653 | 11/2000 |
| JP | 2001-34247 A | 2/2001 |
| JP | 2002-298160 | 10/2002 |
| JP | 2002-325963 | 11/2002 |
| JP | 2003-61940 | 3/2003 |
| JP | 2003-512142 | 4/2003 |
| JP | 2003-325974 A | 11/2003 |
| JP | 2003-334379 | 11/2003 |
| JP | 2004-030408 | 1/2004 |
| JP | 2004-159781 | 6/2004 |
| JP | 2004-329744 | 11/2004 |
| JP | 2005-103154 | 4/2005 |
| JP | 2005-137921 | 6/2005 |
| JP | 2005-230263 | 9/2005 |
| JP | 2006-31307 | 2/2006 |
| JP | 2006-39635 | 2/2006 |
| JP | 2007-301048 | 11/2007 |
| JP | 2008-15679 | 1/2008 |
| JP | 2008-264195 | 11/2008 |
| JP | 2008-264402 | 11/2008 |
| JP | 2009-172010 | 8/2009 |
| JP | 2009-237680 | 10/2009 |
| JP | 2009-536058 | 10/2009 |
| JP | 2010-055511 | 3/2010 |
| JP | 2010-233705 | 10/2010 |
| JP | 2010-259611 | 11/2010 |
| JP | 2010-273839 | 12/2010 |
| JP | 2011-015752 | 1/2011 |
| JP | 2011-019810 | 2/2011 |
| JP | 2011-019817 | 2/2011 |
| JP | 2011-53838 | 3/2011 |
| JP | 2011-056049 | 3/2011 |
| WO | WO 00/67864 | 11/2000 |
| WO | WO 01/30470 A1 | 5/2001 |
| WO | WO 2004/103244 | 2/2004 |
| WO | 2010/060211 | 6/2010 |
| WO | 2011/004629 | 1/2011 |

OTHER PUBLICATIONS

Sep. 4, 2012 European Search Report for EP 11184519.4, 6 pages.
Sep. 4, 2012 European Search Report for EP 11185811.4, 7 pages.
Sep. 4, 2012 European Search Report for EP 11186930.1, 7 pages.
Oct. 2, 2012 European Search Report for EP 11186933.5, 7 pages.
Sep. 4, 2012 European Search Report for EP 11187473.1, 7 pages.
Sep. 7, 2012 European Search Report for EP 12156629.3, 7 pages.
U.S. Appl. No. 13/271,510, filed Oct. 12, 2011, Information Processing System, Computer-Readable Storage Medium, and Information Processing Method.
U.S. Appl. No. 13/277,561, filed Oct. 20, 2011, Computer-Readable Storage Medium, Information Processing System, and Information Processing Method.
U.S. Appl. No. 13/283,032, filed Oct. 27, 2011, Computer-Readable Storage Medium, Information Processing System, and Information Processing Method.
U.S. Appl. No. 13/283,072, filed Oct. 27, 2011, Computer-Readable Storage Medium, Information Processing System, and Information Processing Method.
U.S. Appl. No. 13/287,320, filed Nov. 2, 2011, Computer-Readable Storage Medium, Information Processing System, and Information Processing Method.
U.S. Appl. No. 13/352,091, filed Jan. 17, 2012, Storage Medium Having Stored Thereon Information Processing Program, Information Processing Apparatus, Information Processing System, and Information Processing Method.
U.S. Appl. No. 13/333,045, filed Dec. 21, 2011, Storage Medium Having Information Processing Program Stored Thereon, Information Processing Apparatus, Information Processing System, and Information Processing Method.
U.S. Appl. No. 13/343,913, filed Jan. 5, 2012, Storage Medium Having Stored Thereon Information Processing Program, Information Processing Apparatus, Information Processing System, and Information Processing Method.
U.S. Appl. No. 13/362,255, filed Jan. 31, 2012, Storage Medium Having Stored Thereon Game Program, Game Apparatus, Game System, and Game Processing Method.
U.S. Appl. No. 13/362,289, filed Jan. 31, 2012, Storage Medium Having Stored Thereon Information Processing Program, Information Processing Apparatus, Information Processing System, and Information Processing Method.
U.S. Appl. No. 13/362,381, filed Jan. 31, 2012, Storage Medium Having Stored Thereon Game Program, Game Apparatus, Game System, and Game Processing Method.
U.S. Appl. No. 13/400,944, filed Feb. 21, 2012, Storage Medium Having Stored Thereon Information Processing Program, Information Processing Apparatus, Information Processing System, and Information Processing Method.
U.S. Appl. No. 13/402,026, filed Feb. 22, 2012, Storage Medium Having Stored Thereon Information Processing Program, Information Processing Apparatus, Information Processing System, and Information Processing Method.
U.S. Appl. No. 13/401,054, filed Feb. 21, 2012, Storage Medium Having Stored Thereon Information Processing Program, Information Processing Apparatus, Information Processing System, and Information Processing Method.
Jul. 18, 2013 Office Action in U.S. Appl. No. 13/362,255, 20 pages.
U.S. Appl. No. 13/400,944, filed Feb. 21, 2012, Storage Medium Having Stored Thereon Information Processing Program, Information Processing Apparatus, Information Processings System, and Information Processing Method.
Apr. 10, 2013 Office Action from U.S. Appl. No. 13/277,561, 43 pages.
Final Office Action (36 pages) dated Jul. 2, 2014 issued in co-pending U.S. Appl. No. 13/283,032.
European Search Report for European Application 12156630.1 dated Oct. 1, 2013.
Office Action in U.S. Appl. No. 13/283,032 dated Dec. 5, 2013.
Office Action of U.S. Appl. No. 13/333,045 dated Feb. 20, 2014.
Office Action in U.S. Appl. No. 13/362,255 dated Apr. 10, 2014.
U.S. Office Action dated Jun. 27, 2014 issued in co-pending U.S. Appl. No. 13/283,072.
European Search Report in corresponding European Application No. 14166174.4 dated Jan. 14, 2016.
Office Action dated Jan. 20, 2016, issued in corresponding U.S. Appl. No. 13/287,320, filed Nov. 2, 2011.
"Virtual Camera System." Wikipedia. Wikimedia Foundation, Feb. 25, 2011. Web. Jan. 7, 2016. <https://en.wikipedia.org/w/index.php?title=Virtual_camera_system&oldid=415917860>.
Notice of Allowance in corresponding U.S. Appl. No. 13/352,091 dated Feb. 18, 2016.
European Search Report EP Application No. 12 15 0272.8 dated Oct. 28, 2014.

(56) References Cited

OTHER PUBLICATIONS

European Search Report EP Application No. 12 15 3067.9 dated Oct. 29, 2014.
Office Action issued Japanese Patent Appln. No. 2011-083454 dated Jan. 22, 2015 (with translation).
Office Action issued Japanese Patent Appln. Nos. 2011-123645 and 2011-123646 dated Feb. 20, 2015.
The Legend of Zelda: Ocarina of Time, Nintendo DREAM, Kabushiki Kaisha Anbitto, Mar. 1, 2011, vol. 203 p. 11.
European Search Report for EP11194630.7 dated Feb. 16, 2015.
Office Action dated Dec. 10, 2014 in corresponding U.S. Appl. No. 13/283,032.
Aug. 29, 2013 Office Action in U.S. Appl. No. 13/400,944, 58 pages.
Aug. 29, 2013 Office Action in U.S. Appl. No. 13/402,026, 87 pages.
Aug. 30, 2013 Office Action in U.S. Appl. No. 13/401,054, 71 pages.
Office Action issued in related U.S. Appl. No. 13/277,561 dated Jul. 13, 2016.
Office Action dated Jun. 30, 2015 in corresponding U.S. Appl. No. 13/287,320.
Wei et al., "Novel Interface for First Person Shooting Games on PDAs," 2008, pp. 113-121.
Office Action in corresponding U.S. Appl. No. 13/343,913 dated Jul. 29, 2015.
Decision of Refusal in corresponding Japanese Appln. No. 2011-123645 dated Aug. 6, 2015.
"Minna no Ennichi," Shukan Famitsu, vol. 27, No. 10, Enterbrain Inc., Feb. 23, 2012, pp. 32-33.
"Close-up!," Mobile Software Palm OS, Mobile Press, vol. 5, No. 1, Japan-Gijutsu-Hyohron Co., Ltd., Feb. 24, 2005, p. 213.
"iPhone 3G Perfect Guide," Mac People, vol. 14, No. 9, Japan, ASCII Media Works, Inc., Sep. 1, 2008, pp. 122-127.
"The Legend of Zelda: Ocarina of Time 3D," Famitsu DS+Wii, Enterbrain Inc., Apr. 21, 2011, vol. 13, No. 6.
Samurai Slash, [online], Aug. 27, 2015, the date of publication: Jun. 18, 2009 URL:http://raku-job.jp/blog/2009/06/iponeipod-touch.html.
Office Action dated Aug. 28, 2015 issued in corresponding JP Patent Application No. 2011-123644.
Office Action dated Sep. 1, 2015 issued in corresponding JP Patent Application No. 2011-118901 and English Translation.
Office Action dated Sep. 1, 2015 issued in corresponding JP Patent Application No. 2011-115402 and English Translation.
Office Action dated Sep. 1, 2015 issued in corresponding JP Patent Application No. 2011-115404 and English Translation.
Japanese Notice of Reasons for Refusal dated Mar. 16, 2015 in corresponding JP Application No. 2011-118902.
Office Action in corresponding Japanese Patent Application No. 2011-225538 mailed May 21, 2015.
Office Action in corresponding U.S. Appl. No. 13/352,091 dated May 1, 2015.
Office Action in co-pending U.S. Appl. No. 13/271,510 dated Sep. 18, 2014.
Office Action in co-pending U.S. Appl. No. 13/287,320 dated Oct. 3, 2014.
Office Action in co-pending U.S. Appl. No. 13/283,072 dated Oct. 10, 2014.
Cameltry: an iPhone ball rolling labyrinth demanding Cameltray and rotations. You had better not compare it with other similar games, uploaded on Mar. 9, 2009 (with translation).
Notice of Reasons for Refusal for corresponding Japanese Patent Appln. No. JP2011-118901 dated May 18, 2016.
Office Action in related U.S. Appl. No. 13/283,032 dated Dec. 30, 2015.
Notice of Allowance in related U.S. Appl. No. 13/343,913 dated Jan. 11, 2016.
Office Action dated Aug. 20, 2014 issued in U.S. Appl. No. 13/343,913.
Office Action in corresponding U.S. Appl. No. 13/287,320 dated Feb. 27, 2015.
Office Action in corresponding U.S. Appl. No. 13/343,913 dated Mar. 4, 2015.

* cited by examiner

STORAGE MEDIUM HAVING STORED THEREON INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosures of Japanese Patent Application No. 2011-050039, filed on Mar. 8, 2011, Japanese Patent Application No. 2011-083453, Japanese Patent Application No. 2011-083454, Japanese Patent Application No. 2011-083455, and Japanese Patent Application No. 2011-083456, filed on Apr. 5, 2011, Japanese Patent Application No. 2011-115402, Japanese Patent Application No. 2011-115403, and Japanese Patent Application No. 2011-115404, filed on May 24, 2011, Japanese Patent Application No. 2011-118901 and Japanese Patent Application No. 2011-118902, filed on May 27, 2011, Japanese Patent Application No. 2011-123644, Japanese Patent Application No. 2011-123645, and Japanese Patent Application No. 2011-123646, filed on Jun. 1, 2011, and Japanese Patent Application No. 2011-225538, filed on Oct. 13, 2011, are incorporated herein by reference.

FIELD

The technique shown here relates to a storage medium having stored thereon an information processing program, an information processing apparatus, an information processing system, and an information processing method, and in particular, relates to a storage medium having stored thereon an information processing program that, for example, performs processing based on the attitude and/or the motion of a display apparatus and the action of a user, and an information processing apparatus, an information processing system, and an information processing method that, for example, perform processing based on the attitude and/or the motion of a display apparatus and the action of a user.

BACKGROUND AND SUMMARY

Conventionally, there is a game where a user operates a mobile hand-held terminal (hand-held game apparatus) while holding it, and an event is executed in accordance with the attitude and the position of the mobile hand-held terminal in real space. The mobile hand-held terminal includes a sensor that detects the position and the attitude of the mobile hand-held terminal in real space, and the user of the terminal advances the game by moving the mobile hand-held terminal and changing the attitude of the mobile hand-held terminal. For example, in accordance with the attitude of the mobile hand-held terminal in real space, the mobile hand-held terminal scrolls an image displayed on a display screen of the mobile hand-held terminal. Then, a scope is displayed at the center of the display screen of the mobile hand-held terminal, so that when a predetermined button of the mobile hand-held terminal has been pressed in the state where a virtual object (e.g., an insect object) is included in the scope, it is considered that the virtual object has been caught in the scope.

The mobile hand-held terminal described above is, however, operated by scrolling the image on the basis of the attitude of the mobile hand-held terminal so as to place the virtual object in the scope displayed in a fixed manner at the center of the display screen of the mobile hand-held terminal. Accordingly, the positional relationship between the virtual world and the scope always changes due to the scroll of the image. Thus, the user cannot scroll the image on the basis of the attitude of the mobile hand-held terminal while maintaining the positional relationship between the virtual world and the scope. That is, when attempting to view another direction in the virtual world, the user inevitably moves the scope. This may possibly lead to monotonous operations, and may possibly reduce the verisimilitude and the fun of operations.

Therefore, it is an object of an exemplary embodiment to provide a storage medium having stored thereon an information processing program capable of, when an object that appears in a virtual world and a virtual camera for generating an image of the virtual world are controlled on the basis of the attitude and/or the motion of a display apparatus that displays the image generated by the virtual camera, varying the operations of a user to be performed based on the attitude and/or the motion of the display apparatus, an information processing apparatus, an information processing system, and an information processing method that are capable of, when an object that appears in a virtual world and a virtual camera for generating an image of the virtual world are controlled on the basis of the attitude and/or the motion of a display apparatus that displays the image generated by the virtual camera, varying the operations of a user to be performed based on the attitude and/or the motion of the display apparatus.

To achieve the above object, the exemplary embodiment may employ, for example, the following configurations. It is understood that when the description of the scope of the appended claims is interpreted, the scope should be interpreted only by the description of the scope of the appended claims. If the description of the scope of the appended claims contradicts the description of these columns, the description of the scope of the appended claims has priority.

In an exemplary configuration of a computer-readable storage medium having stored thereon an information processing program according to the exemplary embodiment, the information processing program is executed by a computer of an information processing apparatus capable of displaying an image on a portable display apparatus that outputs at least data based on an attitude and/or a motion of the portable display apparatus body. The information processing program causes the computer to execute: determining, on the basis of the data output from the portable display apparatus, whether or not a direction of a predetermined axis set in the portable display apparatus is included in a predetermined range; controlling, when it has been determined that the direction of the predetermined axis is included in the predetermined range, an action of an object in accordance with the direction of the predetermined axis, the object placed in a virtual world; controlling, when the direction of the predetermined axis is included in the predetermined range or present outside the predetermined range, an action of a first virtual camera, for generating an image of the virtual world, in accordance with the direction of the predetermined axis; and displaying on the portable display apparatus a first image representing the virtual world viewed from the first virtual camera.

It should be noted that the information processing apparatus may be an apparatus that performs game processing and generates an image based on the game processing, or may be a versatile apparatus such as a general personal computer. The portable display apparatus may have a size small enough to be carried by a user. Typically, the portable display apparatus may be a display apparatus that allows the user to view an image displayed thereon by holding it with both hands. Further, as in a terminal apparatus according to the embodiment described later, the portable display apparatus may or may not include components other than: means for outputting at least data based on the attitude and/or the motion of the portable display apparatus body; and means for displaying the first image.

Based on the above, when a user has performed an operation using a portable display apparatus within a predetermined range, the actions of an object and a first virtual camera are controlled in accordance with the direction of a predetermined axis of the portable display apparatus. Accordingly, when the user has performed an operation using the portable display apparatus within the predetermined range, it is possible to, on the basis of the operation, control not only the direction of the line of sight of the first virtual camera for generating a virtual world to be displayed on the portable display apparatus, but also the action of the object placed in the virtual world. This is suitable for the operation of changing the action of the object and the operation of changing a display range displayed on the LCD 61. On the other hand, when the user has performed an operation using the portable display apparatus outside the predetermined range, only the direction of the line of sight of the first virtual camera is changed in accordance with the attitude and the motion of the portable display apparatus. Therefore, the operation using the portable display apparatus outside the predetermined range is suitable for the operation of changing only the display range displayed on the portable display apparatus while maintaining the action of the object. By thus setting at least one predetermined range, the user can perform various operations on the basis of the attitude and the motion of one device. Further, when the user has performed an operation using the portable display apparatus outside the predetermined range, only the direction of the line of sight of the first virtual camera changes. This enables the user to understand that the operation using the portable display apparatus has deviated to a range in which it is not possible to cause the object to take action, and this makes it possible to imply to the user the range in which the object is caused to take action.

In addition, the determination of whether or not the direction of the predetermined axis is included in the predetermined range may include determining, on the basis of the data output from the portable display apparatus, whether or not the direction of the predetermined axis in a left-right direction in real space is included in a first range set in the left-right direction. In this case, when it has been determined that the direction of the predetermined axis in the left-right direction in real space is included in the first range, the action of the object may be controlled such that on the basis of the direction of the predetermined axis in the left-right direction in real space, the object rotates and/or moves in a left-right direction in the virtual world.

Based on the above, it is possible to set a predetermined range in which the object is caused to take action, by rotating (yawing) the portable display apparatus to the left and right.

In addition, the determination of whether or not the direction of the predetermined axis is included in the predetermined range may include determining, on the basis of the data output from the portable display apparatus, whether or not the direction of the predetermined axis in a left-right direction in real space is included in a first range set in the left-right direction. In this case, when it has been determined that the direction of the predetermined axis in the left-right direction in real space is included in the first range, the action of the object may be controlled such that on the basis of the direction of the predetermined axis in the left-right direction in real space, the object rotates and/or moves in a left-right direction in the virtual world.

Based on the above, it is possible to set the predetermined range in which the object is caused to take action, for each of the case where the portable display apparatus is rotated (yawed) to the left and right, and the case where the portable display apparatus is rotated (pitched) upward and downward.

In addition, the first range may have an angular range of a predetermined size. The second range may have an angular range of a size different from the size of the angular range of the first range.

Based on the above, it is possible to set the predetermined range in which the object is caused to take action, to angular ranges different from each other between the case where the portable display apparatus is rotated (yawed) to the left and right, and the case where the portable display apparatus is rotated (pitched) upward and downward. This makes it possible to set an appropriate range in accordance with an operation environment when the user holds the portable display apparatus and a game environment.

In addition, the first range may be a range having the same angular ranges in a left-right direction about a reference direction in real space. The second range may be a range having angular ranges different from each other in an up-down direction with respect to a horizontal direction in real space.

Based on the above, it is possible to set the center of the predetermined range in which the object is caused to take action, in directions different from each other between the case where the portable display apparatus is rotated (yawed) to the left and right, and the case where the portable display apparatus is rotated (pitched) upward and downward. This makes it possible to set the range at an appropriate position in accordance with an operation environment when the user holds the portable display apparatus and a game environment.

In addition, when it has been determined that the direction of the predetermined axis is included in the predetermined range, an attitude of the first virtual camera may be controlled such that a direction of a line of sight of the first virtual camera is the same as a direction of the object in the virtual world.

Based on the above, if the direction of the predetermined axis of the portable display apparatus is included in the predetermined range, in accordance with a change in the direction of the object, also the direction of the line of sight of the first virtual camera changes. As a result, the direction of the object and the direction of the line of sight of the first virtual camera are controlled on the basis of the attitude and/or the motion of the portable display apparatus. This makes it possible, in accordance with the user directing the portable display apparatus in the direction that they wish to view, to change the direction of the object as well, and provide the user with an image as if peeping at the virtual world through the portable display apparatus. It is also possible to provide the user with a feeling as if being in the virtual world. Further, the direction of the object can be set on the basis of the attitude and/or the motion of the portable display apparatus, and the virtual world viewed in the direction of the object is displayed on the portable display apparatus. This achieves the operation of setting the direction of the object in an intuitive manner. This facilitates setting the direction of the object to the direction desired by the user.

In addition, the action of the object may be controlled on the basis of a change in the direction of the predetermined axis. The action of the first virtual camera may be controlled on the basis of the change in the direction of the predetermined axis.

Based on the above, the user can control the action of the object and the action of the first virtual camera by changing the attitude of and/or the position of the portable display apparatus.

In addition, the action of the object may be controlled such that the greater the change in the direction of the predetermined axis, the greater the object moves. The action of the first virtual camera may be controlled such that the greater the change in the direction of the predetermined axis, the greater the first virtual camera moves.

Based on the above, the user can control the amounts of movement (including the amounts of rotational movement) of the object and the first virtual camera on the basis of the amount of change in the attitude and/or the position of the portable display apparatus.

In addition, the action of the object may be controlled such that the object rotationally moves in accordance with an angle of the predetermined axis. The action of the first virtual camera may be controlled such that the first virtual camera rotationally moves in accordance with the angle of the predetermined axis.

Based on the above, the user can control the action of the object and the action of the first virtual camera on the basis of the angle of the portable display apparatus.

In addition, the information processing program may further cause the computer to execute calculating an attitude and/or a motion of the portable display apparatus on the basis of the data output from the portable display apparatus. In this case, on the basis of the attitude and/or the motion of the portable display apparatus, it may be determined whether or not the direction of the predetermined axis is included in the predetermined range.

Based on the above, it is possible to calculate the attitude and/or the motion of the portable display apparatus using data output from the portable display apparatus. This makes it possible to determine the direction of the predetermined axis, and control the actions of the object and the first virtual camera on the basis of the attitude and/or the motion of the portable display apparatus.

In addition, the attitude and/or the motion of the portable display apparatus may be calculated with respect to a predetermined direction in real space. On the basis of the attitude and/or the motion of the portable display apparatus with respect to the predetermined direction in real space, the action of the object may be controlled with respect to a direction that corresponds to the predetermined direction and is set in the virtual world. On the basis of the attitude and/or the motion of the portable display apparatus with respect to the predetermined direction in real space, the action of the first virtual camera may be controlled with respect to the direction that corresponds to the predetermined direction and is set in the virtual world.

Based on the above, on the basis of the attitude and/or the motion of the portable display apparatus with respect to a predetermined direction in real space, it is possible to control the actions with respect to a predetermined direction that corresponds to the predetermined direction in real space and is included in the virtual world.

In addition, the attitude and/or the motion of the portable display apparatus may be calculated with respect to a direction of gravity in real space, using the direction of gravity as the predetermined direction. On the basis of the attitude and/or the motion of the portable display apparatus with respect to the direction of gravity in real space, the action of the object may be controlled with respect to a direction of gravity set in the virtual world. On the basis of the attitude and/or the motion of the portable display apparatus with respect to the direction of gravity in real space, the action of the first virtual camera may be controlled with respect to the direction of gravity set in the virtual world.

Based on the above, on the basis of the attitude and/or the motion of the portable display apparatus with respect to the direction of gravity, it is possible to control the actions with respect to the same direction of gravity.

In addition, at least the attitude and/or the motion of the portable display apparatus that are obtained by rotating the portable display apparatus about the direction of gravity in real space may be calculated. At least a range about the direction of gravity in real space may be set as the predetermined range, and on the basis of the attitude and/or the motion of the portable display apparatus that are obtained by rotating the portable display apparatus about the direction of gravity in real space, it may be determined whether or not the direction of the predetermined axis is included in the predetermined range. On the basis of the attitude and/or the motion of the portable display apparatus that are obtained by rotating the portable display apparatus about the direction of gravity in real space, the action of the object may be controlled such that the object rotates about the direction of gravity set in the virtual world. On the basis of the attitude and/or the motion of the portable display apparatus that are obtained by rotating the portable display apparatus about the direction of gravity in real space, the action of the first virtual camera may be controlled such that the first virtual camera rotates about the direction of gravity set in the virtual world.

Based on the above, the portable display apparatus may be directed leftward and rightward in real space, whereby it is possible to control the actions of the object and the first virtual camera such that the directions of the object and the first virtual camera are directed leftward and rightward in the virtual world.

In addition, at least the attitude and/or the motion of the portable display apparatus that are obtained by swinging the portable display apparatus upward and downward about a horizontal direction perpendicular to the direction of gravity in real space may be calculated. At least a range about the horizontal direction in real space may be set as the predetermined range, and on the basis of the attitude and/or the motion of the portable display apparatus that are obtained by swinging the portable display apparatus upward and downward about the horizontal direction in real space, it may be determined whether or not the direction of the predetermined axis is included in the predetermined range. On the basis of the attitude and/or the motion of the portable display apparatus that are obtained by swinging the portable display apparatus upward and downward about the horizontal direction in real space, the action of the object may be controlled such that the object swings upward and downward about a horizontal direction that corresponds to the horizontal direction in real space and is set in the virtual world. On the basis of the attitude and/or the motion of the portable display apparatus that are obtained by swinging the portable display apparatus upward and downward about the horizontal direction in real space, the action of the first virtual camera may be controlled such that the first virtual camera swings upward and downward about the horizontal direction that corresponds to the horizontal direction in real space and is set in the virtual world.

Based on the above, the portable display apparatus may be directed upward and downward in real space, whereby it is possible to control the actions of the object and the first virtual camera such that the directions of the object and the first virtual camera are directed upward and downward in the virtual world.

In addition, at least the attitude and/or the motion of the portable display apparatus that are obtained by rotating the portable display apparatus about each of a first axis and a second axis that are orthogonal to a perspective direction of, and perpendicular to, a display screen of the portable display apparatus may be calculated, the first image displayed on the display screen. Each of a range about the first axis and a range about the second axis may be set as the predetermined range, and on the basis of the attitude and/or the motion of the portable display apparatus that are obtained by rotating the portable display apparatus about each of the first axis and the second axis, it may be determined whether or not the direction of the predetermined axis is included in each predetermined range. When it has been determined that the direction of the predetermined axis is included in the predetermined range about the first axis, the action of the object may be controlled such that in accordance with the attitude and/or the motion of the portable display apparatus that are obtained by rotating the portable display apparatus about the first axis, the object rotates about an axis that corresponds to the first axis and is set in the virtual world. When it has been determined that the direction of the predetermined axis is included in the predetermined range about the second axis, the action of the object may be controlled such that in accordance with the attitude and/or the motion of the portable display apparatus that are obtained by rotating the portable display apparatus about the second axis, the object rotates about an axis that corresponds to the second axis and is set in the virtual world. The action of the first virtual camera may be controlled such that in accordance with the attitude and/or the motion of the portable display apparatus that are obtained by rotating the portable display apparatus about each of the first axis and the second axis, the first virtual camera rotates about each of axes that correspond to the first axis and the second axis and are orthogonal to a direction of a line of sight of the first virtual camera.

Based on the above, the portable display apparatus may be moved so as to rotate about two axes orthogonal to the perspective direction of a display screen of the portable display apparatus in real space, whereby it is possible to control the actions of the object and the first virtual camera such that the directions of the object and the first virtual camera are directed upward, downward, leftward, and rightward.

In addition, at least the attitude and/or the motion of the portable display apparatus that are obtained by rotating the display apparatus about each of an axis along a width direction of the display screen and an axis along a height direction of the display screen may be calculated, each axis being orthogonal to the perspective direction. Each of a range about the axis along the width direction and a range about the axis along the height direction may be set as the predetermined range, and on the basis of the attitude and/or the motion of the portable display apparatus that are obtained by rotating the portable display apparatus about each of the axis along the width direction and the axis along the height direction, it is determined whether or not the direction of the predetermined axis is included in each predetermined range. When it has been determined that the direction of the predetermined axis is included in the predetermined range about the axis along the width direction, the action of the object may be controlled such that in accordance with the attitude and/or the motion of the portable display apparatus that are obtained by rotating the portable display apparatus about the axis along the width direction, the object rotates about a horizontal axis that corresponds to the axis along the width direction and is set in the virtual world. When it has been determined that the direction of the predetermined axis is included in the predetermined range about the axis along the height direction, the action of the object may be controlled such that in accordance with the attitude and/or the motion of the portable display apparatus that are obtained by the portable display apparatus about the axis along the height direction, the object rotates about a vertical axis that corresponds to the axis along the height direction and is set in the virtual world. The action of the first virtual camera may be controlled such that: in accordance with the attitude and/or the motion of the portable display apparatus that are obtained by rotating the portable display apparatus about the axis along the width direction, the first virtual camera rotates about a horizontal axis that is orthogonal to a direction of a line of sight of the first virtual camera and is included in the virtual world; and in accordance with the attitude and/or the motion of the portable display apparatus that are obtained by rotating the portable display apparatus about the axis along the height direction, the first virtual camera rotates about a vertical axis in the virtual world.

Based on the above, the portable display apparatus may be moved so as to rotate about the height direction and the width direction of the display screen of the portable display apparatus in real space, whereby it is possible to control the actions of the object and the first virtual camera such that the directions of the object and the first virtual camera are directed upward, downward, leftward, and rightward.

In addition, the calculation of the attitude and/or the motion of the portable display apparatus may include: setting a reference direction of the portable display apparatus in real space; and calculating, on the basis of the data output from the portable display apparatus, a difference in left-right angle about a vertical direction in real space between a current direction of the predetermined axis and the reference direction, and a difference in up-down angle about a horizontal direction in real space between the current direction of the predetermined axis and the horizontal direction. The determination of whether or not the direction of the predetermined axis is included in the predetermined range may include: determining whether or not the difference in left-right angle is included in a first range set about the vertical direction in real space; and determining whether or not the difference in up-down angle is included in a second range set about the horizontal direction in real space. In this case, when it has been determined that the difference in left-right angle is included in the first range, the action of the object may be controlled such that the object rotates and/or moves in a left-right direction in the virtual world on the basis of the difference in left-right angle. When it has been determined that the difference in up-down angle is included in the second range, the action of the object may be controlled such that the object rotates and/or moves in an up-down direction in the virtual world on the basis of the difference in up-down angle. The action of the first virtual camera may be controlled such that: the first virtual camera rotates and/or moves in a left-right direction in the virtual world on the basis of the difference in left-right angle; and the first virtual camera rotates and/or moves, on the basis of the difference in up-down angle, in an up-down direction and about a left-right direction that is orthogonal to a direction of a line of sight of the first virtual camera and is included in the virtual world.

Based on the above, it is possible to control the actions of the object and the first virtual camera on the basis of reference directions and the horizontal directions that are set in real space and the virtual world.

In addition, image data indicating the first image may be output to the portable display apparatus. The portable display apparatus may include an image data acquisition unit and a display unit. The image data acquisition unit acquires the image data output from the information processing apparatus. The display unit displays the first image indicated by the image data acquired by the image data acquisition unit.

Based on the above, the portable display apparatus can function as a so-called thin-client terminal, which does not perform information processing such as game processing.

In addition, the information processing program further causing the computer to execute generating compression image data by compressing the image data indicating the first image. In this case, the generated compression image data may be output to the portable display apparatus. The image data acquisition unit may acquire the compression image data output from the information processing apparatus. The portable display apparatus may further include a display image decompression unit. The display image decompression unit decompresses the compression image data to obtain the image data indicating the first image. In this case, the display unit displays the first image indicated by the image data that has been acquired by the image data acquisition unit and has been decompressed by the display image decompression unit.

Based on the above, the first image is decompressed before being output from the information processing apparatus to the portable display apparatus. This makes it possible to output the first image at a high speed, and reduce delay caused between the generation of the first image and the display of the first image on the portable display apparatus.

In addition, besides the first image, a second image representing the virtual world viewed from a second virtual camera may be further displayed on another display apparatus connected to the information processing apparatus.

It should be noted that said another display apparatus described above is a display apparatus connected to the information processing apparatus, like a monitor 2 according to the embodiment described later. Said another display apparatus may be a component separate from the portable display apparatus, and may be any apparatus so long as it is capable of displaying the second image generated by the information processing apparatus. For example, said another display apparatus described above may be integrated with the game apparatus (in a single housing).

Based on the above, when processing based on the operation of moving and changing the attitude of the portable display apparatus is performed, it is possible to display the results of the processing not only on the portable display apparatus but also on said another display apparatus connected to the information processing apparatus. This enables the user to use, in accordance with the state of the operation or the user's preference, either one of images displayed on, for example, two apparatuses, and also view an image suitable for an operation of the user. Further, it is possible to use an image displayed on said another display apparatus connected to the information processing apparatus, as, for example, an image to be viewed by another person different from the user. This makes it possible to provide a viewing environment suitable also for the case where a plurality of people view the results of the processing.

In addition, the information processing program may further cause the computer to execute generating compression image data by compressing the image data indicating the first image. In this case, the generated compression image data may be output to the portable display apparatus, and, besides the compression image data, image data indicating the second image may be output to said another display apparatus without being compressed. The portable display apparatus includes an image data acquisition unit, a display image decompression unit, and a display unit. The image data acquisition unit acquires the compression image data output from the information processing apparatus. The display image decompression unit decompresses the compression image data to obtain the image data indicating the first image. The display unit displays the first image indicated by the image data that has been acquired by the image data acquisition unit and has been decompressed by the display image decompression unit.

Based on the above, the first image is decompressed and then output from the information processing apparatus to the portable display apparatus. This makes it possible to output the first image at a high speed, and reduce delay caused between the generation of the first image and the display of the first image on the portable display apparatus.

In addition, the information processing program may further cause the computer to execute setting, on the basis of a position of the object in the virtual world, the second virtual camera, for generating an image of the virtual world, at a position different from a position of the first virtual camera such that the object is included in the second image.

Based on the above, the same virtual world is displayed not only on the portable display apparatus but also on said another display apparatus, and images of the virtual world that are different in the point of view are displayed thereon. This enables the user to use, in accordance with the state of the operation or the user's preference, either one of the images displayed on the two apparatuses when performing an operation.

In addition, the second virtual camera may be set at a position further away from the object than the first virtual camera is from the object. A range wider than a range of the virtual world represented by the first image may be displayed as the second image on said another display apparatus.

Based on the above, an image of the virtual world in a display range wider than that of an image of the virtual world displayed on the portable display apparatus is displayed on said another display apparatus connected to the information processing apparatus. This makes it possible to display on each display apparatus, for example, an image suitable for an operation of the user when the state of the virtual world is presented to the user.

In addition, the second virtual camera may be set at a position of viewing the object from a bird's-eye view in the virtual world. An image obtained by viewing from a bird's-eye view the object placed in the virtual world may be displayed as the second image on said another display apparatus.

Based on the above, an image of the virtual world based on the attitude and/or the motion of the portable display apparatus is displayed on the portable display apparatus, and an image of the virtual world obtained by looking down upon it is displayed on another display apparatus connected to the information processing apparatus. This makes it possible to display on each display apparatus, for example, an image suitable for an operation of the user when the state of the virtual world is presented to the user.

In addition, the portable display apparatus may include at least one of a gyro sensor and an acceleration sensor. On the basis of data output from the at least one of the gyro sensor and the acceleration sensor, it may be determined whether or not the direction of the predetermined axis is included in the predetermined range.

Based on the above, using the data that is output from the gyro sensor and indicates the angular velocity generated in the portable display apparatus and/or the data that is output from the acceleration sensor and indicates the acceleration generated in the portable display apparatus, it is possible to accurately calculate the attitude and the motion of the portable display apparatus.

In addition, the exemplary embodiment may be carried out in the forms of an information processing apparatus and an information processing system, each including units that perform the above processes, and an information processing method including the above operations.

The exemplary embodiment enables the user to perform various operations on the basis of the attitude and the motion of one device, by setting at least one predetermined range.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

Figure 1:
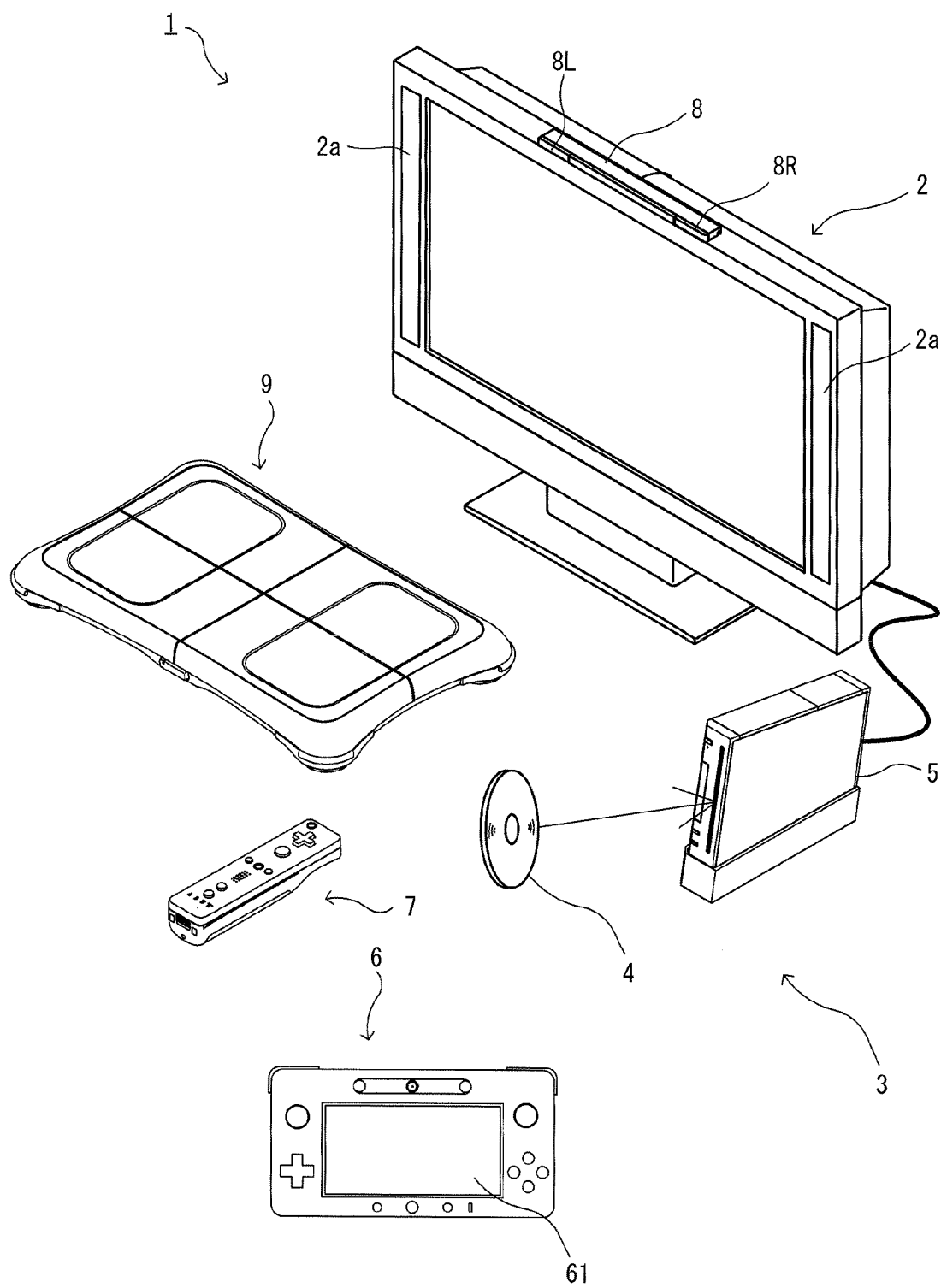
FIG. 1 is an external view showing an example of a game system 1 according to a non-limiting exemplary embodiment.
Figure 2:
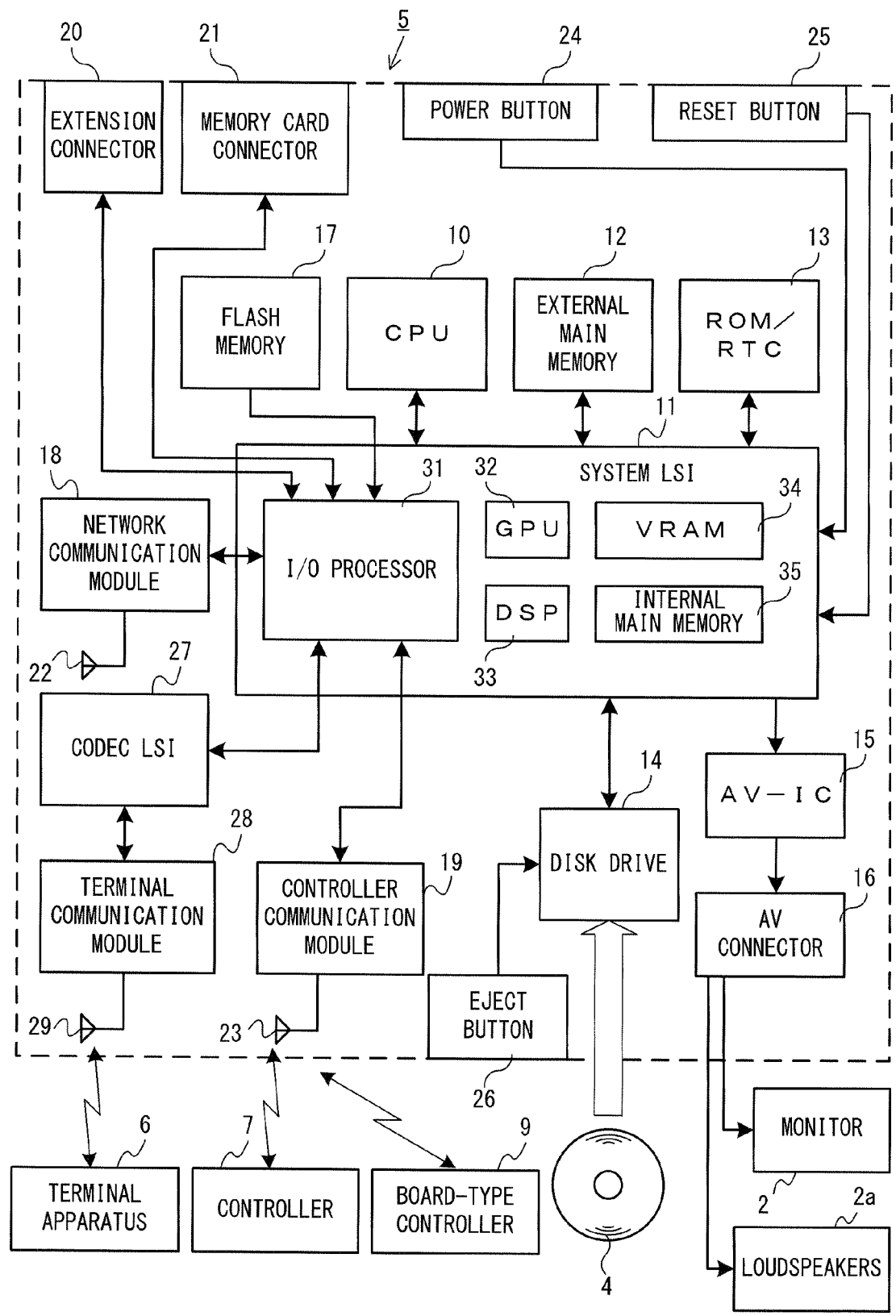
FIG. 2 is a functional block diagram showing a non-limiting example of a game apparatus body 5 of FIG. 1.

With reference to FIG. 1, an information processing apparatus for executing an information processing program according to an exemplary embodiment and an information processing system including the information processing apparatus is described. Hereinafter, in order to provide a specific description, a stationary game apparatus body 5 is used as an example of the information processing apparatus, and a game system including the game apparatus body 5 is described. FIG. 1 is an external view showing an example of the game system 1 including the stationary game apparatus body 5. FIG. 2 is a block diagram showing an example of the game apparatus body 5. Hereinafter, the game system 1 is described.

As shown in FIG. 1, the game system 1 includes a household television receiver (hereinafter referred to as a "monitor") 2 which is an example of display means, and the stationary game apparatus 3 connected to the monitor 2 via a connection cord. The monitor 2 includes loudspeakers 2a for outputting, in the form of sound, a sound signal outputted from the game apparatus 3. Further, the game apparatus 3 includes: an optical disk 4 having stored therein a program (e.g., a game program), which is an example of the information processing program according to the exemplary embodiment; the game apparatus body 5 having a computer for executing the program stored in the optical disk 4 to display a game screen on the monitor 2; a terminal apparatus 6; a controller 7 for providing the game apparatus body 5 with operation information used to operate, for example, objects displayed on the display screen; and a board-type controller 9. The game system 1 performs game processing on the game apparatus body 5 in accordance with a game operation using at least one of the terminal apparatus 6, the controller 7, and the board-type controller 9, and displays a game image obtained by the game processing on the monitor 2 and/or the terminal apparatus 6. The game apparatus body 5 is wirelessly connected to the terminal apparatus 6, the controller 7, and the board-type controller 9 so as to enable wireless communication therebetween. For example, the wireless communication is performed according to the Bluetooth (registered trademark) standard or the IEEE 802.11n standard. The wireless communication, however, may be performed in accordance with other standards such as standards for infrared communication.

The optical disk 4, typifying an information storage medium used for the game apparatus body 5 in an exchangeable manner, is detachably inserted in the game apparatus body 5. The optical disk 4 has stored therein the information processing program (typically, a game program) to be performed by the game apparatus body 5. The game apparatus body 5 has, on a front surface thereof, an insertion opening for the optical disk 4. The game apparatus body 5 reads and executes the information processing program stored in the optical disk 4 inserted into the insertion opening to perform the information processing.

The monitor 2 is connected to the game apparatus body 5 via a connection cord. The monitor 2 displays a game image obtained by the game processing performed by the game apparatus body 5. The monitor 2 includes the loudspeakers 2a. The loudspeakers 2a each output a game sound obtained as a result of the game processing. In another embodiment, the game apparatus body 5 and a stationary display apparatus may be integrated with each other. The communication between the game apparatus body 5 and the monitor 2 may be wireless communication.

The game apparatus body 5 has mounted thereto a flash memory 17 (see FIG. 2) which functions as a backup memory for fixedly storing data such as saved data. The game apparatus body 5 executes the game program or the like stored in the optical disk 4, and displays a result thereof as a game image on the monitor 2 and/or the terminal apparatus 6. The game program or the like to be executed may be stored in advance in the flash memory 17 as well as in the optical disk 4. Further, the game apparatus body 5 may reproduce a state of a game played in the past, using the saved data stored in the flash memory 17, and display an image of the game state on the monitor 2 and/or the terminal apparatus 6. A user of the game apparatus 3 can enjoy the game progress by operating at least one of the terminal apparatus 6, the controller 7, and the board-type controller 9 while viewing the game image displayed on the monitor 2 and/or the terminal apparatus 6.

The controller 7 and the board-type controller 9 each wirelessly transmit transmission data such as operation information, using, for example, the Bluetooth technology, to the game apparatus body 5 having a controller communication module 19. The controller 7 is operation means for performing, for example, selection of options displayed on the display screen of the monitor 2. The controller 7 includes a housing which is small enough to be held by one hand, and a plurality of operation buttons (including a cross key and the like) which are exposed at the surface of the housing. In addition, as is described later, the controller 7 includes an imaging information calculation section for taking an image viewed from the controller 7. As exemplary imaging targets of the imaging information calculation section, two LED modules (hereinafter referred to as "markers") 8L and 8R are provided in the vicinity of the display screen of the monitor 2 (above the screen in FIG. 1). Although details will be described later, a user (player) is allowed to perform a game operation while moving the controller 7, and the game apparatus body 5 uses a marker 8 to calculate the movement, position, attitude and the like of the controller 7. The marker 8 has two markers 8L and 8R at both ends thereof. Specifically, the marker 8L (as well as the marker 8R) includes one or more infrared LEDs (Light Emitting Diodes), and emits infrared light forward from the monitor 2. The marker 8 is connected to the game apparatus body 5, so that the game apparatus body 5 can control the infrared LEDs included in the marker 8 to be lit on or off. The marker 8 is a portable unit, so that the user is allowed to place the marker 8 in a given position. Although FIG. 1 shows a case where the marker 8 is placed on the monitor 2, the location and direction of the marker 8 may be appropriately selected. Further, the controller 7 is capable of receiving, at a communication section, transmission data wirelessly transmitted from the controller communication module 19 of the game apparatus body 5, to generate a sound or vibration based on the transmission data.

In another embodiment, the controller 7 and/or the board-type controller 9 may be wire-connected to the game apparatus body 5. Further, in the exemplary embodiment, the game system 1 includes a controller 7 and a board-type controller 9. The game apparatus body 5, however, is capable of communicating with a plurality of controllers 7 and a plurality of board-type controllers 9. Therefore, a plurality of players can play a game using a predetermined number of controllers 7 and board-type controller 9 simultaneously.

The controller 7 includes a housing which is formed by, for example, plastic molding, and has a plurality of operation sections (operation buttons) in the housing 71. Then, the controller 7 transmits, to the game apparatus body 5, operation data indicating the states of inputs provided to the operation sections (indicating whether or not each operation button has been pressed).

In addition, the controller 7 has the imaging information calculation section that analyzes image data of an image captured by capturing means and determines an area having a high brightness, and thereby calculates the position of the center of gravity, the size, and the like of the area. For example, the imaging information calculation section has capturing means fixed in the housing of the controller 7, and uses as an imaging target a marker that outputs infrared light, such as a marker section 65 of the terminal apparatus 6 and/or the marker 8. The imaging information calculation section calculates the position of the imaging target in a captured image captured by the capturing means, and transmits, to the game apparatus body 5, marker coordinate data indicating the calculated position. The marker coordinate data varies depending on the direction (the angle of tilt) or the position of the controller 7, and therefore, the game apparatus body 5 can calculate the direction and the position of the controller 7 using the marker coordinate data.

In addition, the controller 7 includes therein an acceleration sensor and/or a gyro sensor. The acceleration sensor detects the acceleration generated in the controller 7 (including the gravitational acceleration), and transmits, to the game apparatus body 5, data indicating the detected acceleration. The acceleration detected by the acceleration sensor varies depending on the direction (the angle of tilt) or the movement of the controller 7, and therefore, the game apparatus body 5 can calculate the direction and the movement of the controller 7 using the acquired acceleration data. The gyro sensor detects the angular velocities generated about three axes set in the controller 7, and transmits, to the game apparatus body 5, angular velocity data indicating the detected angular velocities. The acceleration detected by the gyro sensor varies depending on the direction (the angle of tilt) or the movement of the controller 7, and therefore, the game apparatus body 5 can calculate the direction and the movement of the controller 7 using the acquired acceleration data. As described above, the user is allowed to perform a game operation by pressing any of the operation sections 72 provided on the controller 7, and moving the controller 7 so as to change the position and the attitude (tilt) thereof.

The controller 7 has a loudspeaker and a vibrator. The controller 7 processes sound data transmitted from the game apparatus body 5, and outputs sound corresponding to the sound data from the loudspeaker. Further, the controller 7 processes vibration data transmitted from the game apparatus body 5, and generates vibration by actuating the vibrator in accordance with the vibration data. It should be noted that in the exemplary embodiment described later, it is possible to play a game without using the controller 7. A detailed configuration of the board-type controller 9 will be described later.

The terminal apparatus 6 is a portable apparatus that is small enough to be held by the user, and the user is allowed to move the terminal apparatus 6 with hands, or place the terminal apparatus 6 at any location. Although a detailed configuration of the terminal apparatus 6 will be described later, the terminal apparatus 6 includes an LCD (Liquid Crystal Display) 61 as display means, and input means (a touch panel 62, a gyro sensor 604, and the like described later). The terminal apparatus 6 and the game apparatus body 5 (a terminal communication module 28 (see FIG. 2)) are capable of communicating with each other wirelessly or wired. The terminal apparatus 6 receives, from the game apparatus body 5, data of an image (e.g., a game image) generated in the game apparatus body 5, and displays the image represented by the data on an LCD 61. Although the LCD 61 is used as a display apparatus in the exemplary embodiment, the terminal apparatus 6 may include a given other display apparatus, such as a display apparatus utilizing EL (Electro Luminescence), for example. Further, the terminal apparatus 6 transmits, to the game apparatus body 5 having the terminal communication module 28, operation data representing the content of an operation performed on the terminal apparatus 6.

Next, with reference to FIG. 2, the internal configuration of the game apparatus body 5 is described. FIG. 2 is a block diagram showing an example of the internal configuration of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disk drive 14, an AV-IC (Audio Video-Integrated Circuit) 15 and the like.

The CPU 10, serving as a game processor, executes a program stored in the optical disk 4 to perform a process. The CPU 10 is connected to the system LSI 11. In addition to the CPU 10, the external main memory 12, the ROM/RTC 13, the disk drive 14, and the AV-IC 15 are connected to the system LSI 11. The system LSI 11 performs processes such as control of data transmission between the respective components connected thereto, generation of an image to be displayed, and acquisition of data from an external apparatus. The internal configuration of the system LSI 11 will be described later. The external main memory 12, which is a volatile memory, stores programs loaded from the optical disk 4 or the flash memory 17, and stores various data. The external main memory 12 is used as a work area and a buffer area for the CPU 10. The ROM/RTC 13 includes a ROM (so-called boot ROM) incorporating a program for booting the game apparatus body 5, and a clock circuit (RTC) for counting time. The disk drive 14 reads, from the optical disk 4, program data, texture data and the like, and writes the read data into an internal main memory 35 described below or the external main memory 12.

The system LSI 11 includes an input/output processor (I/O processor) 31, a GPU (Graphics Processor Unit) 32, a DSP (Digital Signal Processor) 33, a VRAM (Video RAM) 34, and the internal main memory 35. These components 31 to 35 are connected to each other via an internal bus (not shown).

The GPU 32, which is a part of rendering means, generates an image in accordance with a graphics command (draw command) supplied from the CPU 10. The VRAM 34 stores data (such as polygon data and texture data) used by the GPU 32 to execute the graphics command. When an image is generated, the GPU 32 generates image data using the data stored in the VRAM 3. In the exemplary embodiment, the game apparatus body 5 may generate both a game image to be displayed on the monitor 2 and a game image to be displayed on the terminal apparatus 6. Hereinafter, the game image to be displayed on the monitor 2 may be referred to as a "monitor game image", and the game image to be displayed on the terminal apparatus 6 may be referred to as a "terminal game image".

The DSP 33, serving as an audio processor, generates sound data using sound data and sound waveform (tone quality) data stored in the internal main memory 35 and the external main memory 12. In the exemplary embodiment, similarly to the game images, both a game sound to be output from the loudspeakers 2a of the monitor 2 and a game sound to be output from the loudspeakers of the terminal apparatus 6 may be generated. Hereinafter, the game sound to be output from the monitor 2 may be referred to as a "monitor game sound", and the game sound to be output from the terminal apparatus 6 may be referred to as a "terminal game sound".

Among the image data and sound data generated by the game apparatus body 5, the image data and sound data to be output to the monitor 2 are read by the AV-IC 15. The AV-IC 15 outputs the read image data to the monitor 2 via an AV connector 16, and outputs the read sound data to the loudspeakers 2a included in the monitor 2. Thereby, an image is displayed on the monitor 2, and a sound is output from the loudspeakers 2a.

Further, among the image data and sound data generated by the game apparatus body 5, the image data and sound data to be output to the terminal apparatus 6 are transmitted to the terminal apparatus 6 by the I/O processor 31 or the like. Data transmission to the terminal apparatus 6 by the I/O processor 31 or the like will be described later.

The I/O processor 31 performs data reception and transmission with the components connected thereto, and download of data from an external apparatus. The I/O processor 31 is connected to the flash memory 17, the network communication module 18, the controller communication module 19, an extension connector 20, a memory card connector 21, and a codec LSI 27. An antenna 23 is connected to the controller communication module 19. The codec LSI 27 is connected to the terminal communication module 28, and an antenna 29 is connected to the terminal communication module 28.

The game apparatus body 5 is connected to a network such as the Internet so as to communicate with external information processing apparatuses (for example, other game apparatuses or various servers). That is, the I/O processor 31 is connected to a network via the network communication module 18 and the antenna 22 so as to communicate with external information processing apparatuses connected to the network. The I/O processor 31 accesses the flash memory 17 at regular intervals so as to detect for data to be transmitted to the network. When data to be transmitted is detected, the data is transmitted to the network via the network communication module 18 and the antenna 22. Further, the I/O processor 31 receives, via the network, the antenna 22 and the network communication module 18, data transmitted from the external information processing apparatuses or data downloaded from a download server, and stores the received data in the flash memory 17. The CPU 10 executes a program, and reads the data stored in the flash memory 17 to use the data for execution of the program. The flash memory 17 may store not only the data transmitted and received between the game apparatus body 5 and the external information processing apparatuses, but also saved data (result data or progress data of the process) of the game played with the game apparatus body 5. Further, the flash memory 17 may store programs such as a game program.

The game apparatus body 5 can receive operation data from the controller 7 and/or the board-type controller 9. That is, the I/O processor 31 receives, via the antenna 23 and the controller communication module 19, operation data or the like transmitted from the controller 7 and/or the board-type controller 9, and stores (temporarily) the data in a buffer region of the internal main memory 35 or the external main memory 12. Similarly to the external main memory 12, the internal main memory 35 may store a program loaded from the optical disk 4 or a program loaded from the flash memory 17, and various data. The internal main memory 35 may be used as a work region or buffer region of the CPU 10.

The game apparatus body 5 is capable of transmitting/receiving image data, sound data and the like to/from the terminal apparatus 6. When transmitting a game image (terminal game image) to the terminal apparatus 6, the I/O processor 31 outputs data of a game image generated by the GPU 32 to the codec LSI 27. The codec LSI 27 performs a predetermined compression process on the image data supplied from the I/O processor 31. The terminal communication module 28 performs wireless communication with the terminal apparatus 6. Accordingly, the image data compressed by the codec LSI 27 is transmitted by the terminal communication module 28 to the terminal apparatus 6 via the antenna 29. In the exemplary embodiment, the codec LSI 27 compresses the image data using a highly efficient compression technique, for example, the H.264 standard. The codec LSI 27 may adopt other compression techniques. When the communication rate is sufficiently high, uncompressed image data may be transmitted. The terminal communication module 28 is, for example, a Wi-Fi certified communication module. The terminal communication module 28 may perform wireless communication with the terminal apparatus 6 at a high speed using, for example, the technique of MIMO (Multiple Input Multiple Output) adopted in the IEEE 802.11n standard, or may use other communication techniques.

The game apparatus body 5 transmits, to the terminal apparatus 6, sound data as well as the image data. That is, the I/O processor 31 outputs sound data generated by the DSP 33 to the terminal communication module 28 via the codec LSI 27. The codec LSI 27 performs a compression process on the sound data in a similar manner to that for the image data. Any compression technique may be adopted for the sound data. In another embodiment, uncompressed sound data may be transmitted. The terminal communication module 28 transmits the compressed image data and sound data to the terminal apparatus 6 via the antenna 29.

The game apparatus body 5 transmits, in addition to the image data and sound data, various control data to the terminal apparatus 6, where necessary. The control data represent control instructions for the components included in the terminal apparatus 6, such as an instruction to control on/off of a marker section (a marker section 65 shown in FIG. 5), and an instruction to control image taking of a camera (a camera 66 shown in FIG. 10). The I/O processor 31 transmits the control data to the terminal apparatus 6 in response to an instruction from the CPU 5. In the exemplary embodiment, the codec LSI 27 does not perform a data compression process on the control data. Alternatively, in another embodiment, the codec LSI 27 may perform a compression process on the control data. The above data transmitted from the game apparatus body 5 to the terminal apparatus 6 may be encrypted where necessary, or may not be encrypted.

The game apparatus body 5 can receive various data from the terminal apparatus 6. Although details will be described later, in the exemplary embodiment, the terminal apparatus 6 transmits operation data, image data, and sound data. The respective data transmitted from the terminal apparatus 6 are received by the terminal communication module 28 via the antenna 29. The image data and sound data transmitted from the terminal apparatus 6 have been subjected to a similar compression process to that for the image data and sound data transmitted from the game apparatus body 5 to the terminal apparatus 6. Accordingly, these image data and sound data are transmitted from the terminal communication module 28 to the codec LSI 27, and subjected to a decompression process by the codec LSI 27. The decompressed data are output to the I/O processor 31. On the other hand, the operation data transmitted from the terminal apparatus 6 is smaller in amount than the image data and sound data, and therefore, the operation data does not need to be compressed. The operation data may be encrypted where necessary, or may not be encrypted. Accordingly, the operation data, which has been received by the terminal communication module 28, is output to the I/O processor 31 via the codec LSI 27. The I/O processor 31 stores (temporarily) the data received from the terminal apparatus 6 in the buffer region of the internal main memory 35 or the external main memory 12.

The game apparatus body 5 is connectable to other devices and external storage media. That is, an extension connector 20 and a memory card connector 21 are connected to the I/O processor 31. The expansion connector 20 is an interface connector as typified by a USB and an SCSI, and is capable of performing communication with the network, instead of the network communication module 18, by connecting thereto a medium such as an external storage medium, a peripheral device such as another controller, or a wired communication connector. The memory card connector 21 is a connector for connecting thereto an external storage medium such as a memory card. For example, the I/O processor 31 accesses the external storage medium via the expansion connector 20 or the memory card connector 21 to save or read data.

The game apparatus body 5 includes (on the front main surface thereof, for example) a power button 24, a reset button 25, an insertion slot in which the optical disk 4 is inserted, an eject button 26 for ejecting the optical disk 4 from the insertion slot of the game apparatus body 5, and the like. The power button 24 and the reset button 25 are connected to the system LSI 11. When the power button 24 is turned on, the respective components of the game apparatus body 5 are supplied with power. When the reset button 25 is pressed, the system LSI 11 re-executes the boot program of the game apparatus body 5. The eject button 26 is connected to the disk drive 14. When the eject button 26 is pressed, the optical disk 4 is ejected from the disk drive 14.

In another embodiment, some of the components of the game apparatus body 5 may be constituted as an extension device separated from the game apparatus body 5. At this time, the extension device may be connected to the game apparatus body 5 via the extension connector 20. Specifically, the extension device may include, for example, the codec LSI 27, the terminal communication module 28, and the antenna 29, and may be detachably connected to the extension connector 20. Thus, by connecting the extension device to the game apparatus body which does not have the above components, the game apparatus body can be made capable of communicating with the terminal apparatus 6.

Figure 3:
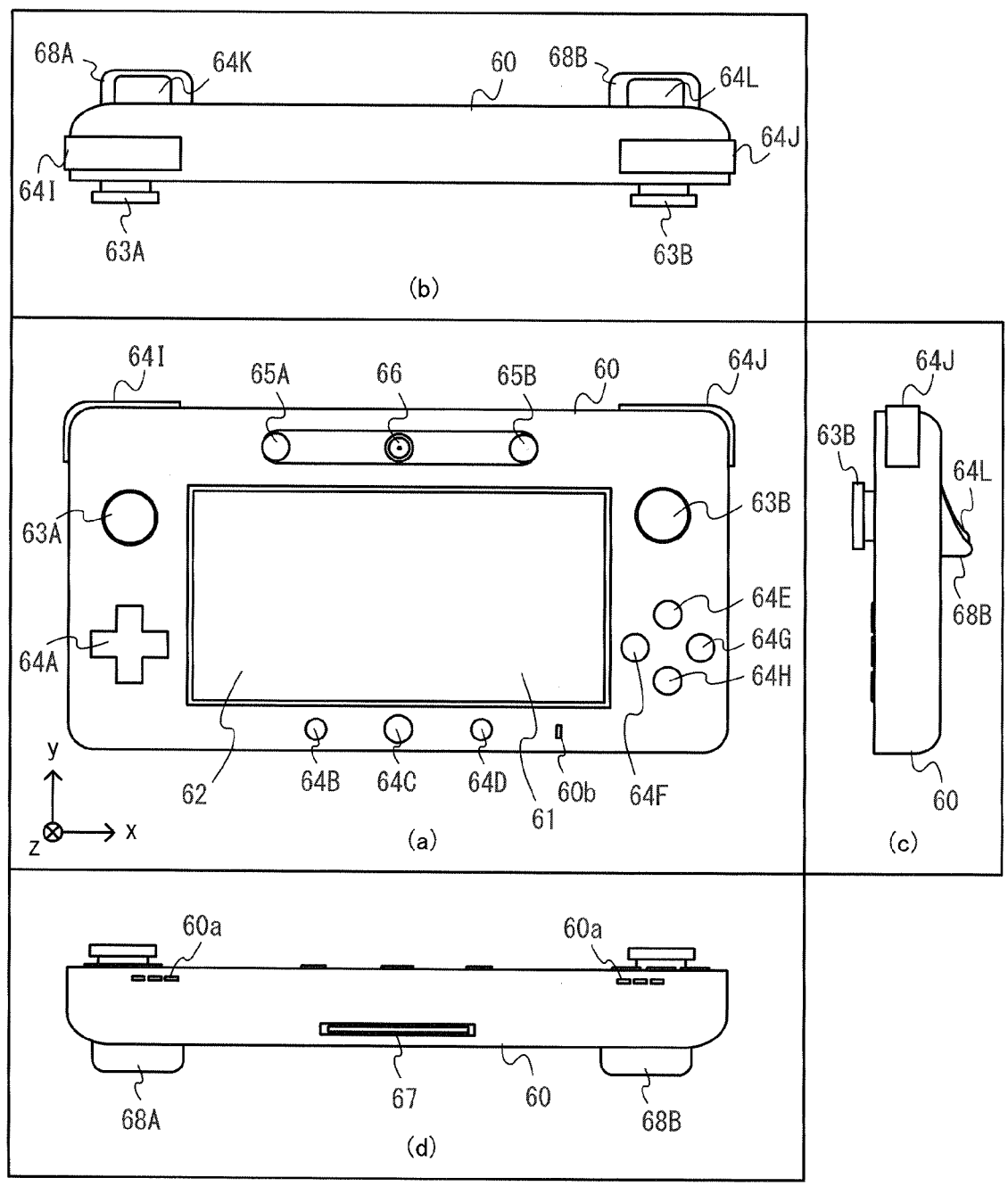
FIG. 3 is a diagram showing a non-limiting example of the external configuration of a terminal apparatus 6 of FIG. 1.
Figure 4:
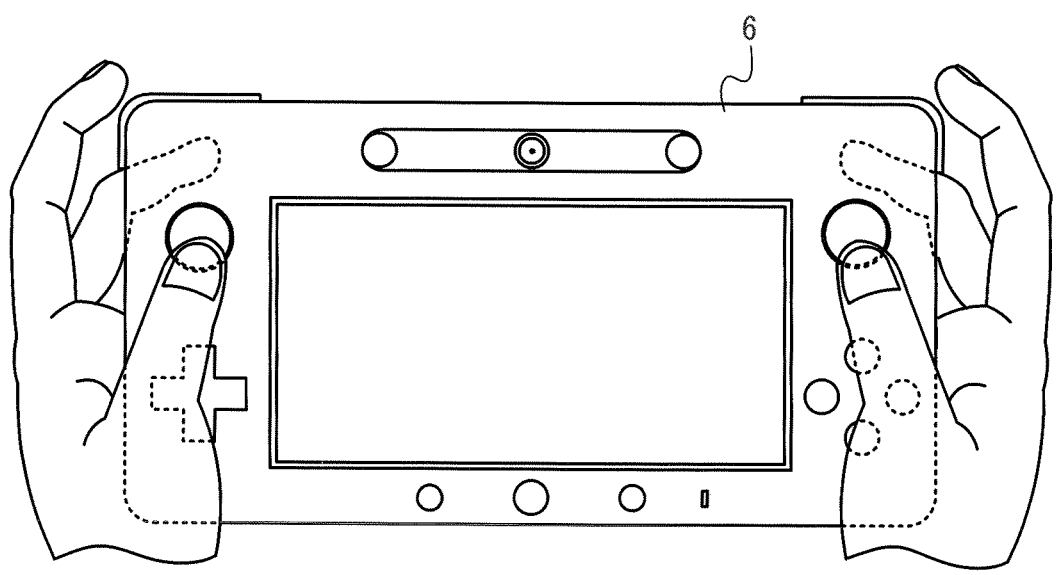
FIG. 4 is a diagram showing a non-limiting example of the state where a user holds the terminal apparatus 6.
Figure 5:
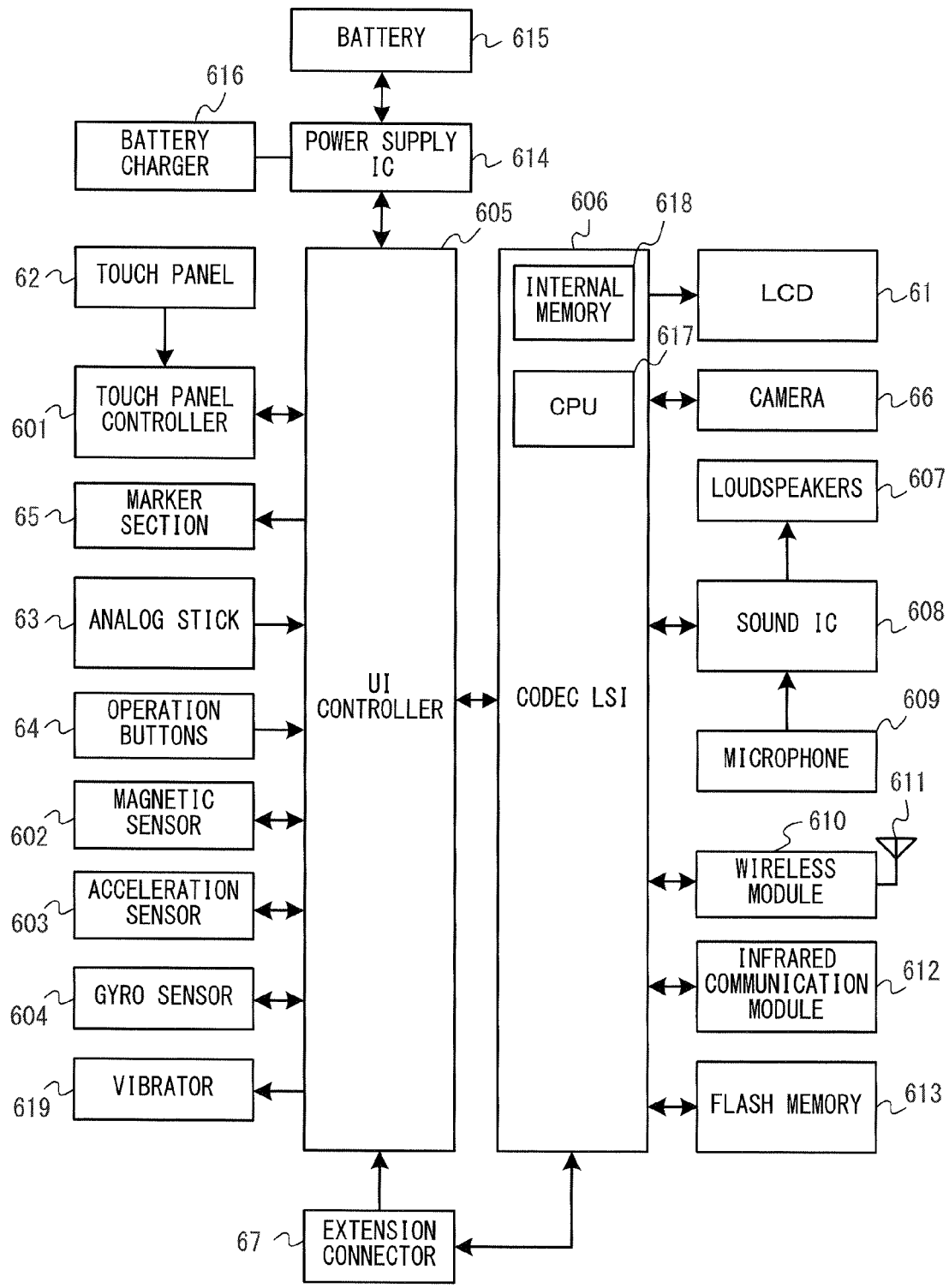
FIG. 5 is a block diagram showing a non-limiting example of the internal configuration of the terminal apparatus 6 of FIG. 3.

Next, with reference to FIGS. 3 through 5, the configuration of the terminal apparatus 6 is described. FIG. 3 is a diagram showing an example of the external configuration of the terminal apparatus 6. More specifically, (a) of FIG. 3 is a front view of the terminal apparatus 6, (b) of FIG. 3 is a top view, (c) of FIG. 3 is a right side view, and (d) of FIG. 3 is a bottom view. FIG. 4 shows an example of the state where a user holds the terminal apparatus 6 with both hands.

As shown in FIG. 3, the terminal apparatus 6 includes a housing 60 which generally has a horizontally long plate-like rectangular shape. The housing 60 is small enough to be held by the user. Therefore, the user is allowed to move the terminal apparatus 6 with hands, and change the location of the terminal apparatus 6.

The terminal apparatus 6 includes an LCD 61 on a front surface of the housing 60. The LCD 61 is provided near the center of the front surface of the housing 60. Therefore, as shown in FIG. 4, the user, holding the housing 60 at portions to the left and right of the LCD 61, is allowed to move the terminal apparatus 6 while viewing a screen of the LCD 61. FIG. 4 shows an example where the user holds the terminal apparatus 6 horizontally (i.e., with the longer sides of the terminal apparatus 6 being oriented horizontally) by holding the housing 60 at portions to the left and right of the LCD 61. The user, however, may hold the terminal apparatus 6 vertically (i.e., with the longer sides of the terminal apparatus 6 being oriented vertically).

As shown in (a) of FIG. 3, the terminal apparatus 6 includes, as operation means, a touch panel 62 on the screen of the LCD 61. In the exemplary embodiment, the touch panel 62 is, but is not limited to, a resistive film type touch panel. However, a touch panel of a given type, such as electrostatic capacitance type, may be used. The touch panel 62 may be of single touch type or multiple touch type. In the exemplary embodiment, the touch panel 62 has the same resolution (detection accuracy) as that of the LCD 61. The resolution of the touch panel 62 and the resolution of the LCD 61, however, do not need to be the same. Although an input to the touch panel 62 is usually performed using a touch pen, in addition to the touch pen, a finger of the user may be used to perform an input to the touch panel 62. The housing 60 may have an opening for accommodating the touch pen used to perform an operation to the touch panel 62. The terminal apparatus 6 has the touch panel 62, and therefore, the user is allowed to operate the touch panel 62 while moving the terminal apparatus 6. That is, the user is allowed to directly (using the touch panel 62) perform an input to the screen of the LCD 61 while moving the LCD 61.

As shown in FIG. 3, the terminal apparatus 6 has, as operation means, two analog sticks 63A and 63B, and a plurality of operation buttons 64A through 64L. The analog sticks 63A and 63B are each a device for designating a direction. The analog sticks 63A and 63B are each configured such that a stick part thereof to be operated by a finger of the user is slidable or tiltable in a given direction (at a given angle in a given direction such as the upward, the downward, the leftward, the rightward, or the diagonal direction) with respect to the front surface of the housing 60. The left analog stick 63A is provided to the left of the screen of the LCD 61, and the right analog stick 63B is provided to the right of the screen of the LCD 61. Therefore, the user is allowed to perform an input for designating a direction using the analog stick 63A or 63B with either the left or right hand. Further, as shown in FIG. 4, the analog sticks 63A and 63B are positioned so as to be operated by the user holding the left and right portions of the terminal apparatus 6. Therefore, the user is allowed to easily operate the analog sticks 63A and 63B when the user holds and moves the terminal apparatus 6.

The operation buttons 64A through 64L are each operation means for performing a predetermined input. As described below, the operation buttons 64A through 64L are positioned so as to be operated by the user holding the left and right portions of the terminal apparatus 6 (see FIG. 4). Accordingly, the user is allowed to easily operate the operation means when the user holds and moves the terminal apparatus 6.

As shown in (a) of FIG. 3, among the operation buttons 64A through 64L, the cross button (direction input button) 64A and the operation buttons 64B through 64H are provided on the front surface of the housing 60. The operation buttons 64A through 64H are positioned so as to be operated by a thumb of the user (see FIG. 4).

The cross button 64A is provided to the left of the LCD 61 and beneath the left analog stick 63A. That is, the cross button 64A is positioned so as to be operated by the left hand of the user. The cross button 64A is cross-shaped, and is capable of indicating an upward, a downward, a leftward, or a rightward direction. The operation buttons 64B through 64D are provided beneath the LCD 61. The three operation buttons 64B through 64D are positioned so as to be operated by the right and left hands of the user. The four operation buttons 64E through 64H are provided to the right of the LCD 61 and beneath the right analog stick 63B. That is, the four operation buttons 64E through 64H are positioned so as to be operated by the right hand of the user. Further, the four operation buttons 64E through 64H are positioned upward, downward, leftward, and rightward, respectively, with respect to a center position of the four operation buttons. Accordingly, the terminal apparatus 6 may cause the four operation buttons 64E through 64H to function as buttons which allow the user to designate an upward, a downward, a leftward, or a rightward direction.

As shown in (a), (b), and (c) of FIG. 3, a first L button 64I and a first R button 64J are provided on diagonal upper portions (an upper left portion and an upper right portion) of the housing 60. Specifically, the first L button 64I is provided on the left end of the upper side surface of the plate-shaped housing 60 so as to protrude from the upper and left side surfaces. The first R button 64J is provided on the right end of the upper side surface of the housing 60 so as to protrude from the upper and right side surfaces. In this way, the first L button 64I is positioned so as to be operated by the index finger of the left hand of the user, and the first R button 64J is positioned so as to be operated by the index finger of the right hand of the user (see FIG. 4).

As shown in (b) and (c) of FIG. 3, leg parts 68A and 68B are provided so as to protrude from a rear surface (i.e., a surface reverse of the front surface on which the LCD 61 is provided) of the plate-shaped housing 60, and a second L button 64K and a second R button 64L are provided so as to protrude from the leg parts 68A and 68B, respectively. Specifically, the second L button 64K is provided at a slightly upper position on the left side (the left side as viewed from the front surface side) of the rear surface of the housing 60, and the second R button 64L is provided at a slightly upper position on the right side (the right side as viewed from the front-surface side) of the rear surface of the housing 60. In other words, the second L button 64K is provided at a position substantially opposite to the left analog stick 63A provided on the front surface, and the second R button 64L is provided at a position substantially opposite to the right analog stick 63B provided on the front surface. The second L button 64K is positioned so as to be operated by the middle finger of the left hand of the user, and the second R button 64L is positioned so as to be operated by the middle finger of the right hand of the user (see FIG. 4). Further, as shown in (c) of FIG. 3, the leg parts 68A and 68B each have a surface facing obliquely upward, and the second L button 64K and the second R button 64L are provided on the oblique surfaces of the leg parts 68A and 68B, respectively. Thus, the second L button 64K and the second R button 64L have button surfaces facing obliquely upward. It is supposed that the middle finger of the user moves vertically when the user holds the terminal apparatus 6, and therefore, the upward facing button surfaces allow the user to easily press the second L button 64K and the second R button 64L. Further, the leg parts 68A and 68B provided on the rear surface of the housing 60 allow the user to easily hold the housing 60. Moreover, the operation buttons provided on the leg parts 68A and 68B allow the user to easily perform operation while holding the housing 60.

In the terminal apparatus 6 shown in FIG. 3, the second L button 64K and the second R button 64L are provided on the rear surface of the housing 60. Therefore, if the terminal apparatus 6 is placed with the screen of the LCD 61 (the front surface of the housing 60) facing upward, the screen of the LCD 61 may not be perfectly horizontal. Accordingly, in another embodiment, three or more leg parts may be provided on the rear surface of the housing 60. In this case, if the terminal apparatus 6 is placed on a floor with the screen of the LCD 61 facing upward, the three or more leg parts contact the floor. Thus, the terminal apparatus 6 can be placed with the screen of the LCD 61 being horizontal. Such a horizontal placement of the terminal apparatus 6 may be achieved by providing detachable leg parts on the rear surface of the housing 60.

The respective operation buttons 64A through 64L are assigned functions, where necessary, in accordance with a game program. For example, the cross button 64A may be used for direction designation operation, selection operation, and the like, and the operation buttons 64E through 64H may be used for determination operation, cancellation operation, and the like.

The terminal apparatus 6 includes a power button (not shown) for turning on/off the power of the terminal apparatus 6. The terminal apparatus 6 may include an operation button for turning on/off screen display of the LCD 61, an operation button for performing connection setting (pairing) with the game apparatus body 5, and an operation button for adjusting the volume of loudspeakers (loudspeakers 607 shown in FIG. 5).

As shown in (a) of FIG. 3, the terminal apparatus 6 includes a marker section (a marker section 65 shown in FIG. 5) including a marker 65A and a marker 65B, on the front surface of the housing 60. For example, the marker section 65 is provided above the LCD 61. The markers 65A and 65B are each constituted by one or more infrared LEDs, like the markers 8L and 8R of the marker 8. The marker section 65 is used, like the marker 8, for causing the game apparatus body 5 to calculate a movement or the like of the controller 7 with respect to the marker section 65. The game apparatus body 5 is capable of controlling the infrared LEDs of the marker section 65 to be on or off.

The terminal apparatus 6 includes a camera 66 as imaging means. The camera 66 includes an image pickup element (e.g., a CCD image sensor or a CMOS image sensor) having a predetermined resolution, and a lens. For example, the camera 66 is provided on the front surface of the housing 60. Accordingly, the camera 66 is capable of taking an image of the face of the user holding the terminal apparatus 6. For example, the camera 66 is capable of taking an image of the user playing a game while viewing the LCD 61.

The terminal apparatus 6 has a microphone (a microphone 609 shown in FIG. 5) as sound input means. A microphone hole 60b is provided in the front surface of the housing 60. The microphone 609 is embedded in the housing 60 at a position inside the microphone hole 60b. The microphone 609 detects for a sound, such as user's voice, around the terminal apparatus 6.

The terminal apparatus 6 has loudspeakers (loudspeakers 607 shown in FIG. 5) as sound output means. As shown in (d) of FIG. 3, speaker holes 60a are provided in the lower side surface of the housing 60. A sound is output through the speaker holes 60a from the loudspeakers 607. In the exemplary embodiment, the terminal apparatus 6 has two loudspeakers, and the speaker holes 60a are provided at positions corresponding to a left loudspeaker and a right loudspeaker.

The terminal apparatus 6 includes an extension connector 67 for connecting another device to the terminal apparatus 6. In the exemplary embodiment, as shown in (d) of FIG. 3, the extension connector 67 is provided in the lower side surface of the housing 60. Any device may be connected to the extension connection 67. For example, a controller (a gun-shaped controller or the like) used for a specific game or an input device such as a keyboard may be connected to the extension connector 67. If another device does not need to be connected, the extension connector 67 does not need to be provided.

In the terminal apparatus 6 shown in FIG. 3, the shapes of the operation buttons and the housing 60, the number of the respective components, and the positions in which the components are provided are merely examples. The shapes, numbers, and positions may be different from those described above.

Next, with reference to FIG. 5, the internal configuration of the terminal apparatus 6 is described. FIG. 5 is a block diagram showing an example of the internal configuration of the terminal apparatus 6. As shown in FIG. 5, the terminal apparatus 6 includes, in addition to the components shown in FIG. 3, a touch panel controller 601, a magnetic sensor 602, a gyro sensor 604, a user interface controller (UI controller) 605, a codec LSI 606, loudspeakers 607, a sound IC 608, a microphone 609, a wireless module 610, an antenna 611, an infrared communication module 612, a flash memory 613, a power supply IC 614, a battery 615, and a vibrator 619. These electronic components are mounted on an electronic circuit board and accommodated in the housing 60.

The UI controller 605 is a circuit for controlling data input to various input/output sections and data output from various input/output sections. The UI controller 605 is connected to the touch panel controller 601, the analog stick 63 (the analog sticks 63A and 63B), the operation button 64 (the operation buttons 64A through 64L), the marker section 65, the magnetic sensor 602, the acceleration sensor 603, the gyro sensor 604, and the vibrator 619. Further, the UI controller 605 is connected to the codec LSI 606 and the extension connector 67. The power supply IC 614 is connected to the UI controller 605, so that power is supplied to the respective components through the UI controller 605. The internal battery 615 is connected to the power supply IC 614, so that power is supplied from the battery 615. Further, a battery charger 616 or a cable, which is supplied with power from an external power supply, may be connected to the power supply IC 614 via a connector or the like. In this case, the terminal apparatus 6 can be supplied with power and charged from the external power supply using the battery charger 616 or the cable. Charging of the terminal apparatus 6 may be performed by setting the terminal apparatus 6 on a cradle (not shown) having a charging function.

The touch panel controller 601 is a circuit which is connected to the touch panel 62 and controls the touch panel 62. The touch panel controller 601 generates a predetermined form of touch position data, on the basis of a signal from the touch panel 62, and outputs the touch position data to the UI controller 605. The touch position data represents coordinates of a position at which an input is performed on an input surface of the touch panel 62. The touch panel controller 601 reads a signal from the touch panel 62 and generates touch position data every predetermined period of time. Further, various control instructions on the touch panel 62 are output from the UI controller 605 to the touch panel controller 601.

The analog stick 63 outputs, to the UI controller 605, stick data representing a direction in which the stick part operated by a finger of the user slides (or tilts), and the amount of the sliding (tilting). The operation button 64 outputs, to the UI controller 605, operation button data representing an input state of each of the operation buttons 64A through 64L (whether or not the operation button is pressed).

The magnetic sensor 602 detects the magnitude and direction of a magnetic field to detect an orientation. Orientation data representing the detected orientation is output to the UI controller 605. The UI controller 605 outputs, to the magnetic sensor 602, a control instruction for the magnetic sensor 602. Examples of the magnetic sensor 602 include: an MI (Magnetic Impedance) sensor, a fluxgate sensor, a hall sensor, a GMR (Giant Magneto Resistance) sensor, a TMR (Tunneling Magneto Resistance) sensor, and an AMR (Anisotropic Magneto Resistance) sensor. Any sensor, however, may be adopted as long as the sensor can detect an orientation. Strictly speaking, the obtained orientation data does not represent an orientation in a place where a magnetic field is generated in addition to the geomagnetism. Even in such a case, it is possible to calculate a change in the attitude of the terminal apparatus 6 because the orientation data changes when the terminal apparatus 6 moves.

The acceleration sensor 603 is provided inside the housing 60. The acceleration sensor 603 detects the magnitudes of linear accelerations along three axial directions (the x-axis, y-axis, and z-axis directions shown in (a) of FIG. 3). Specifically, in the acceleration sensor 603, the long side direction of the housing 60 is defined as the x-axis direction (in the state where the marker section 65 is placed above the LCD 61, the right direction along the long side direction when facing the display screen of the LCD 61 is defined as an x-axis positive direction), the short side direction of the housing 60 is defined as the y-axis direction (in the state where the marker section 65 is placed above the LCD 61, the up direction along the short side direction when facing the display screen of the LCD 61 is a y-axis positive direction), and the direction orthogonal to the front surface of the housing 60 is defined as the z-axis direction (the perspective direction of the display screen of the LCD 61 is defined as a z-axis positive direction), thereby detecting the magnitudes of the linear accelerations in the respective axis directions. Acceleration data representing the detected accelerations is output to the UI controller 605. The UI controller 605 outputs, to the acceleration sensor 603, a control instruction for the acceleration sensor 603. In the exemplary embodiment, the acceleration sensor 603 is, for example, an electrostatic capacitance type MEMS acceleration sensor. In another embodiment, however, another type of acceleration sensor may be used. Further, the acceleration sensor 603 may be an acceleration sensor for detecting the magnitude of acceleration in one axial direction or two axial directions.

The gyro sensor 604 is provided inside the housing 60. The gyro sensor 604 detects the angular velocities about the three axes (the x, y, and z axes described above). Angular velocity data representing the detected angular velocities is output to the UI controller 605. The UI controller 605 outputs, to the gyro sensor 604, a control instruction for the gyro sensor 604. Any number and any combination of gyro sensors may be used as long as the angular velocities about three axes are detected. The gyro sensor 604 may be constituted by a two-axis gyro sensor and a one-axis gyro sensor. Alternatively, the gyro sensor 604 may be a gyro sensor for detecting the angular velocity about one axis or two axes.

The vibrator 619 is, for example, a vibration motor or a solenoid. The vibrator 619 is connected to the UI controller 605. The terminal apparatus 6 is vibrated by actuating the vibrator 619 in accordance with a control instruction outputted from the UI controller 605 to the vibrator 619. The vibration of the terminal apparatus 6 is transmitted to the user's hand holding the terminal apparatus 6. Thus, a so-called vibration-feedback game is achieved.

The UI controller 605 outputs, to the codec LSI 606, the operation data including the touch position data, the stick data, the operation button data, the orientation data, the acceleration data, and the angular velocity data, which have been received from the respective components. If another device is connected to the terminal apparatus 6 through the extension connector 67, data representing operation to said another device may be included in the operation data.

The codec LSI 606 is a circuit for performing a compression process on data to be transmitted to the game apparatus body 5, and a decompression process on data transmitted from the game apparatus body 5. The LCD 61, the camera 66, the sound IC 608, the wireless module 610, the flash memory 613, and the infrared communication module 612 are connected to the codec LSI 606. The codec LSI 606 includes a CPU 617 and an internal memory 618. Although the terminal apparatus 6 is configured not to perform game processing, the terminal apparatus 6 may execute a program for managing the terminal apparatus 6 or a program for communication. For example, a program stored in the flash memory 613 is loaded into the internal memory 618 and executed by the CPU 617 when the terminal apparatus 6 is powered on, thereby starting up the terminal apparatus 6. A part of the area of the internal memory 618 is used as a VRAM for the LCD 61.

The camera 66 takes an image in accordance with an instruction from the game apparatus body 5, and outputs data of the taken image to the codec LSI 606. The codec LSI 606 outputs, to the camera 66, a control instruction for the camera 66, such as an instruction to take an image. The camera 66 is also capable of taking a moving picture. That is, the camera 66 is capable of repeatedly performing image taking, and repeatedly outputting image data to the codec LSI 606.

The sound IC 608 is connected to the loudspeakers 607 and the microphone 609. The sound IC 608 is a circuit for controlling input of sound data from the microphone 609 to the codec LSI 606 and output of sound data from the codec LSI 606 to the loudspeakers 607. Specifically, when the sound IC 608 receives sound data from the codec LSI 606, the sound IC 608 performs D/A conversion on the sound data, and outputs a resultant sound signal to the loudspeakers 607 to cause the loudspeakers 607 to output a sound. The microphone 609 detects sound (such as user's voice) propagated to the terminal apparatus 6, and outputs a sound signal representing the sound to the sound IC 608. The sound IC 608 performs A/D conversion on the sound signal from the microphone 609, and outputs a predetermined form of sound data to the codec LSI 606.

The codec LSI 606 transmits the image data from the camera 66, the sound data from the microphone 609, and the operation data from the UI controller 605 (terminal operation data), to the game apparatus body 5 through the wireless module 610. In the exemplary embodiment, the codec LSI 606 subjects the image data and the sound data to a compression process similar to that performed by the codec LSI 27. The compressed image data and sound data, and the terminal operation data are output to the wireless module 610 as transmission data. The antenna 611 is connected to the wireless module 610, and the wireless module 610 transmits the transmission data to the game apparatus body 5 through the antenna 611. The wireless module 610 has the same function as the terminal communication module 28 of the game apparatus body 5. That is, the wireless module 610 has a function of connecting to a wireless LAN by a method based on, for example, the IEEE 802.11n standard. The data transmitted from the wireless module 610 may be encrypted where necessary, or may not be encrypted.

As described above, the transmission data transmitted from the terminal apparatus 6 to the game apparatus body 5 includes the operation data (terminal operation data), the image data, and the sound data. If another device is connected to the terminal apparatus 6 through the extension connector 67, data received from said another device may be included in the transmission data. The infrared communication module 612 performs, with another device, infrared communication based on, for example, the IRDA standard. The codec LSI 606 may include, in the transmission data, data received by the infrared communication, and transmit the transmission data to the game apparatus body 5, where necessary.

As described above, the compressed image data and sound data are transmitted from the game apparatus body 5 to the terminal apparatus 6. These data are received by the codec LSI 606 through the antenna 611 and the wireless module 610. The codec LSI 606 decompresses the received image data and sound data. The decompressed image data is output to the LCD 61, and an image according to the image data is displayed on the LCD 61. On the other hand, the decompressed sound data is output to the sound IC 608, and a sound based on the sound data is output from the loudspeakers 607.

When control data is included in the data received from the game apparatus body 5, the codec LSI 606 and the UI controller 605 make control instructions for the respective components, according to the control data. As described above, the control data represents control instructions for the respective components (in the exemplary embodiment, the camera 66, the touch panel controller 601, the marker section 65, the sensors 602 to 604, the vibrator 619, and the infrared communication module 612) included in the terminal apparatus 6. In the exemplary embodiment, the control instructions represented by the control data are considered to be instructions to start and halt (stop) the operations of the above components. That is, some components which are not used for a game may be halted to reduce power consumption. In this case, data from the halted components are not included in the transmission data transmitted from the terminal apparatus 6 to the game apparatus body 5. The marker section 65 is constituted by infrared LEDs, and therefore, the marker section 65 is controlled by simply turning on/off the supply of power thereto.

As described above, the terminal apparatus 6 includes the operation means such as the touch panel 62, the analog sticks 63, and the operation buttons 64. Alternatively, in another embodiment, the terminal apparatus 6 may include other operation means instead of or in addition to these operation means.

The terminal apparatus 6 includes the magnetic sensor 602, the acceleration sensor 603, and the gyro sensor 604 as sensors for calculating the movement (including the position and the attitude, or a change in the position or the attitude) of the terminal apparatus 6. Alternatively, in another embodiment, the terminal apparatus 6 may include one or two of these sensors. In still another embodiment, the terminal apparatus 6 may include other sensors instead of or in addition to these sensors.

The terminal apparatus 6 includes the camera 66 and the microphone 609. Alternatively, in another embodiment, the terminal apparatus 6 may not include the camera 66 and the microphone 609, or may include either of the camera 66 and the microphone 609.

The terminal apparatus 6 includes the marker section 65 as a component for calculating the positional relation between the terminal apparatus 6 and the controller 7 (such as the position and/or the attitude of the terminal apparatus 6 as viewed from the controller 7). Alternatively, in another embodiment, the terminal apparatus 6 may not include the marker section 65. In still another embodiment, the terminal apparatus 6 may include other means as a component for calculating the above positional relation. For example, the controller 7 may include a marker section, and the terminal apparatus 6 may include an image pickup element. In this case, the marker 8 may include an image pickup element instead of an infrared LED.

Figure 6:
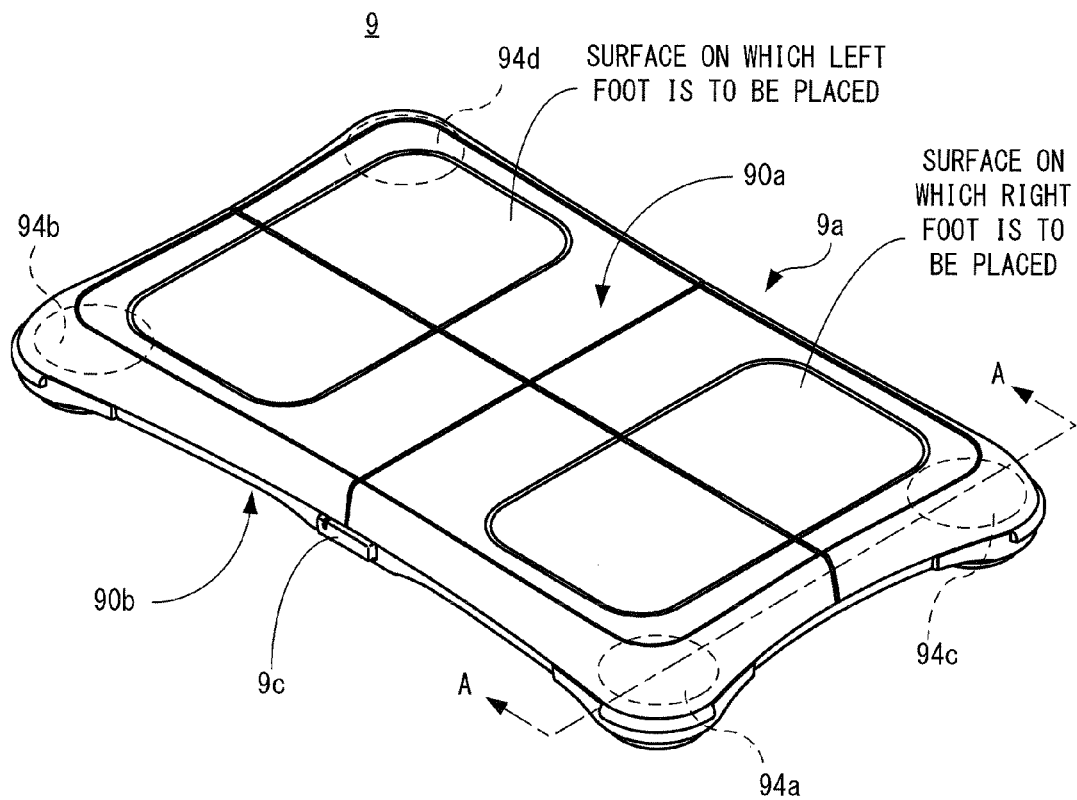
FIG. 6 is a perspective view showing a non-limiting example of the appearance of a board-type controller 9 of FIG. 1.
Figure 7:
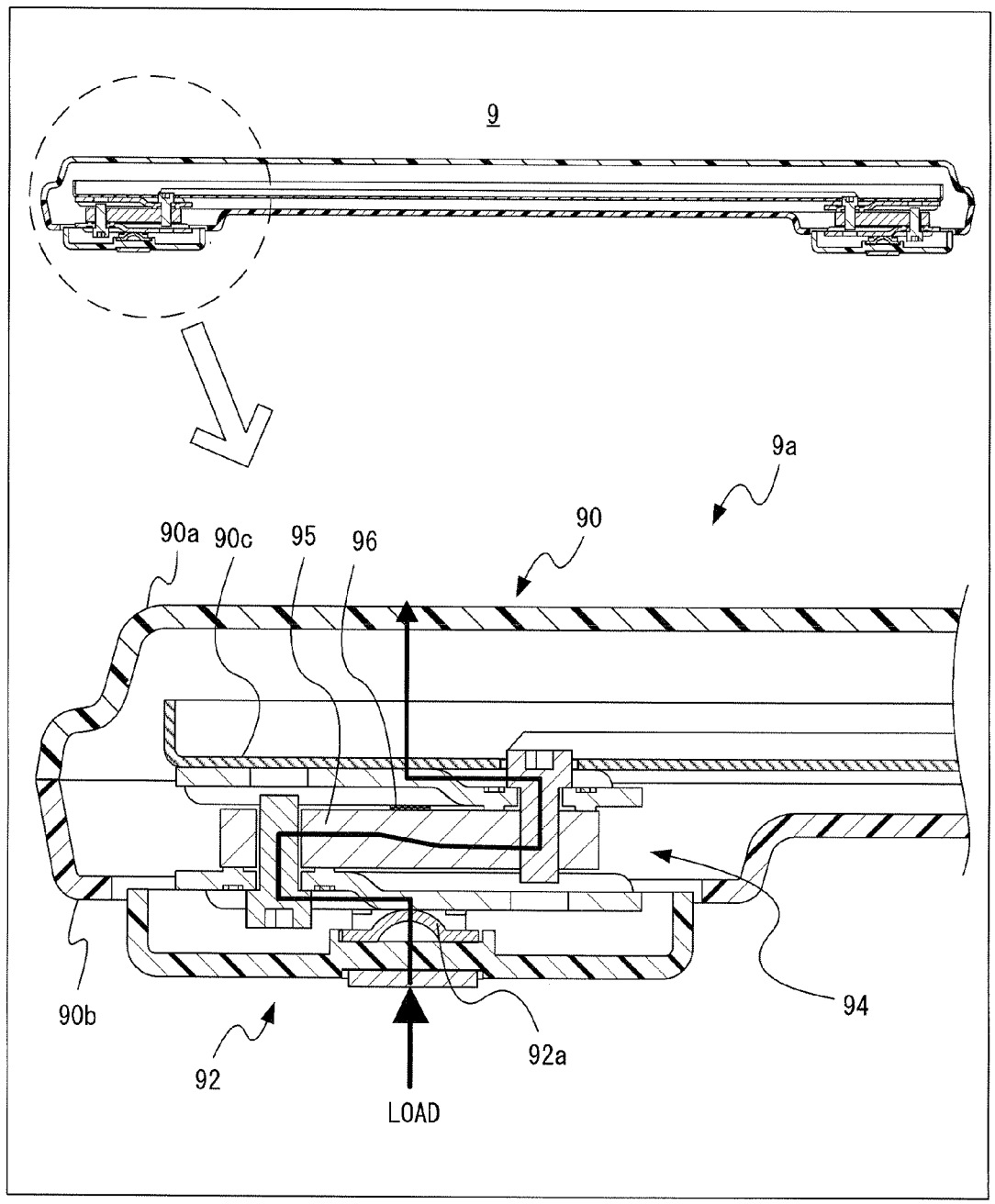
FIG. 7 is a diagram showing a non-limiting example of a cross-sectional view of the board-type controller 9 shown in FIG. 6 taken along line A-A, and a non-limiting example of an enlarged view of a corner portion where a load sensor 94 is arranged.
Figure 8:
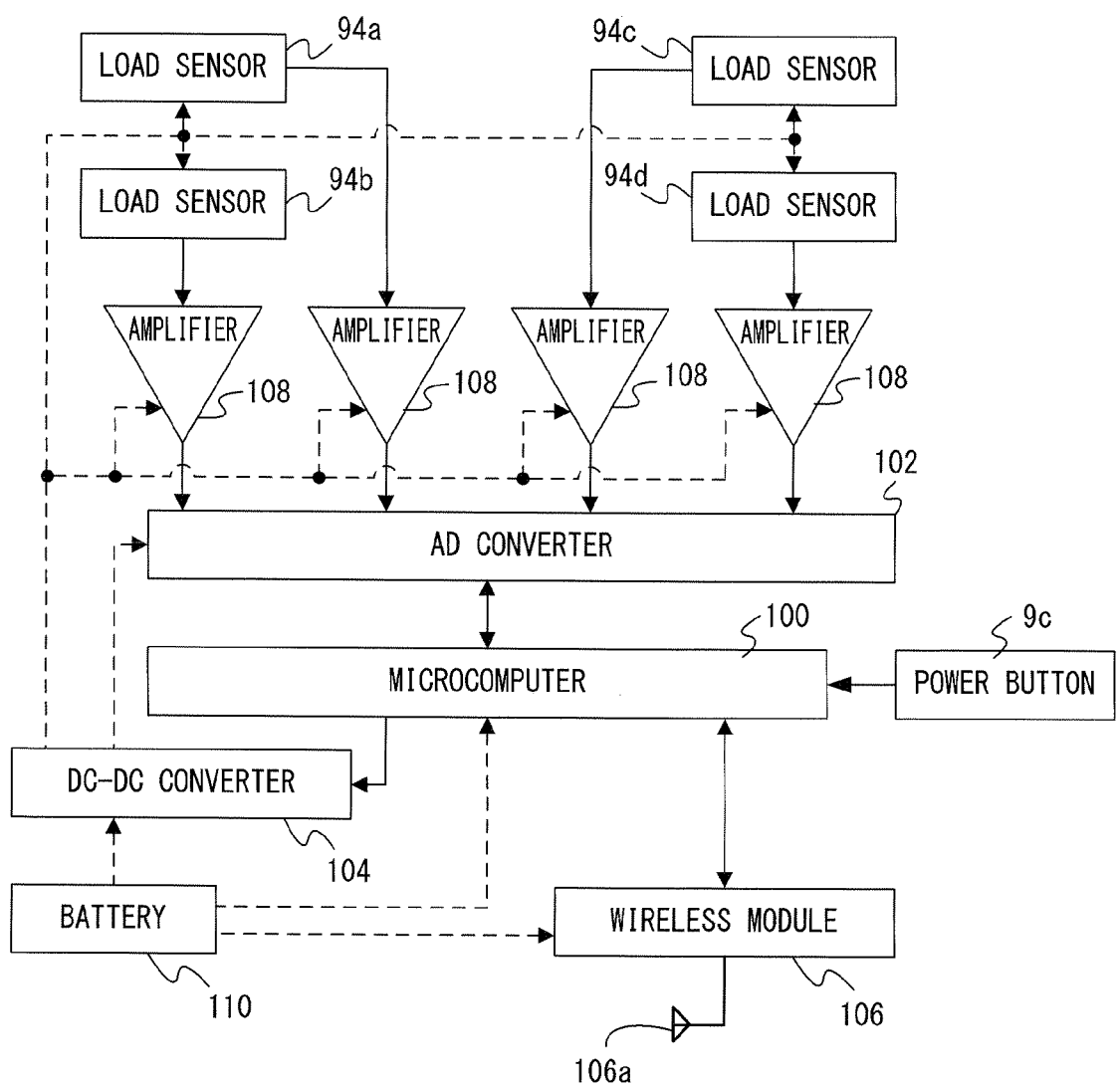
FIG. 8 is a block diagram showing a non-limiting example of the electrical configuration of the board-type controller 9 of FIG. 6.

Next, with reference to FIGS. 6 through 8, the configuration of the board-type controller 9 is described. FIG. 6 is a perspective view illustrating an example of the appearance of the board-type controller 9 shown in FIG. 1. As shown in FIG. 6, the board-type controller 9 includes a platform 9a on which a user stands (on which the user places their feet), and at least four load sensors 94a through 94d for detecting a load applied to the platform 9a. Each of the load sensors 94a through 94d is embedded in the platform 9a (see FIG. 7), and the positions where the load sensors 94a through 94d are provided are indicated by dotted lines in FIG. 6. In the following description, the four load sensors 94a through 94d may be collectively referred to as a load sensor 94.

The platform 9a is formed in the shape of substantially a rectangular parallelepiped, and is in the shape of substantially a rectangle as viewed from the top. For example, the short side of the rectangular shape of the platform 9a is approximately 30 cm, and the long side thereof is approximately 50 cm. The upper surface of the platform 9a is flat, and has a pair of planes on which the user stands with the bottoms of their feet contacting thereto. Specifically, the upper surface of the platform 9a has a plane (a back-left region enclosed with a double line in FIG. 6) on which the user's left foot is placed, and a plane (a front-right region enclosed with a double line in FIG. 6) on which the user's right foot is placed. The platform 9a has, at four corners thereof, side surfaces each partially projecting outward in a cylindrical shape.

In the platform 9a, the four load sensors 94a through 94d are arranged at predetermined intervals. In the exemplary embodiment, the four load sensors 94a through 94d are arranged on the periphery of the platform 9a, more specifically, at the four corners of the platform 9a. The intervals of the load sensors 94a through 94d are appropriately set such that the load sensors 94a through 94d can accurately detect the intention of a game operation which is expressed by a manner of applying a load to the platform 9a by the user.

FIG. 7 shows an example of a cross-sectional view of the board-type controller 9, taken along line A-A in FIG. 6, and an example of an enlarged view of a corner part where a load sensor 94 is arranged. In FIG. 7, the platform 9a includes a support plate 90 on which the user stands, and legs 92. The load sensors 94a through 94d are provided in positions where the legs 92 are provided. In the exemplary embodiment, the four legs 92 are provided at the four corners, and therefore, the four load sensors 94a through 94d are also provided at the corresponding four corners. Each leg 92 is formed by plastic molding in the shape of substantially a cylinder with a base. Each load sensor 94 is located on a spherical part 92a provided on the base of the corresponding leg 92. The support plate 90 is supported by the legs 92 via the load sensors 94.

The support plate 90 includes an upper plate 90a forming an upper surface and an upper side surface portion, a lower plate 90b forming a lower surface and a lower side surface portion, and an intermediate plate 90c provided between the upper plate 90a and the lower plate 90b. The upper plate 90a and the lower plate 90b are formed by, for example, plastic molding, and are integrated using an adhesive or the like. The intermediate plate 90c is, for example, formed of a single metal plate by press forming. The intermediate plate 90c is fixed onto the four load sensors 94a through 94d. The upper plate 90a has, on a lower surface thereof, a grid-patterned rib (not shown), and is supported by the intermediate plate 90c via the rib. Therefore, when the user stands on the platform 9a, the load is transferred to the four legs 92 via the support plate 90 and the load sensors 94a through 94d. As indicated by arrows in FIG. 7, a reaction from a floor, which is generated by the input load, is transferred from the legs 92 through the spherical parts 92a, the load sensors 94a through 94d and the intermediate plate 90c to the upper plate 90a.

Each load sensor 94 is, for example, a strain gauge (strain sensor) load cell, which is a load converter for converting an input load to an electrical signal. In the load sensor 94, a strain-generating body 95 is deformed according to an input load, resulting in a strain. The strain is converted into a change of electrical resistance and then converted into a change of voltage by a strain sensor 96 attached to the strain-generating body 95. Therefore, the load sensor 94 outputs, from an output terminal thereof, a voltage signal indicating the input load.

The load sensor 94 may be of other types, such as a tuning fork type, a string vibration type, an electrostatic capacitance type, a piezoelectric type, a magnetostrictive type, and a gyroscopic type.

Referring back to FIG. 6, the board-type controller 9 further includes a power button 9c. When the power button 9c is operated (e.g., when the power button 9c is pressed) in the state where the board-type controller 9 is not activated, power is supplied to each of circuit components (see FIG. 8) of the board-type controller 9. There are, however, cases in which the board-type controller 9 is powered on in accordance with an instruction from the game apparatus body 5 and thereby supply of power to the circuit components is started. The board-type controller 9 may be automatically powered off when a state where the user does not stand thereon continues for a predetermined period of time (e.g., 30 sec) or more. Further, when the power button 9c is again operated in the state where the board-type controller 9 is in the active state, the board-type controller 9 may be powered off to stop supply of power to the circuit components.

FIG. 8 is a block diagram showing an example of an electrical configuration of the board-type controller 9. In FIG. 8, flows of signals and data are indicated by solid arrows, and supply of power is indicated by dotted arrows.

As shown in FIG. 8, the board-type controller 9 includes a microcomputer 100 for controlling the operation thereof. The microcomputer 100 includes a CPU, a ROM, a RAM, and the like, which are not shown. The CPU controls the operation of the board-type controller 9 in accordance with a program stored in the ROM.

The power button 9c, an AD converter 102, a DC-DC converter 104, and a wireless module 106 are connected to the microcomputer 100. An antenna 106a is connected to the wireless module 106. The four load sensors 94a through 94d are connected to the AD converter 102 via amplifiers 108.

Further, the board-type controller 9 includes a battery 110 for supplying power to the circuit components. In another embodiment, an AC adapter may be connected to the board-type controller 9 instead of the battery 110 so that commercial power is supplied to the circuit components. In this case, instead of the DC-DC converter 104, a power circuit, which converts alternating current into direct current and lowers and rectifies a direct-current voltage, needs to be provided in the board-type controller 9. In the exemplary embodiment, power is supplied directly from the battery 110 to the microcomputer 100 and the wireless module 106. In other words, power is constantly supplied from the battery 110 to the wireless module 106 and some components (such as the CPU) in the microcomputer 100 to detect whether or not the power button 9c is turned on and whether or not a command that instructs power-on is transmitted from the game apparatus body 5. On the other hand, power is supplied from the battery 110 through the DC-DC converter 104 to the load sensors 94a through 94d, the AD converter 102, and the amplifiers 108. The DC-DC converter 104 converts a voltage value of direct current supplied from the battery 110 into a different voltage value, and supplies the resultant direct current to the load sensors 94a through 94d, the AD converter 102, and the amplifiers 108.

Supply of power to the load sensors 94a through 94d, the A/D converter 102 and the amplifiers 108 may be performed where necessary by the microcomputer 100 that controls the DC-DC converter 104. Specifically, when the microcomputer 100 determines that it is necessary to operate the load sensors 94a through 94d to detect a load, the microcomputer 100 may control the DC-DC converter 104 to supply power to the load sensors 94a through 94d, the A/D converter 102 and the amplifiers 108.

When power is supplied to the load sensors 94a through 94d, the load sensors 94a through 94d each output a signal indicating a load inputted thereto. These signals are amplified by the respective amplifiers 108, and converted from analog signals into digital data by the A/D converter 102. The digital data is input to the microcomputer 100. The detected values of the load sensors 94a through 94d are given identification information of the load sensors 94a through 94d, so that the load sensors 94a through 94d can be identified from the corresponding detected values. Thus, the microcomputer 100 can acquire the data indicating the detected load values of the four load sensors 94a through 94d at the same time.

On the other hand, when the microcomputer 100 determines that it is not necessary to operate the load sensors 94a through 94d, i.e., when it is not the time for load detection, the microcomputer 100 controls the DC-DC converter 104 to stop supply of power to the load sensors 94a through 94d, the A/D converter 102, and the amplifiers 108. Thus, the board-type controller 9 can operate the load sensors 94a through 94d to detect a load or a distance only when it is required, resulting in a reduction in power consumption for load detection.

Load detection is typically required when the game apparatus body 5 (FIG. 1) needs to acquire load data. For example, when game apparatus body 5 requires load information, the game apparatus body 5 transmits an information acquisition command to the board-type controller 9. When the microcomputer 100 receives the information acquisition command from the game apparatus body 5, the microcomputer 100 controls the DC-DC converter 104 to supply power to the load sensors 94a through 94d and the like, thereby detecting a load. On the other hand, when the microcomputer 100 does not receive a load acquisition command from the game apparatus body 5, the microcomputer 100 controls the DC-DC converter 104 to stop supply of power to the load sensors 94a through 94d and the like.

The microcomputer 100 may control the DC-DC converter 104 on the basis of a determination that the time of load detection arrives at predetermined intervals. When such periodic load detection is performed, information regarding the constant time period may be supplied and stored from the game apparatus body 5 to the microcomputer 100 of the board-type controller 9 when the game is started, or it may be preinstalled in the microcomputer 100.

The data indicating the detected values from the load sensors 94a through 94d are transmitted as board operation data (input data) for the board-type controller 9 from the microcomputer 100 via the radio module 106 and an antenna 106b to the game apparatus body 5. For example, when the microcomputer 100 has performed load detection according to a command from the game apparatus body 5, the microcomputer 100 transmits the detected value data of the load sensors 94a through 94d to the game apparatus body 5 on receipt of the detected value data from the A/D converter 102. The microcomputer 100 may transmit the detected value data to the game apparatus body 5 at predetermined intervals. If the interval of the data transmission is longer than the interval of the load detection, data containing load values which have been detected at a plurality of detection times up to the subsequent time of transmission may be transmitted.

The wireless module 106 is set so as to perform communication according to the same wireless standard (the Bluetooth, wireless LAN, and the like) as that for the controller communication module 19 of the game apparatus body 5. Accordingly, the CPU 10 of the game apparatus body 5 is allowed to transmit an information acquisition command to the board-type controller 9 through the controller communication module 19 and the like. Thus, the board-type controller 9 is allowed to receive the command from the game apparatus body 5 through the wireless module 106 and the antenna 106a. Further, the board-type controller 9 is allowed to transmit the board operation data including the load detection values (or load calculation values) of the load sensors 94a through 94d to the game apparatus body 5.

For example, in a game which is performed on the basis of a simple sum of four load values detected by the four load sensors 94a through 94d, the user is allowed to stand at a given position with respect to the four load sensors 94a through 94d of the board-type controller 9. That is, the user is allowed to stand on the platform 9a at a given position and in a given direction to play a game. In some kinds of games, however, the direction of a load value detected by each of the four load sensors 94 viewed from the user needs to be identified. That is, a positional relation between the four load sensors 94 of the board-type controller 9 and the user needs to be recognized. In this case, for example, the positional relation between the four load sensors 94 and the user may be defined in advance, and the user may be supposed to stand on the platform 9a in a manner which allows the predetermined positional relation. Typically, a positional relation in which two of the load sensors 94a through 94d are present in front of, behind, to the right of, and to the left of the user standing in the center of the platform 9a, i.e., a positional relation in which the user stands in the center of the platform 9a of the board-type controller 9, is defined. In this case, the platform 9a of the board-type controller 9 is rectangular in shape as viewed from the top, and the power button 9c is provided at one side (long side) of the rectangle. Therefore, it is ruled in advance that the user, using the power button 9c as a guide, stands on the platform 9a such that the long side at which the power button 9c is provided is located in a predetermined direction (front, rear, left or right). In this case, each of the load values detected by the load sensors 94a through 94d is a load value of a predetermined direction (front right, front left, rear right, or rear left) as viewed from the user. Therefore, the board-type controller 9 and the game apparatus body 5 can find out a direction to which each detected load value corresponds as viewed from the user, on the basis of the identification information of the load sensors 94 contained in the detected load value data, and arrangement data indicating the positions or the directions of the load sensors 94 with respect to the user that is set (stored) in advance. As a result, it is possible to understand the intention of a game operation performed by the user, such as an operating direction, for example, a forward, a backward, a leftward, or a rightward direction, or a user's foot being lifted.

Figure 9:
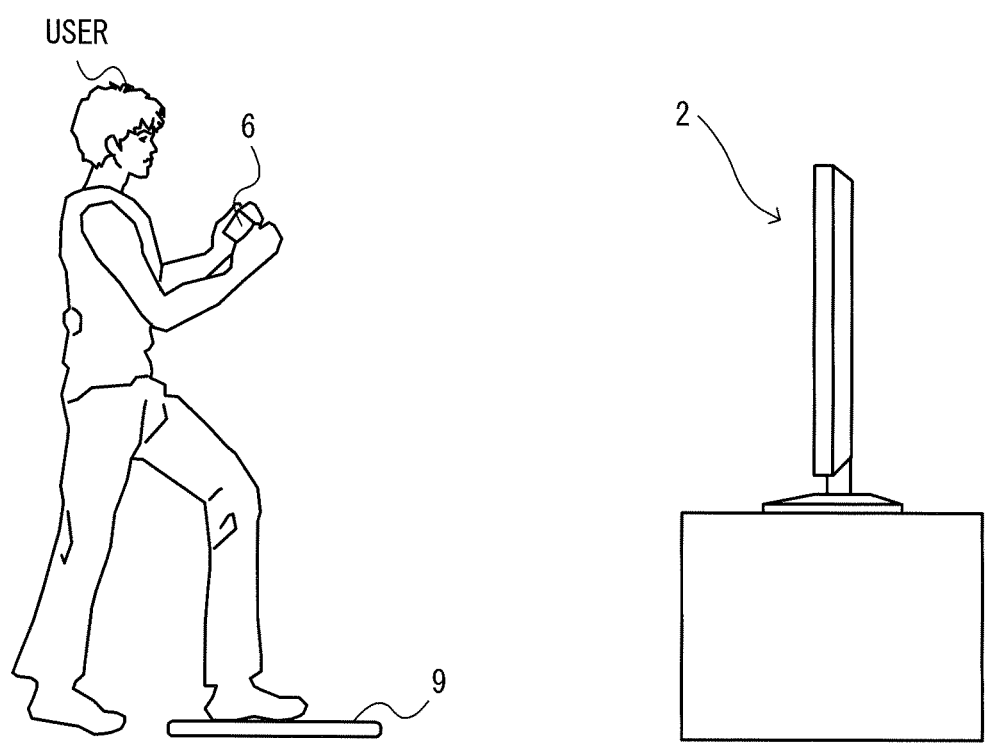
FIG. 9 is a diagram showing a non-limiting example of the state of a user performing an operation using the terminal apparatus 6 and the board-type controller 9.
Figure 10A:
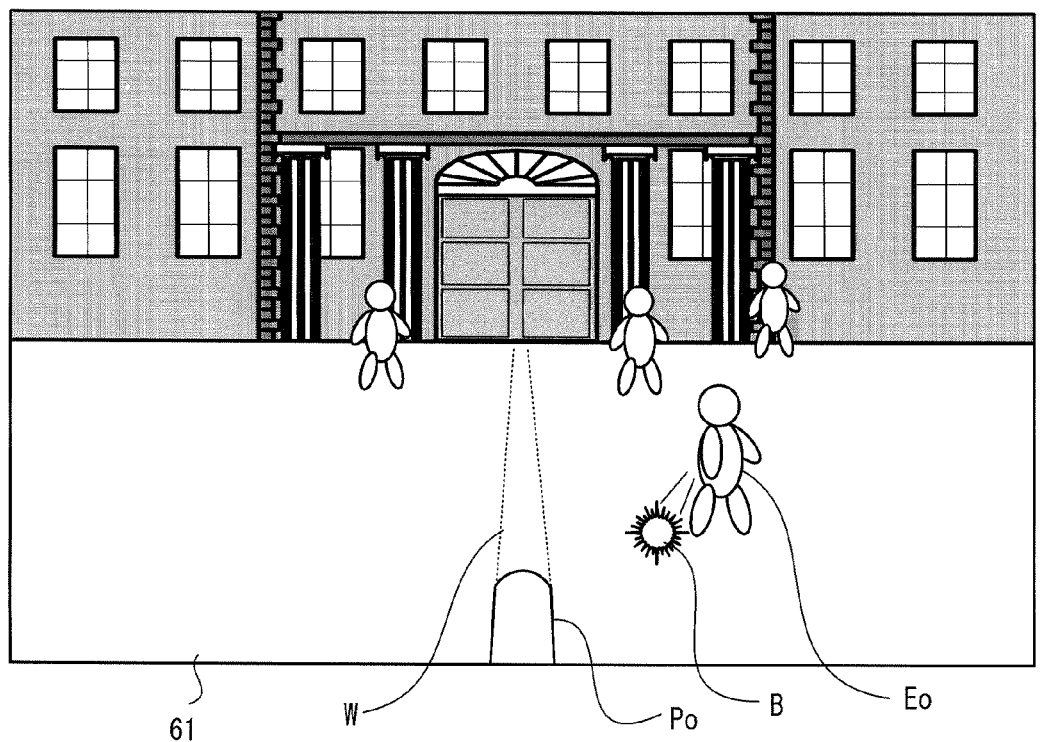
FIG. 10A is a diagram showing an example of an image displayed on an LCD 61 of the terminal apparatus 6.
Figure 10B:
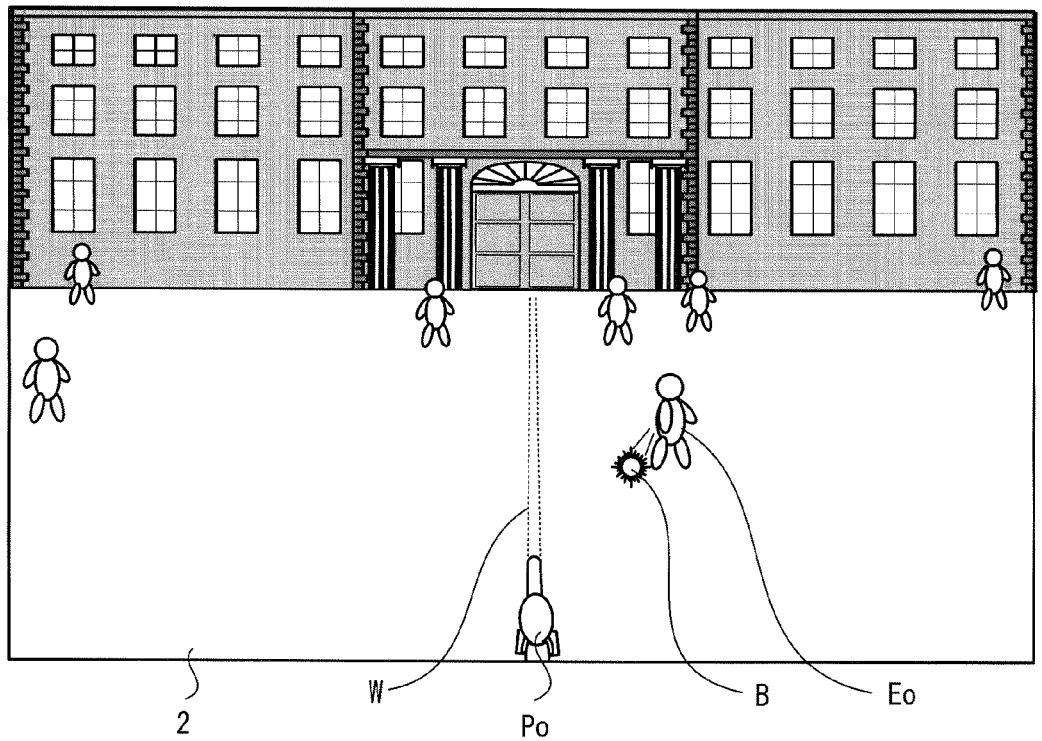
FIG. 10B is a diagram showing an example of an image displayed on a monitor 2.
Figure 11:
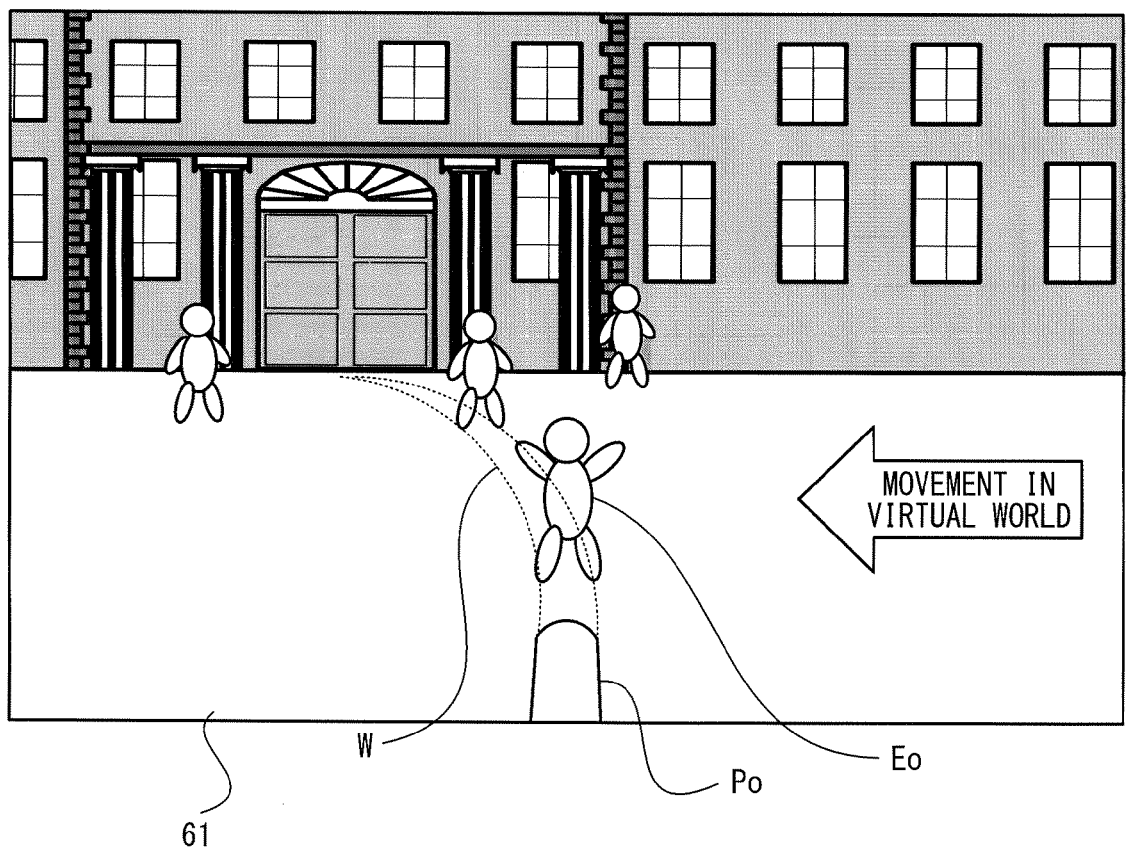
FIG. 11 is a diagram showing a non-limiting example where a terminal apparatus 6 has been rotated to the left and right, and a non-limiting example of an image displayed on the LCD 61.
Figure 11:
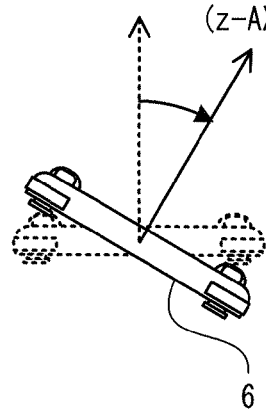
Figure 12:
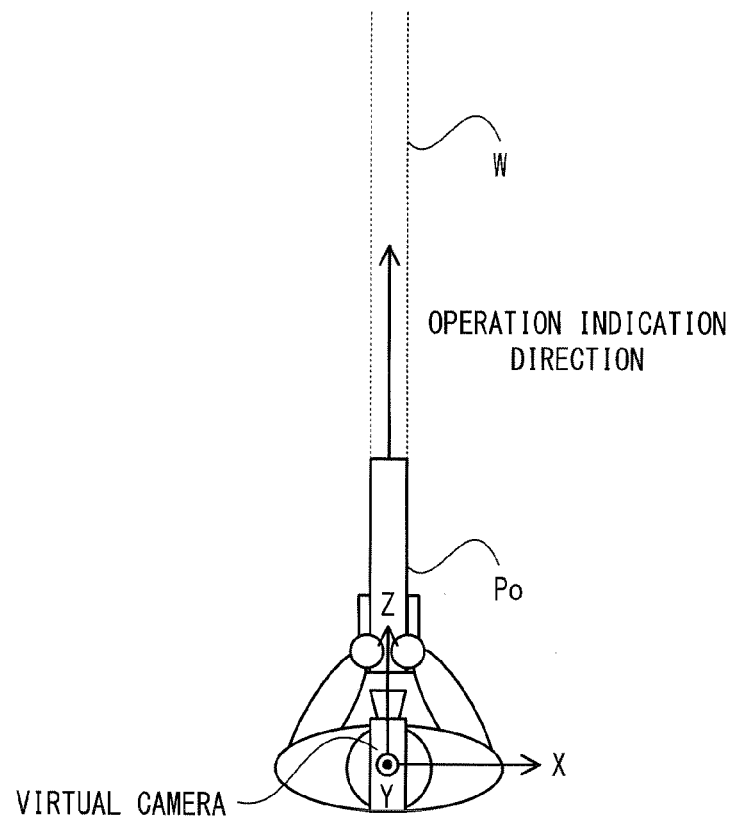
FIG. 12 is a diagram illustrating non-limiting examples of: the relationship between a terminal apparatus perspective direction projected onto a horizontal plane in real space and an operation indication direction projected onto a horizontal plane in a virtual world; and a player object Po controlled so as to be directed in a direction based on the operation indication direction.
Figure 12:
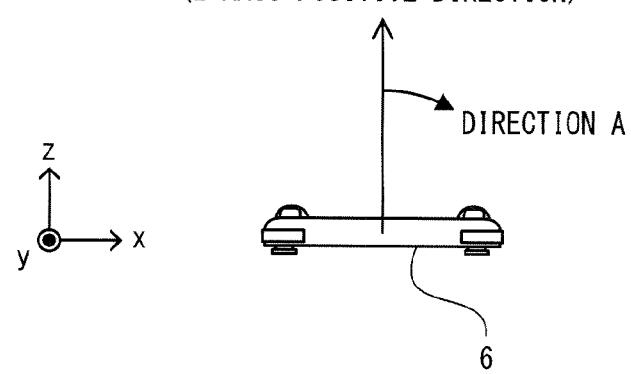
Figure 13:
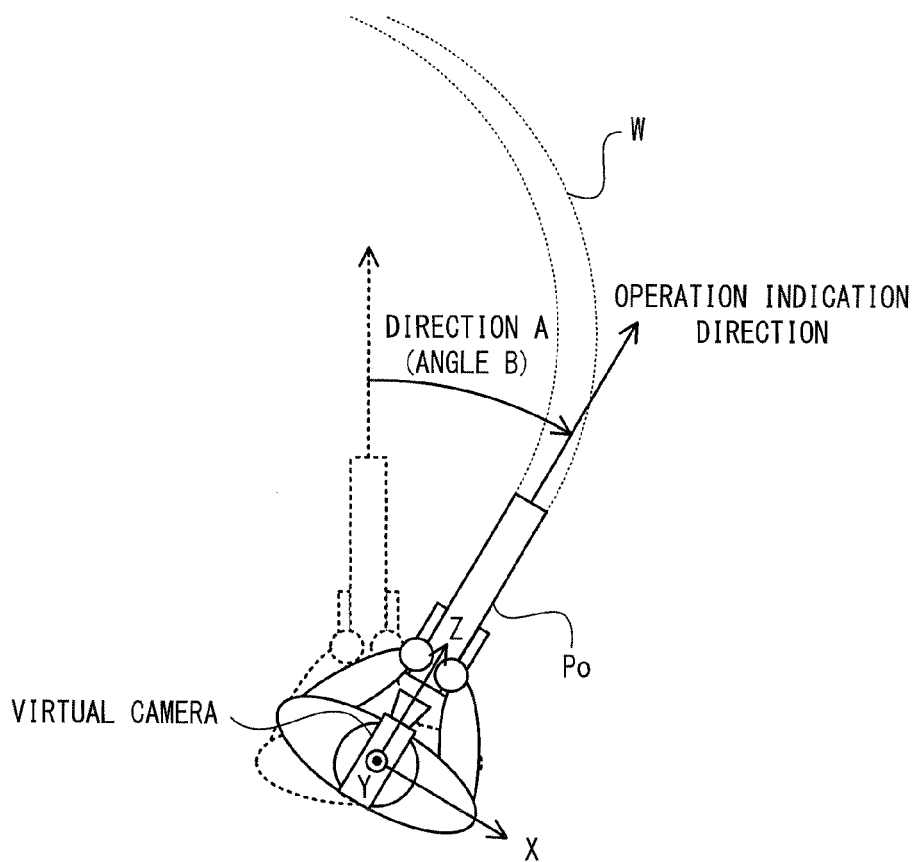
FIG. 13 is a diagram illustrating non-limiting examples of: the operation indication direction obtained by rotating the terminal apparatus 6 to the left and right; and the player object Po controlled so as to be directed in a direction based on the operation indication direction.
Figure 13:
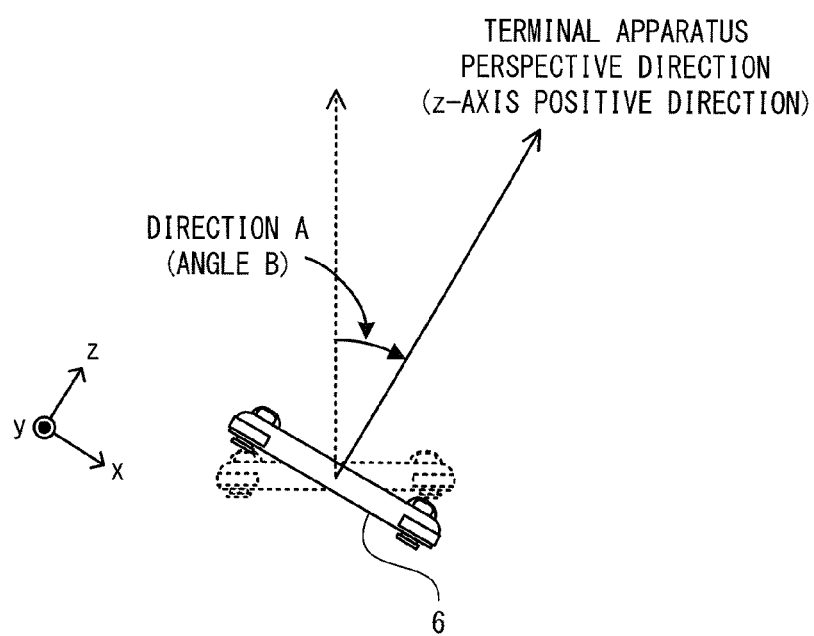
Figure 14A:
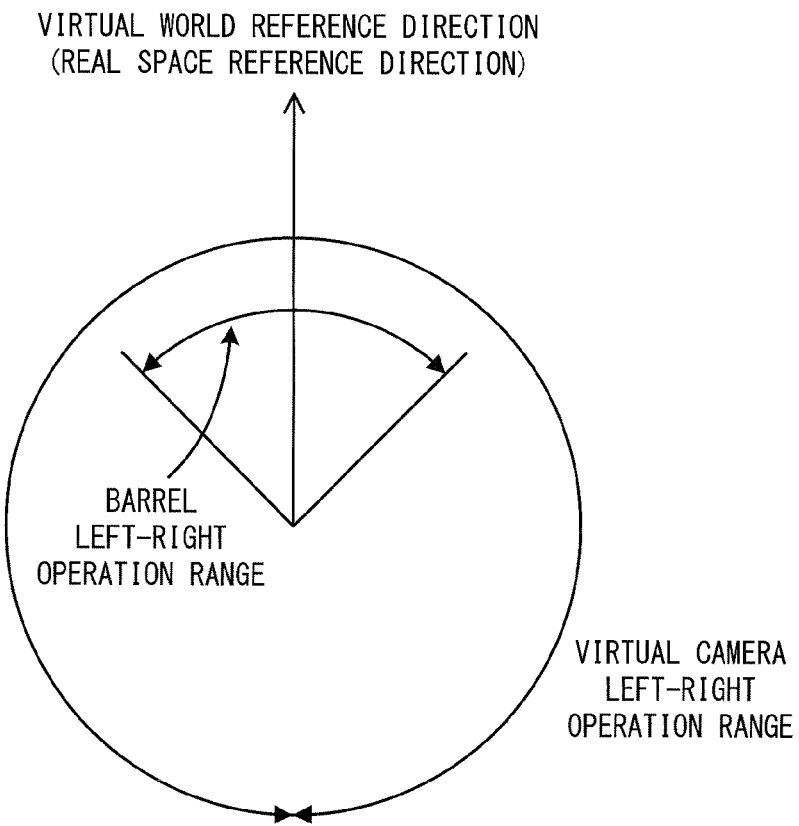
FIG. 14A is a diagram illustrating a non-limiting example of a barrel left-right operation range and a virtual camera left-right operation range.
Figure 14B:
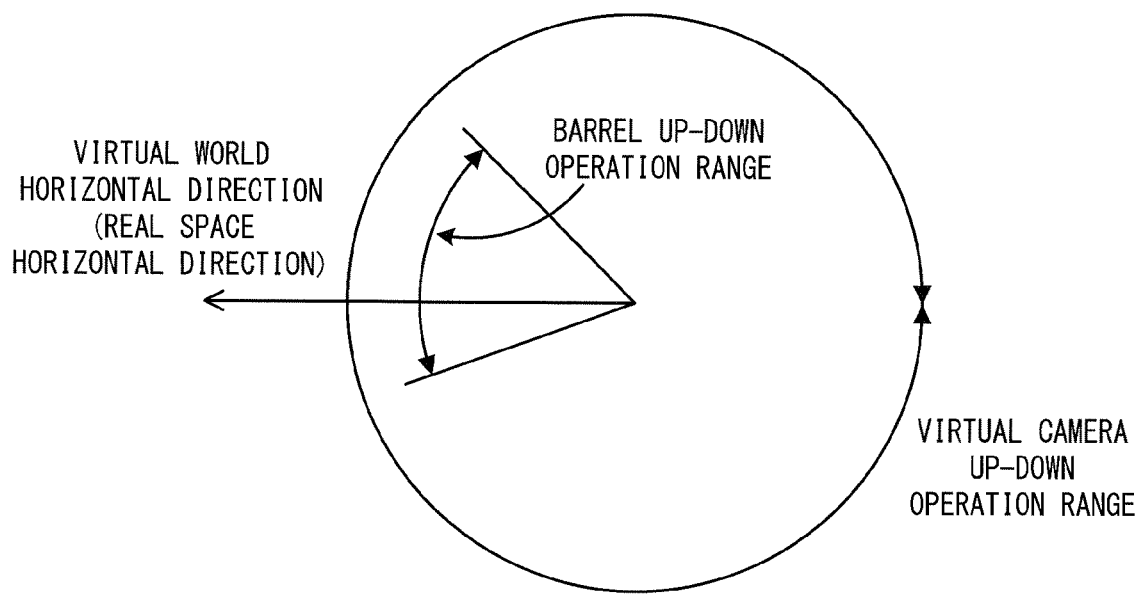
FIG. 14B is a diagram illustrating a non-limiting example of a barrel up-down operation range and a virtual camera up-down operation range.

Next, with reference to the drawings, a description is given of an overview of the information processing performed by the game apparatus body 5, before descriptions are given of specific processes performed by the game apparatus body 5. It should be noted that FIG. 9 is a diagram showing an example of the state of a user performing an operation using the terminal apparatus 6 and the board-type controller 9. FIG. 10A is a diagram showing an example of an image displayed on the LCD 61 of the terminal apparatus 6. FIG. 10B is a diagram showing an example of an image displayed on the monitor 2. FIG. 11 is a diagram showing an example where the terminal apparatus 6 has been rotated (yawed) to the left and right, and an example of an image displayed on the LCD 61. FIG. 12 is a diagram illustrating examples of: the relationship between a terminal apparatus perspective direction projected onto a horizontal plane in real space and an operation indication direction projected onto a horizontal plane in a virtual world; and a player object Po controlled so as to be directed in a direction based on the operation indication direction. FIG. 13 is a diagram illustrating examples of: the operation indication direction obtained by rotating (yawing) the terminal apparatus 6 to the left and right; and the player object Po controlled so as to be directed in a direction based on the operation indication direction. FIG. 14A is a diagram illustrating an example of a barrel left-right operation range and a virtual camera left-right operation range that are set in the left-right direction in the virtual world (or in real space). FIG. 14B is a diagram illustrating an example of a barrel up-down operation range and a virtual camera up-down operation range that are set in the up-down direction in the virtual world (or in real space).

As shown in FIG. 9, the user performs an operation using the terminal apparatus 6 and the board-type controller 9. The user performs the operation of changing the attitude and the direction of the terminal apparatus 6 and the operation of changing a load to be applied to the board-type controller 9. Specifically, the user places one foot on the board-type controller 9 while holding the terminal apparatus 6. Then, the user plays by taking action on the board-type controller 9 while viewing an image displayed on the monitor 2 or an image displayed on the LCD 61 of the terminal apparatus 6 (e.g., performing the operation of taking action so as to step with the one foot placed on the board-type controller 9, thereby increasing and decreasing a weight to be put on the one foot placed on the board-type controller 9), and also performing the operation of moving the terminal apparatus 6. Then, on the LCD 61 and the monitor 2 of the terminal apparatus 6, game images are represented such that a player object Po takes action in a virtual world (e.g., the action of changing its direction, and the action of discharging a discharge object) in accordance with the direction and the attitude of the terminal apparatus 6 held by the user and the action taken by the user on the board-type controller 9, and the attitude of a virtual camera set in the virtual world is changed in accordance with the direction of the player object Po.

As shown in FIG. 10A, on the LCD 61 of the terminal apparatus 6, the state of a player object Po shooting a water cannon in a virtual world is displayed from the first-person point of view of the player object Po. In the example shown in FIG. 10A, the virtual world viewed from the first-person point of view is displayed that includes an end portion of the water cannon (an end portion of a barrel) operated by the player object Po, and the state of the water cannon discharging water W, which is an example of a discharge object, is displayed. Further, a plurality of enemy objects Eo are also placed in the virtual world, and the state of one of the enemy objects Eo throwing an enemy bomb B at the player object Po is displayed. The virtual world viewed from the first-person point of view of the player object Po is thus displayed on the LCD 61, whereby the user, viewing the display on the LCD 61 while holding the terminal apparatus 6, can play a game from the same point of view as that of the player object Po. This makes it possible to provide a sense of presence in the virtual world.

In addition, as shown in FIG. 10B, also on the monitor 2, the same virtual world as the virtual world displayed on the LCD 61 is displayed. In the example shown in FIG. 10B, the state of the virtual world viewed from a position behind, above, and far from the player object Po operating the water cannon is displayed together with the player object Po. The state of the virtual world viewed from a position behind, above, and far from the player object Po is thus displayed on the monitor 2, whereby the user can easily understand the circumstance of the player object Po and the positional relationships among the player object Po and the enemy objects Eo, and another person viewing the state of the user playing the game can also enjoy viewing the attacking action of the player object Po.

It should be noted that in the example shown in FIG. 10B, on the monitor 2, the state of the virtual world is displayed that is viewed from a position behind, above, and far from the player object Po. Alternatively, the virtual world viewed from another point of view may be displayed on the monitor 2. The same virtual world may be displayed not only on the terminal apparatus 6 but also on the monitor 2, and images of the virtual world that are different from each other in the point of view may be displayed, whereby, in accordance with the state of the operation or preference, the user can appropriately use either one of the images displayed on the two display apparatuses when performing an operation. For example, if, in contrast to the image viewed from the first-person point of view of the player object Po and displayed on the terminal apparatus 6, a virtual camera (second virtual camera) for displaying the virtual world on the monitor 2 is set at a position away from the player object Po so that a range wider than the range of the virtual world displayed on the terminal apparatus 6 is displayed on the monitor 2, the position of the virtual camera may not need to be behind, above, and far from the player object Po. Specifically, the virtual camera for displaying the virtual world on the monitor 2 may be set at a position of viewing the player object Po from a bird's-eye view or a position of looking down upon it.

As an example, when the user has taken the action of putting weight on the board-type controller 9 with one foot, the player object Po takes the action of discharging the water W from the water cannon. At this time, the greater the load applied to the board-type controller 9 by the user, the greater the amount of water in which the water W is to be discharged, and the greater the discharge velocity at which the water W is to be discharged. Further, when the amount of change in the increase in the load applied to the board-type controller 9 has become equal to or greater than a predetermined threshold, a discharge object different from the water W (e.g., a large ball formed of a mass of water having a greater amount than that of the water W) is discharged from the water cannon. Furthermore, when the user has taken the action of decreasing a weight to be put on the board-type controller 9 (e.g., changing the weight to 0), the player object Po takes the action of stopping the water W that is being discharged from the water cannon. The user can thus control the action of the player object Po discharging the discharge object (i.e., the presence or absence of the discharge of the discharge object, the amount of discharge and the discharge velocity in and at which the discharge object is to be discharged, and the type of the discharge object) by the action taken on the board-type controller 9, and therefore can perform an analog operation using the board-type controller 9.

For example, as described above, the board-type controller 9 outputs detected load values based on the action taken by the user on the board-type controller 9. Then, the use of the detected load values makes it possible to calculate the total load applied to the board-type controller 9. The use of the total load makes it possible to estimate whether the user is putting weight on the board-type controller 9, or is decreasing the weight put on the board-type controller 9. Further, the use of the total load also makes it possible to calculate the magnitude of the load applied to the board-type controller 9 by the user, and the amount of change in the load applied to the board-type controller 9. The action of the player object Po discharging the discharge object is set in accordance with the action of the user thus estimated on the board-type controller 9.

In addition, in accordance with the attitude (direction) of the terminal apparatus 6 held by the user, the direction in which the player object Po views the virtual world (i.e., the direction of the line of sight of a virtual camera placed at the first-person point of view of the player object Po) changes, and also the direction in which the player object Po discharges the discharge object (e.g., the water W) (the direction of the barrel of the water cannon) changes. For example, in accordance with the user directing the back surface of the terminal apparatus 6 upward, downward, leftward, and rightward, that is, directing the z-axis positive direction, which is the perspective direction of the LCD 61 (a terminal apparatus perspective direction), upward, downward, leftward, and rightward, also the direction in which the water cannon discharges the discharge object changes upward and leftward and to the left and right in the virtual world. Further, in accordance with the user directing the terminal apparatus perspective direction of the terminal apparatus 6 upward, downward, leftward, and rightward, also the direction of the line of sight of the virtual camera changes upward and leftward and to the left and right. Consequently, also a game image displayed on the LCD 61 and viewed from the first-person point of view of the player object Po changes in accordance with the change in the direction of the line of sight. For example, as shown in FIG. 11, when the user has changed the direction of the terminal apparatus 6 such that the terminal apparatus perspective direction is directed rightward, the direction of the barrel of the water cannon in the virtual world changes to the right, and also the direction of the line of sight of the virtual camera in the virtual world changes to the right by the same angle. As is clear by comparing FIGS. 11 and 10A, this results in causing the virtual world to be displayed on the LCD 61 so as to scroll to the left, and causing the barrel of the water cannon to be displayed at a fixed position on the LCD 61 so as to have the same attitude. Then, if the water W is continuing to be discharged from the barrel of the water cannon, display is performed on the LCD 61 such that the water W is discharged in a meandering manner in the virtual world in accordance with the change in the direction of the barrel.

FIGS. 12 and 13 each show the attitude of the terminal apparatus 6 that is obtained by looking down upon real space, and the attitudes of the player object Po and the virtual camera that are obtained by looking down upon the virtual world. As shown in FIG. 12, a virtual camera (first virtual camera) for generating the virtual world to be displayed on the LCD 61 is placed at the first-person point of view of the player object Po that operates the water cannon in the virtual world. Then, an operation indication direction is calculated by reflecting on the virtual world the direction of the terminal apparatus perspective direction of the terminal apparatus 6 (the z-axis positive direction) in real space, and the direction of the barrel is set so as to coincide with the operation indication direction. Further, the attitude of the virtual camera is controlled such that the direction that coincides with the operation indication direction (i.e., the direction of the barrel) is the direction of the line of sight of the virtual camera (the Z-direction shown in the figures). The operation indication direction obtained by reflecting the terminal apparatus perspective direction on the virtual world is thus set so as to coincide with the direction of the line of sight of the virtual camera, whereby the direction in which the terminal apparatus 6 is directed upward, downward, leftward, and rightward in real space coincides with the direction in which the virtual camera is directed upward, downward, leftward, and rightward in the virtual world. This makes it possible to display on the LCD 61 an image as if peeping at the virtual world using the LCD 61 as a peep window.

The case is considered where the user has changed the direction of the terminal apparatus 6 such that the terminal apparatus perspective direction is directed rightward (the direction A shown in FIG. 12). For example, as shown in FIG. 13, the case is considered where the direction of the terminal apparatus 6 has changed such that the terminal apparatus perspective direction is directed in the direction A and by an angle B. In this case, the operation indication direction changes in the direction A and by the angle B also in the virtual world, in a similar manner to the change in the terminal apparatus perspective direction in real space. Then, also the direction of the barrel of the water cannon operated by the player object Po changes about a predetermined position in the virtual world (e.g., the first-person point of view of the player object Po, i.e., the position where the virtual camera is placed) in the direction A, which is the same as that of the change in the operation indication direction, and by the angle B. Further, also the direction of the line of sight of the virtual camera changes about a predetermined position in the virtual world (e.g., the position of the point of view of the virtual camera) in the direction A, which is the same as that of the change in the operation indication direction, and by the angle B.

Here, the range where the user is allowed to change the direction of the barrel of the water cannon may be limited in a predetermined range in advance. For example, as shown in FIG. 14A, a barrel left-right operation range, where the barrel can change its direction to the left and right in the virtual world, is set to a predetermined angular range about a virtual world reference direction (e.g., a range of 90° in total, which includes 45° to both the left and right of the virtual world reference direction, or a range of 180° in total, which includes 90° to both the left and right of the virtual world reference direction). It should be noted that the virtual world reference direction is a direction indicating the forward direction of the virtual world that corresponds to the forward direction of the user in real space (a real space reference direction), and is set, as an example, in accordance with an operation of the user. Further, as shown in FIG. 14B, a barrel up-down operation range, where the barrel can change its direction upward and downward in the virtual world, is set to a predetermined angular range with respect to the horizontal direction in the virtual world (the horizontal direction in real space) (e.g., a range of 55° in total, which includes 45° in the elevation direction from the horizontal direction in the virtual world and 10° in the depression direction from the horizontal direction in the virtual world). Then, if the operation indication direction is set outside the barrel left-right operation range and/or outside the barrel up-down operation range, the direction of the barrel is set in the barrel left-right operation range and/or in the barrel up-down operation range so as to be closest to the operation indication direction.

On the other hand, the range where the user is allowed to change the direction of the line of sight of the virtual camera may not need to be limited. For example, as shown in FIG. 14A, a virtual camera left-right operation range, where the direction of the line of sight of the virtual camera can be changed to the left and right, can be set in all directions. Further, as shown in FIG. 14B, also a virtual camera up-down operation range, where the direction of the line of sight of the virtual camera can be changed upward and downward, can be set in all directions. Accordingly, if the operation indication direction is set outside the barrel left-right operation range and/or outside the barrel up-down operation range, the direction of the barrel is set in the barrel left-right operation range and/or in the barrel up-down operation range, while the direction of the line of sight of the virtual camera is set so as to be the same as the operation indication direction. That is, when the user has directed the terminal apparatus 6 in the direction in which the operation indication direction is calculated so as to be outside the barrel left-right operation range and/or outside the barrel up-down operation range, the virtual world is displayed on the LCD 61 such that the direction of the line of sight of the virtual camera is different from the direction of the barrel.

For example, acceleration data or angular velocity data based on the motion and a change in the attitude of the terminal apparatus 6 is output from the terminal apparatus 6. Then, the direction of the gravitational acceleration applied to the terminal apparatus 6 can be calculated using the acceleration indicated by the acceleration data. This makes it possible to estimate the attitude of the terminal apparatus 6 with respect to the vertical direction in real space. Further, the use of the angular velocity and/or the dynamic acceleration applied to the terminal apparatus 6 using the angular velocity indicated by the angular velocity data and/or the acceleration indicated by the acceleration data, makes it possible to estimate a change in the attitude of the terminal apparatus from its initial attitude in real space (i.e., a change in direction) using the angular velocity and/or the dynamic acceleration. In accordance with the thus estimated change in the attitude of the terminal apparatus 6 (a change in direction), the action of the player object Po (the direction of the barrel) and the attitude (the direction of the line of sight) of the virtual camera are set.

As described above, the user can change the action of the player object Po and the attitude of the virtual camera on the basis of the direction and the attitude of the terminal apparatus 6 held by the user. For example, in accordance with the direction and the attitude of the terminal apparatus 6 held by the user, the direction of the barrel of the player object Po changes, and also the direction in which the discharge object is to be discharged from the barrel (a discharge direction) changes. As an example, as a result of the user directing the terminal apparatus 6 upward, downward, leftward, and rightward (i.e., pitching and yawing the terminal apparatus 6), the direction of the barrel changes in conjunction with the change in the direction of the terminal apparatus 6, and also the discharge direction changes. Specifically, when the user has changed the direction of the terminal apparatus 6 so as to direct the back surface of the terminal apparatus 6 upward (i.e., pitch the terminal apparatus 6 in the elevation direction), the direction of the barrel changes upward in the virtual world within the barrel up-down operation range. Further, when the user has changed the direction of the terminal apparatus 6 so as to direct the back surface of the terminal apparatus 6 leftward (i.e., yaw the terminal apparatus 6 to the left), the direction of the barrel changes to the left in the virtual world within the barrel left-right operation range. By thus bringing the attitude and the direction of the terminal apparatus 6 in conjunction with the direction of the barrel, the user can perform an operation having verisimilitude as if the user themselves is moving the water cannon (barrel) using the terminal apparatus 6. Further, as described above, the virtual camera is set at the first-person point of view of the player object Po that operates the water cannon, and the direction of the line of sight of the virtual camera changes in accordance with the direction and the attitude of the terminal apparatus 6 held by the user. By thus bringing the attitude and the direction of the terminal apparatus 6 in conjunction with the attitude and the direction of the virtual camera, the user can enjoy a feeling as if the user themselves is the player object Po that operates the water cannon, and can also enjoy a feeling as if peeping at the virtual world through the LCD 61 of the terminal apparatus 6. Further, in the exemplary game described above, in accordance with the user applying a load to the board-type controller 9, the action of discharging the discharge object from the water cannon is taken. Then, the details of the discharge object to be discharged (e.g., the presence or absence of the discharge of the discharge object, the amount of discharge and the discharge velocity in and at which the discharge object is to be discharged, and the type of the discharge object) are determined in accordance with the load applied to the board-type controller 9, thereby enabling an analog operation. That is, the user is provided, by an image displayed on the LCD 61, with a feeling as if being in the virtual world, and is additionally provided, by an analog operation using the board-type controller 9, with an operation feeling as if the user themselves is operating a water cannon in real space. This enhances the feeling as if being in the virtual world.

Figure 15:
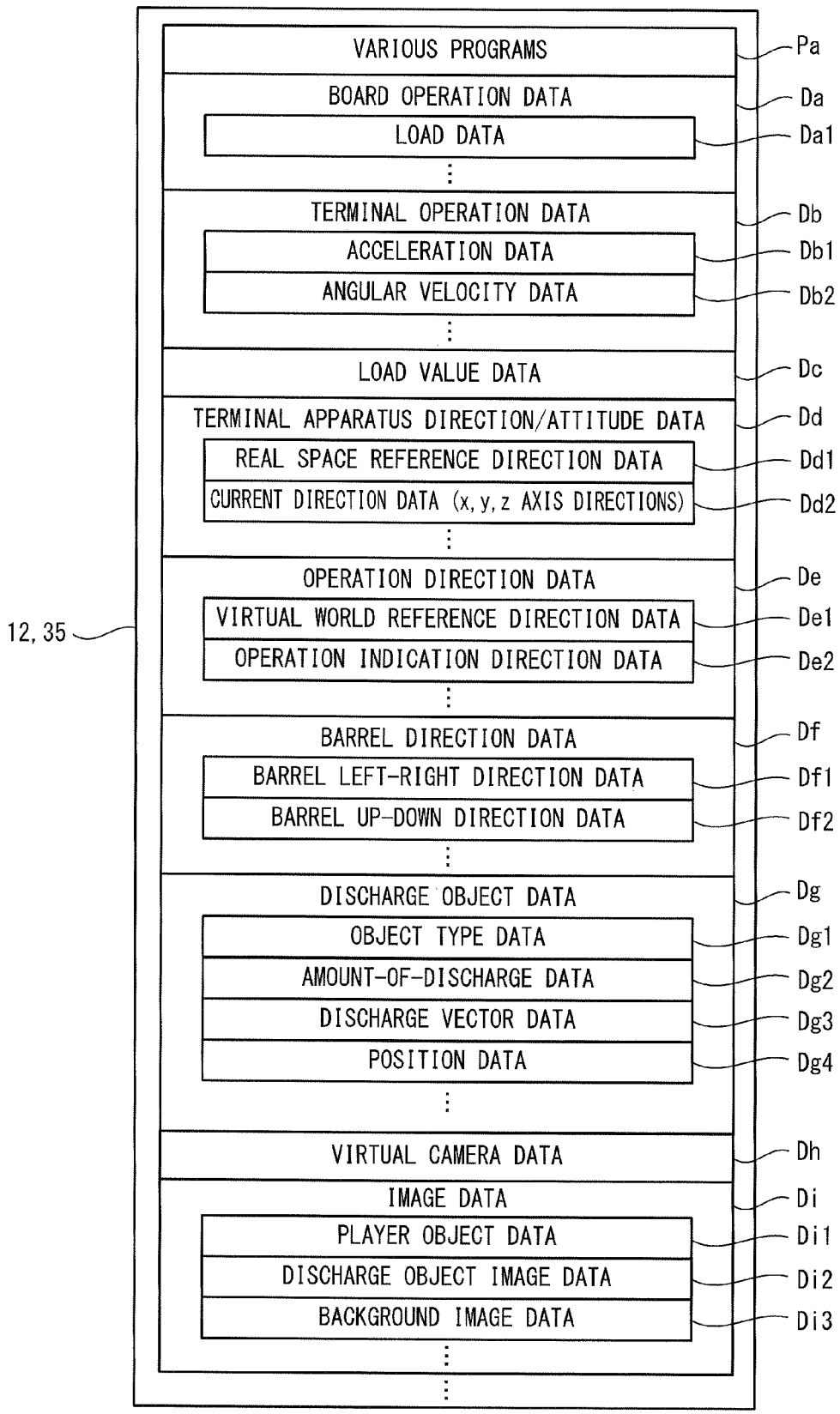
FIG. 15 is a diagram showing a non-limiting example of data and programs that are stored in a main memory of the game apparatus body 5 of FIG. 1.

Next, the processing performed by the game system 1 is described in detail. First, with reference to FIG. 15, main data used in the processing is described. FIG. 15 is a diagram showing an example of main data and programs that are stored in a main memory of the game apparatus body 5.

As shown in FIG. 15, in a data storage area of the main memory, the following are stored: board operation data Da; terminal operation data Db; load value data Dc; terminal apparatus direction/attitude data Dd; operation direction data De; barrel direction data Df; discharge object data Dg; virtual camera data Dh; image data Di; and the like. It should be noted that the main memory appropriately stores, as well as the data shown in FIG. 15, data used for the game processing, such as image data of various objects displayed on the monitor 2 and the LCD 61, and sound data used for the game. Further, in a program storage area of the main memory, various programs Pa included in the information processing program are stored.

As the board operation data Da, a series of operation information (board operation data) transmitted as transmission data from the board-type controller 9 is stored, and updated to the latest board operation data. For example, the board operation data Da includes load data Da1 and the like. The load data Da1 is data indicating load values detected by the load sensors 94a through 94d of the board-type controller 9.

As the terminal operation data Db, a series of operation information (terminal operation data) transmitted as transmission data from the terminal apparatus 6 is stored, and updated to the latest terminal operation data. For example, the terminal operation data Db includes acceleration data Db1, angular velocity data Db2, and the like. The acceleration data Db1 is data indicating an acceleration (an acceleration vector) detected by the acceleration sensor 603. For example, the acceleration data Db1 represents a three-dimensional acceleration vector whose components are accelerations in the three axial (x-axis, y-axis, and z-axis) directions shown in FIG. 3. In another embodiment, the acceleration data Db1 may represent accelerations in given one or more directions. The angular velocity data Db2 is data representing an angular velocity detected by the gyro sensor 604. For example, the angular velocity data Db2 represents angular velocities about the three axes (x-axis, y-axis, and z-axis) shown in FIG. 3. In another example, the angular velocity data Db2 may represent angular velocities about given one or more axes.

It should be noted that the game apparatus body 5 sequentially receives the data (e.g., the data indicating the detected load values, the acceleration, and the angular velocity) included in the operation information transmitted from the controller 7, the board-type controller 9, and the terminal apparatus 6 at predetermined intervals (e.g., at intervals of 1/200 seconds). For example, the received data is sequentially stored in the main memory by the I/O processor 31. In a processing flow described later, the CPU 10 reads the latest board operation data and the latest terminal operation data from the main memory every frame period (e.g., 1/60 seconds), to thereby update the board operation data Da and the terminal operation data Db.

In addition, the operation information transmitted from the controller 7, the board-type controller 9, and the terminal apparatus 6 at the predetermined intervals may be temporarily stored in the buffer (not shown) included in the controller communication module 19 or the terminal communication module 28. In this case, the data stored in the buffer is read every frame period, and the board operation data Da (e.g., the load data Da1) or the terminal operation data Db (e.g., the acceleration data Db1 and the angular velocity data Db2) in the main memory is updated for use. At this time, the cycle of receiving the operation information is different from the processing cycle, and therefore, a plurality of pieces of information received at a plurality of times are stored in the buffer. The processing may be performed using only the latest operation information among the plurality of pieces of operation information received at the plurality of times. Alternatively, the processing may be performed using a representative value (e.g., an average value) of the pieces of operation information received at the plurality of times. Yet alternatively, the processing may be performed multiple times so as to correspond to the number of the pieces of operation information received at the plurality of times.

The load value data Dc is an aggregate of data indicating the load values detected by the board-type controller 9. For example, the load value data Dc is an aggregate of data indicating the sum of the load values (the total load value) detected by the load sensors 94a through 94d. Specifically, the load value data Dc is an array of data indicating the total load values within a predetermined period that are chronologically calculated, and the data indicating the total load values is chronologically stored in the elements of the array.

The terminal apparatus direction/attitude data Dd includes real space reference direction data Dd1, current direction data Dd2, and the like. The real space reference direction data Dd1 is data indicating a reference direction (the attitude; the real space reference direction) of the terminal apparatus 6 in real space. The current direction data Dd2 is data indicating the current direction and attitude of the terminal apparatus 6 in real space. In the exemplary embodiment, the real space reference direction data Dd1 and the current direction data Dd2 are subjected to various corrections when set. For example, the real space reference direction data Dd1 and the current direction data Dd2 are calculated on the basis of the acceleration data Db1 and the angular velocity data Db2 that are included in the terminal operation data Db. It should be noted that the method of calculating the real space reference direction and the current direction will be described later.

The operation direction data De includes virtual world reference direction data De1, operation indication direction data De2, and the like. The virtual world reference direction data De1 is data indicating the virtual world reference direction set in the virtual world. The operation indication direction data De2 is data indicating the operation indication direction currently indicated in the virtual world by the user. It should be noted that the method of calculating the virtual world reference direction and the operation indication direction will be described later.

The barrel direction data Df includes barrel left-right direction data Df1, barrel up-down direction data Df2, and the like. The barrel left-right direction data Df1 is data indicating the left-right direction of the barrel of the water cannon in the virtual world. The barrel up-down direction data Df2 is data indicating the up-down direction of the barrel of the water cannon in the virtual world.

The discharge object data Dg includes object type data Dg1, amount of discharge data Dg2, discharge vector data Dg3, position data Dg4, and the like, for each discharge object present in the virtual world. The object type data Dg1 is data indicating the type (e.g., the water W or the large ball) of the discharge object to be discharged from the barrel. The amount of discharge data Dg2 is data indicating the amount of discharge per unit time in which the discharge object is to be discharged from the barrel. The discharge vector data Dg3 is data indicating the moving velocity and the moving direction of the discharge object discharged per unit time in the virtual world. The position data Dg4 is data indicating the position of the discharge object discharged per unit time in the virtual world.

The virtual camera data Dh is data concerning virtual cameras set in the virtual world. For example, the virtual camera data Dh includes data concerning a first virtual camera for generating a game image to be displayed on the LCD 61 of the terminal apparatus 6, and data concerning a second virtual camera for generating a game image to be displayed on the monitor 2.

The image data Di includes player object data Di1, discharge object image data Di2, background image data Di3, and the like. The player object data Di1 is data for placing in the virtual world the player object Po that operates the water cannon, to generate a game image. The discharge object image data Di2 is data for placing the discharge object in the virtual world to generate a game image. The background image data Di3 is data for placing a background in the virtual world to generate a game image.

Figure 16:
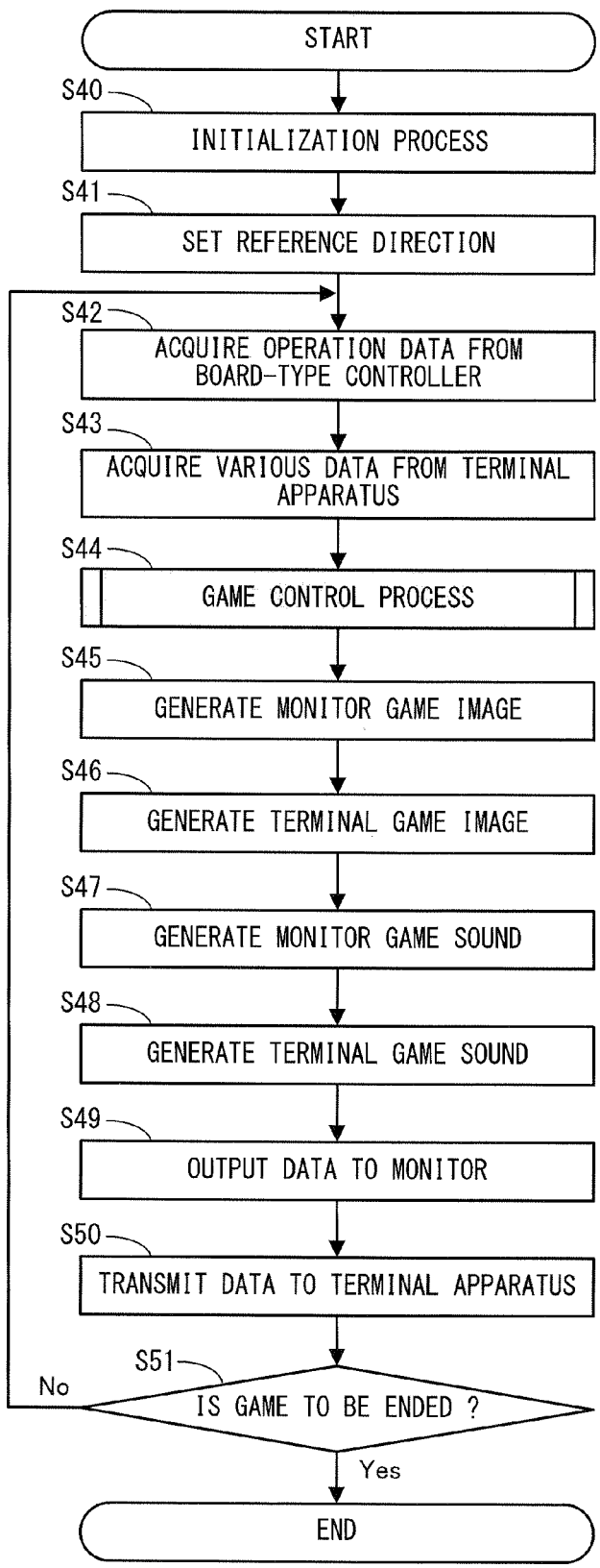
FIG. 16 is a flow chart showing a non-limiting example of processing performed by the game apparatus body 5 of FIG. 1.
Figure 17:
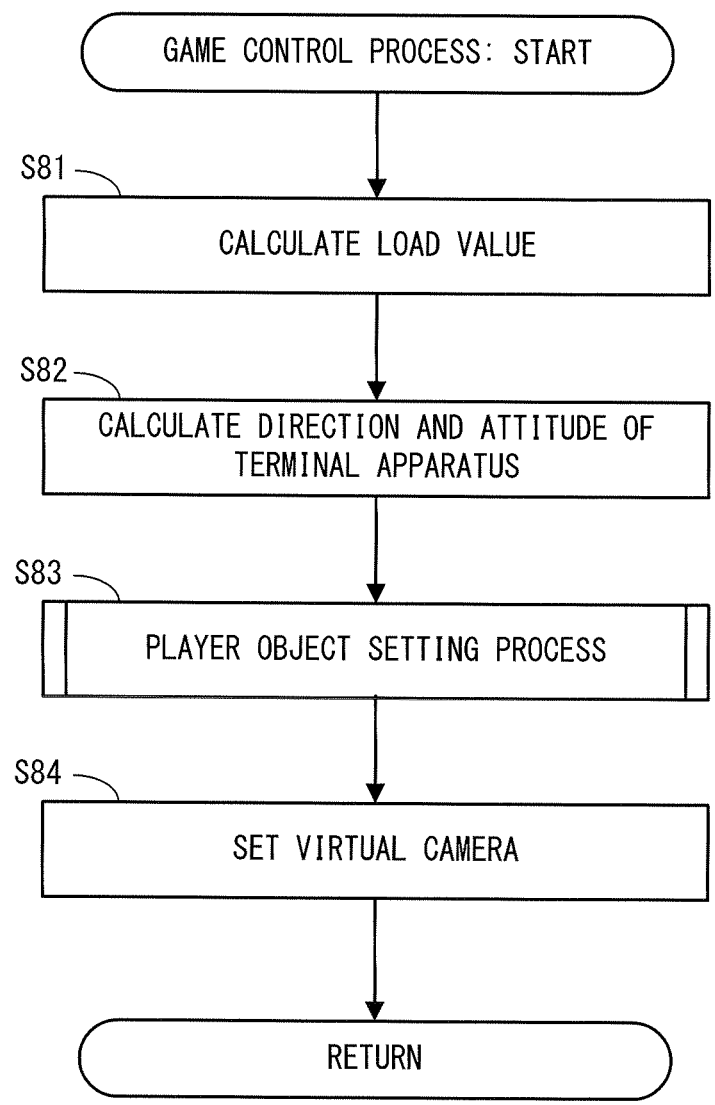
FIG. 17 is a subroutine flow chart showing a non-limiting example of a game control process in step 44 in FIG. 16.
Figure 18:
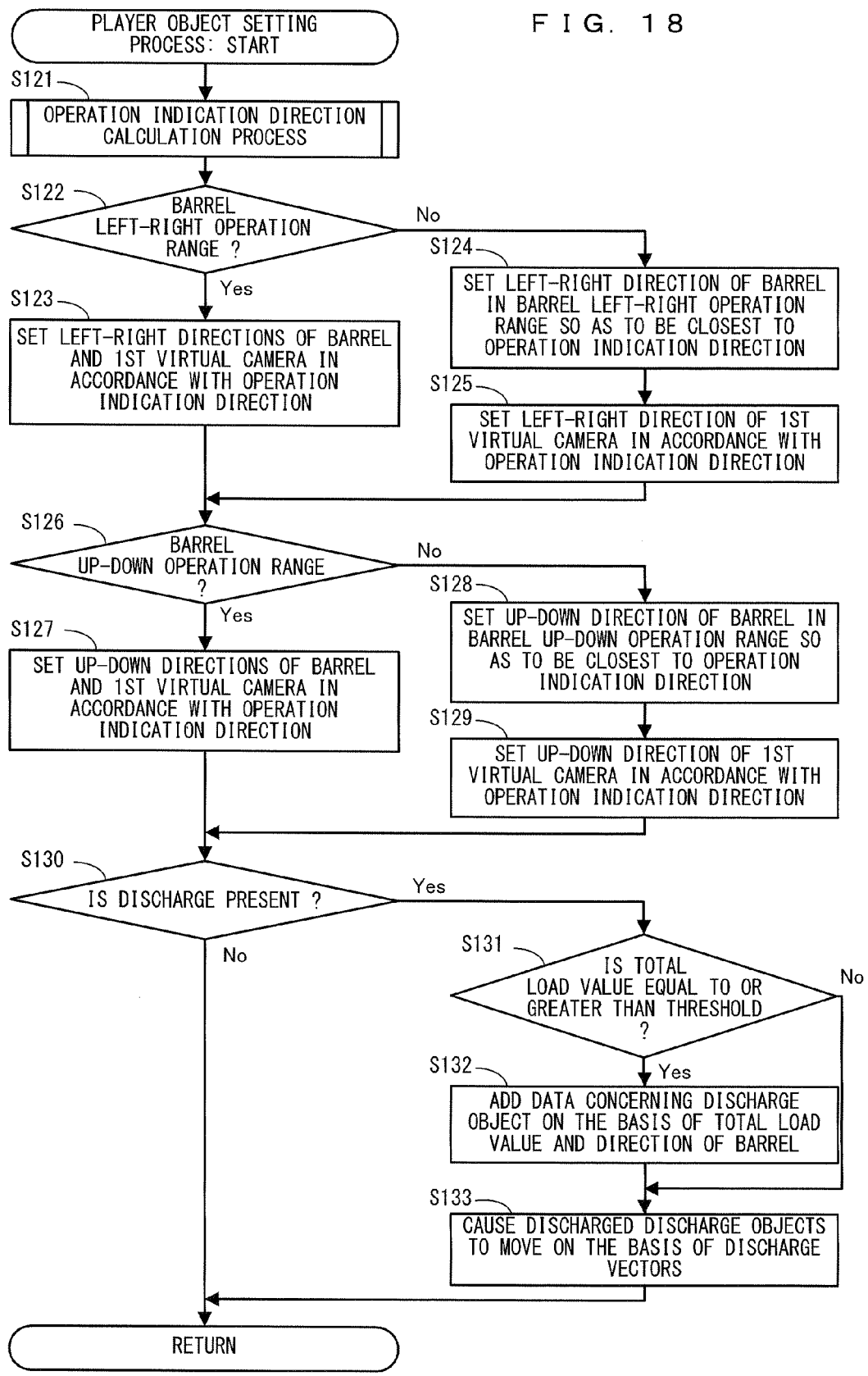
FIG. 18 is a subroutine flow chart showing a non-limiting example of a player object setting process in step 83 in FIG. 17.
Figure 19:
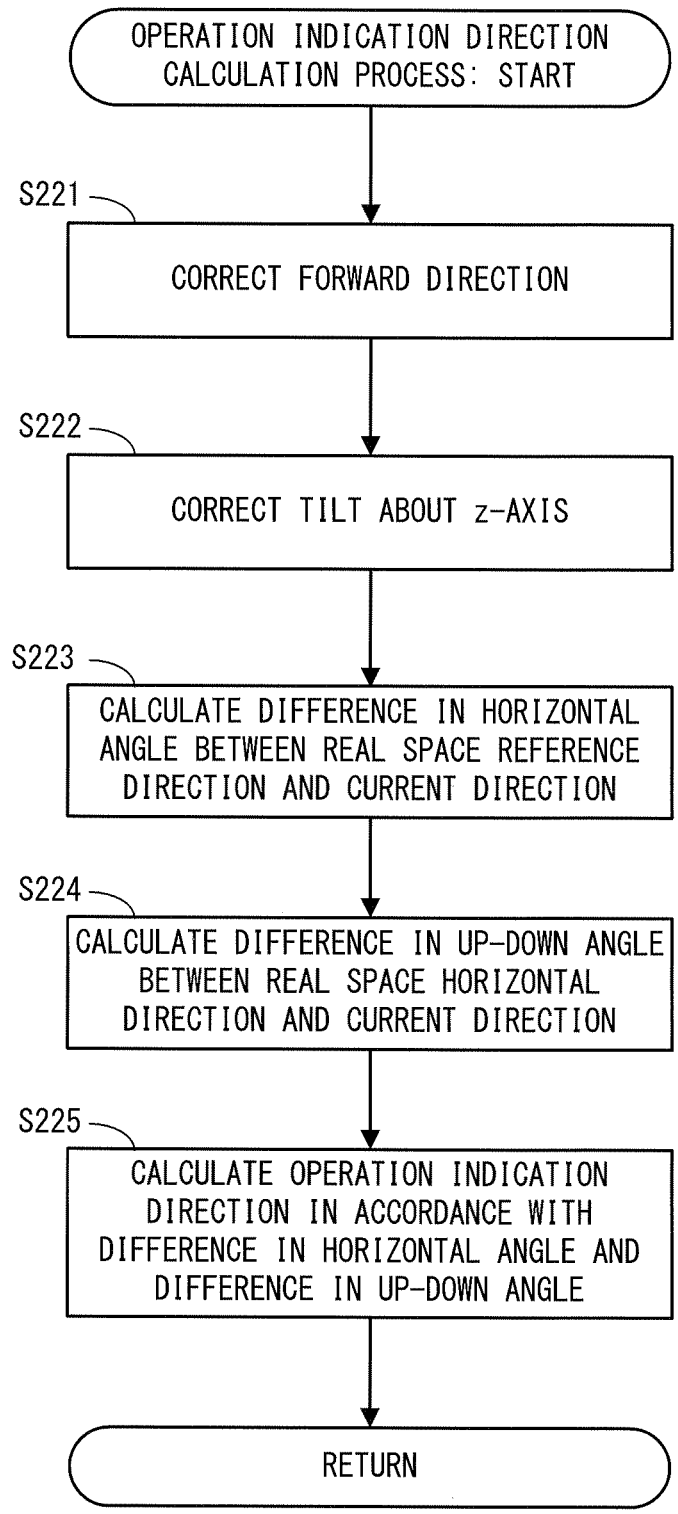
FIG. 19 is a subroutine flow chart showing a non-limiting example of an operation indication direction calculation process in step 121 in FIG. 18.
Figure 20:
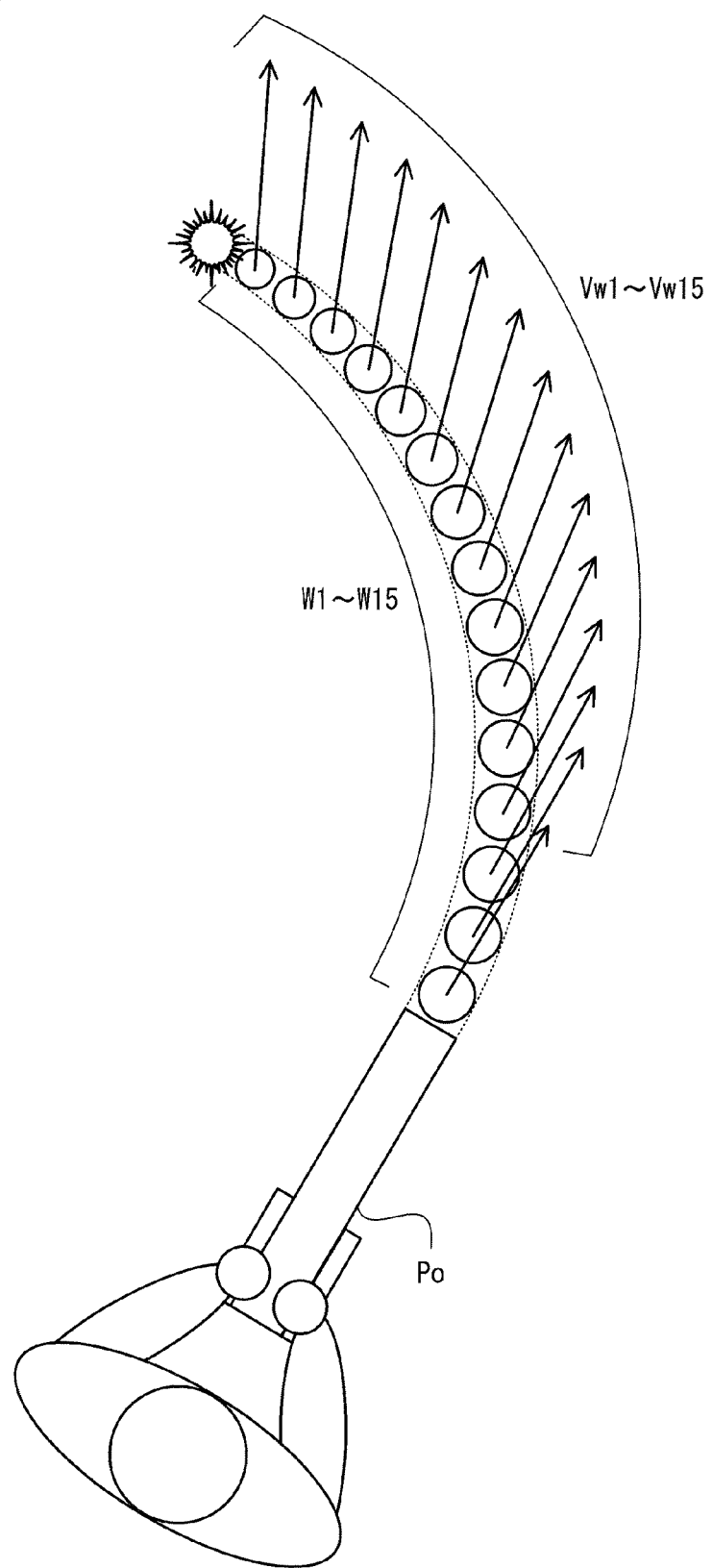
FIG. 20 is a diagram illustrating a non-limiting example of movement vectors Vw1 through Vw15 respectively set for discharge objects W1 through W15 that move in the virtual world.

Next, with reference to FIGS. 16 through 20, the processing performed by the game apparatus body 5 is described in detail. It should be noted that FIG. 16 is a flow chart showing an example of the processing performed by the game apparatus body 5. FIG. 17 is a subroutine flow chart showing an example of a game control process in step 44 in FIG. 16. FIG. 18 is a subroutine flow chart showing an example of a player object setting process in step 83 in FIG. 17. FIG. 19 is a subroutine flow chart showing an example of an operation indication direction calculation process in step 121 in FIG. 18. FIG. 20 is a diagram illustrating an example of movement vectors Vw1 through Vw15 respectively set for discharge objects W1 through W15 that move in the virtual world. Here, in the flow charts shown in FIGS. 16 through 19, descriptions are given mainly of, among the processes of the processing, a process where the player object Po is displayed so as to move in accordance with the operation performed by the user using the terminal apparatus 6 and the board-type controller 9, while detailed descriptions of the other processes not directly related to the exemplary embodiment are omitted. Further, in FIGS. 16 through 19, each step performed by the CPU 10 is abbreviated as "S".

When the game apparatus body 5 has been powered on, the CPU 10 of the game apparatus body 5 executes a boot program stored in the ROM/RTC 13 to initialize each unit such as the main memory. Then, the information processing program stored in the optical disk 4 is loaded to the main memory, and the CPU 10 starts to execute the program. The flow charts shown in FIGS. 16 through 19 show processes to be performed after the above processes are completed.

Referring to FIG. 16, the CPU 10 performs an initialization process (step 40), and proceeds to the subsequent step. For example, in the initialization process in step 40, the CPU 10 constructs the virtual world, places the player object Po and the virtual cameras (the first virtual camera and the second virtual camera) in the virtual world at predetermined positions, places objects at initial positions, and sets the initial values of various parameters used for the game processing.

Next, the CPU 10 sets a reference direction on the basis of data transmitted from the terminal apparatus 6 (step 41), and proceeds to the subsequent step. A description is given below of an example where the CPU 10 sets the reference direction.

The terminal apparatus 6 repeatedly transmits data as described above to the game apparatus body 5. In the game apparatus body 5, the terminal communication module 28 sequentially receives the data described above, and the I/O processor 31 sequentially stores terminal operation data, camera image data, and microphone sound data in the main memory. In step 41 described above, the CPU 10 reads the most recent terminal operation data from the main memory, to thereby update the acceleration data Db1 and the angular velocity data Db2.

Next, the CPU 10 calculates the direction and the attitude of the terminal apparatus 6 in real space. For example, the CPU 10 calculates, as the reference direction (initial attitude) in real space, the current direction and attitude of the terminal apparatus 6 on the basis of the acceleration indicated by the acceleration data Db1 and the angular velocity indicated by the angular velocity data Db2, to thereby update the real space reference direction data Dd1 using data indicating the calculated reference direction of the terminal apparatus 6. For example, the CPU 10 can calculate the amount of rotation (the amount of change in the direction) of the terminal apparatus 6 in real space per unit time, using the angular velocity indicated by the angular velocity data Db2. Further, in the state where the terminal apparatus 6 is substantially stationary (in a static state) in real space, the acceleration applied to the terminal apparatus 6 is the gravitational acceleration. This makes it possible to calculate the direction of gravity applied to the terminal apparatus 6 (i.e., the attitude of the terminal apparatus 6 with respect to the vertical direction in real space), using the acceleration indicated by the acceleration data Db1. This enables the CPU 10 to calculate the initial attitude of the terminal apparatus 6 on the basis of the acceleration indicated by the acceleration data Db1 and the angular velocity indicated by the angular velocity data Db2. It should be noted that in the following descriptions, when step 41 described above is performed, the real space reference direction is set on the basis of the direction in which the back surface of the terminal apparatus 6 is directed in real space (the z-axis positive direction shown in FIG. 3, i.e., the terminal apparatus perspective direction).

It should be noted that the initial attitude of the terminal apparatus 6 may be calculated on the basis of the acceleration indicated by the acceleration data Db1, or may be calculated on the basis of the direction of magnetism detected by the magnetic sensor 602. Alternatively, as a result of the user performing a predetermined operation in the state where the terminal apparatus 6 is in a specific attitude, the specific attitude when the predetermined operation has been performed may be used as the initial attitude. It should be noted that the initial attitude needs to be calculated if the attitude of the terminal apparatus 6 is calculated as an absolute attitude with respect to a predetermined direction in real space. Timing may be set such that the setting of the initial attitude, that is, step 41 described above, is performed at the start of the game, or is performed in accordance with a predetermined operation performed by the user using the terminal apparatus 6 (e.g., the operation of pressing a predetermined operation button 64).

In addition, in step 41 described above, the real space reference direction is transformed into that of a model coordinate system in the virtual world, whereby the virtual world reference direction data De1 is updated using the direction after the transformation as the reference direction in the virtual world.

It should be noted that in the setting process of the reference direction in step 41 described above, the reference direction is set after the attitude and the direction of the terminal apparatus 6 are subjected to various corrections, whereby the real space reference direction data Dd1 is updated using the reference direction after the corrections. Further, the real space reference direction after the corrections is transformed into that of the model coordinate system in the virtual world, whereby the virtual world reference direction data De1 is updated using the direction after the transformation as the reference direction in the virtual world. It should be noted that a description will be given later of the method of correcting the attitude and the direction of the terminal apparatus 6.

Subsequent to step 41 described above, the process in step 42 is performed. Thereafter, the processing loop of a series of processes 42 through 51 is performed every predetermined period (one frame period) and repeated.

In step 42, the CPU 10 acquires board operation data transmitted from the board-type controller 9, and proceeds to the subsequent step. Here, the board-type controller 9 repeatedly transmits the board operation data to the game apparatus body 5. Accordingly, in the game apparatus body 5, the controller communication module 19 sequentially receives the board operation data, and the I/O processor 31 sequentially stores the received board operation data in the main memory. The interval of transmission of the board operation data from the board-type controller 9 may be shorter than the game processing period (one frame period), and it is 1/200 seconds, for example. In step 42, the CPU 10 reads the latest board operation data from the main memory, to thereby update the board operation data Da. The board operation data includes data indicating identification information of the load sensors 94a through 94d, and data indicating the load values detected by the load sensors 94a through 94d. The load data Da1 is updated using the data identified by the identification information.

Next, the CPU 10 acquires various data transmitted from the terminal apparatus 6 (step 43), and proceeds to the subsequent step. The terminal apparatus 6 repeatedly transmits the data to the game apparatus body 5. Accordingly, in the game apparatus body 5, the terminal communication module 28 sequentially receives the data, and the codec LSI 27 sequentially performs a decompression process on the camera image data and the microphone sound data. Then, the I/O processor 31 sequentially stores the terminal operation data, the camera image data, and the microphone sound data in the main memory. In step 43 described above, the CPU 10 reads the latest terminal operation data from the main memory, to thereby update the acceleration data Db1 and the angular velocity data Db2.

Next, the CPU 10 performs a game control process (step 44), and proceeds to the subsequent step. The game control process is the process of, for example, causing the player object Po and the virtual camera in the virtual world to move in accordance with a game operation performed by the user, to thereby advance the game. In this exemplary game, the user is allowed to play various games using the terminal apparatus 6 and the board-type controller 9. With reference to FIG. 17, a description is given below of the game control process in step 44 described above.

In FIG. 17, the CPU 10 calculates a load value (step 81), and proceeds to the subsequent step. For example, the CPU 10 calculates a total load value by summing up the detected load values indicated by the load data Da1, to thereby update the latest data in the chronological data array of the load value data Dc, using the data indicating the calculated total load value. Specifically, the load data Da1 indicates the latest load values detected by the load sensors 94a through 94d, and therefore, the total load value is calculated by summing up the detected load values. The thus calculated total load value changes in accordance with the action taken by the user and the shifting of their weight (the attitude) on the board-type controller 9. As an example, when the user has taken action so as to apply a load to the board-type controller 9, the total load value increases in accordance with the applied load.

Next, the CPU 10 calculates a change in the direction and the attitude of the terminal apparatus 6 (step 82), and proceeds to the subsequent step. For example, the CPU 10 calculates the x-axis, y-axis, and z-axis directions of the terminal apparatus 6 in real space on the basis of the acceleration indicated by the acceleration data Db1 and the angular velocity indicated by the angular velocity data Db2, to thereby update the current direction data Dd2 using data indicating the current direction such that the calculated x-axis, y-axis, and z-axis directions are the current direction.

Here, the CPU 10 can calculate the amount of rotation (the amount of change in the direction) of the terminal apparatus 6 in real space per unit time, using the angular velocity indicated by the angular velocity data Db2. Further, in the state where the terminal apparatus 6 is substantially stationary (in a static state) in real space, the acceleration applied to the terminal apparatus 6 is the gravitational acceleration. This makes it possible to calculate the direction of gravity applied to the terminal apparatus 6 (i.e., the attitude of the terminal apparatus 6 with respect to the vertical direction in real space, and the x-axis, y-axis, and z-axis directions with respect to the vertical direction), using the acceleration indicated by the acceleration data Db1. This enables the CPU 10 to calculate a change in the direction and the attitude of the terminal apparatus 6 on the basis of the acceleration indicated by the acceleration data Db1 and the angular velocity indicated by the angular velocity data Db2.

It should be noted that in the exemplary embodiment, a change in the direction and the attitude of the terminal apparatus 6 are calculated on the basis of the data indicating the acceleration and the angular velocity that are detected by the terminal apparatus 6. Alternatively, in another embodiment, a change in the direction and the attitude of the terminal apparatus 6 may be calculated using any one piece of data or three or more pieces of data. For example, the magnetic sensor 602 included in the terminal apparatus 6 detects a geomagnetism applied to the terminal apparatus 6. This makes it possible to calculate a predetermined orientation with respect to the terminal apparatus 6 (i.e., the attitude of the terminal apparatus 6 with respect to the predetermined orientation) on the basis of the direction of the geomagnetism applied to the terminal apparatus 6. Even when a magnetic field is generated in addition to the geomagnetism in the real space where the terminal apparatus 6 is located, it is possible to calculate the amount of rotation of the terminal apparatus 6. This enables the CPU 10 to calculate a change in the direction and the attitude of the terminal apparatus 6 using at least one of the data indicating the acceleration, the data indicating the angular velocity, and the data indicating the magnetism, which are detected by the terminal apparatus 6.

Any calculation method may be used to calculate the attitude of the terminal apparatus 6. For example, a calculation method is possibly used of correcting the attitude of the terminal apparatus 6, which is calculated on the basis of the angular velocity indicated by the angular velocity data Db2, using the acceleration indicated by the acceleration data Db1 and the direction of the magnetism detected by the magnetic sensor 602.

Specifically, the CPU 10 first calculates the attitude of the terminal apparatus 6 on the basis of the angular velocity indicated by the angular velocity data Db2. Any method may be used to calculate the attitude of the terminal apparatus 6 from the angular velocity. For example, the attitude of the terminal apparatus 6 may be calculated using the most recent attitude (the most recently calculated x-axis, y-axis, and z-axis directions) and the current angular velocity (the angular velocity currently acquired in step 42 in the processing loop). The CPU 10 causes the most recent x-axis, y-axis, and z-axis directions to rotate about the axes along the respective directions at the current angular velocity for a unit time, to thereby calculate new x-axis, y-axis, and z-axis directions. It should be noted that the most recent x-axis, y-axis, and z-axis directions are represented by the current direction data Dd2, and the current angular velocity is represented by the angular velocity data Db2. Accordingly, the CPU 10 reads the current direction data Dd2 and the angular velocity data Db2, and calculates the attitude of the terminal apparatus 6 (new x-axis, y-axis, and z-axis directions). It should be noted that, as described above, the initial attitude of the terminal apparatus 6 is defined in step 41 described above. Thus, when the attitude of the terminal apparatus 6 is calculated from the angular velocity, the CPU 10 can calculate the current attitude of the terminal apparatus 6 with respect to the initial attitude of the terminal apparatus 6 that has been calculated first.

Next, the CPU 10 corrects the attitude of the terminal apparatus 6 (the x-axis, y-axis, and z-axis directions), calculated on the basis of the angular velocity, using the acceleration indicated by the acceleration data Db1. Specifically, the CPU 10 calculates the attitude of the terminal apparatus 6 (the x-axis, y-axis, and z-axis directions) on the basis of the acceleration indicated by the acceleration data Db1. Here, in the state where the terminal apparatus 6 is substantially stationary, the acceleration applied to the terminal apparatus 6 is the gravitational acceleration. Accordingly, in this state, it is possible to calculate the direction of the gravitational acceleration (the direction of gravity) using the direction of the acceleration indicated by the acceleration data Db1. This makes it possible to calculate the direction of the terminal apparatus 6 relative to the direction of gravity (the x-axis, y-axis, and z-axis directions with respect to the direction of gravity).

When the attitude of the terminal apparatus 6 based on the acceleration is calculated, the CPU 10 corrects the attitude based on the angular velocity, using the attitude based on the acceleration. Specifically, the CPU 10 makes a correction to approximate at a predetermined rate the attitude of the terminal apparatus 6 (the x-axis, y-axis, and z-axis directions) calculated on the basis of the angular velocity to the attitude of the terminal apparatus 6 (the x-axis, y-axis, and z-axis directions) calculated on the basis of the acceleration. The predetermined rate may be a fixed value set in advance, or may be set in accordance with, for example, the acceleration indicated by the acceleration data Db1. Further, the attitude of the terminal apparatus 6 calculated on the basis of the acceleration cannot be calculated in the direction of rotation about the direction of gravity, and therefore, the CPU 10 may not make a correction on the attitude in this rotation direction. When correcting, on the basis of the direction of magnetism detected by the magnetic sensor 602, the attitude of the terminal apparatus 6 calculated on the basis of the angular velocity, the CPU 10 may approximate at a predetermined rate the attitude of the terminal apparatus 6 calculated on the basis of the angular velocity to the attitude of the terminal apparatus 6 calculated on the basis of the direction of magnetism detected by the magnetic sensor 602. This enables the CPU 10 to accurately calculate the attitude of the terminal apparatus 6.

Next, the CPU 10 sets the player object Po (step 83), and proceeds to the subsequent step. With reference to FIG. 18, a description is given below of the player object setting process in step 83 described above.

Referring to FIG. 18, the CPU 10 performs an operation indication direction calculation process (step 121), and proceeds to the subsequent step. With reference to FIG. 19, a description is given below of the operation indication direction calculation process performed in step 121 described above.

Referring to FIG. 19, the CPU 10 corrects the up-down and forward directions of the terminal apparatus 6 (step 221), and proceeds to the subsequent step. For example, the CPU 10 corrects the direction (attitude) of the terminal apparatus 6 such that the horizontal direction is indicated by the state of the terminal apparatus 6 being directed downward by a predetermined angle (e.g., 20°) relative to the horizontal direction in real space. Specifically, in step 82 described above, the CPU 10 calculates the x-axis, y-axis, and z-axis directions of the terminal apparatus 6 in real space on the basis of the acceleration indicated by the acceleration data Db1 and the angular velocity indicated by the angular velocity data Db2, to thereby update the current direction data Dd2 such that the calculated x-axis, y-axis, and z-axis directions are the current direction. In step 221 described above, the CPU 10 corrects the y-axis direction and the z-axis direction, using all the x-axis, y-axis, and z-axis directions indicated by the current direction data Dd2, such that the y-axis direction and the z-axis direction are directed upward by the predetermined angle about the x-axis direction (i.e., as viewed in the x-axis positive direction, the y-axis direction and the z-axis direction are rotated to the right by the predetermined angle about the x-axis).

Next, the CPU 10 corrects the tilt about the z-axis (step 222), and proceeds to the subsequent step. For example, the CPU 10 corrects the direction (attitude) of the terminal apparatus 6 such that the x-axis of the terminal apparatus 6 is the horizontal direction in real space. Specifically, the CPU 10 rotates the x-axis direction about the z-axis direction using the x-axis, y-axis, and z-axis directions corrected in step 221 described above, to thereby forcibly correct the x-axis direction to the horizontal direction in the real space. Then, the CPU 10 newly calculates the z-axis direction on the basis of the exterior product of the corrected x-axis direction and the y-axis direction. Then, the CPU 10 newly calculates the y-axis direction on the basis of the exterior product of the newly calculated z-axis direction and the x-axis direction corrected to the horizontal direction, to thereby update the current direction data Dd2 using the newly calculated x-axis, y-axis, and z-axis directions.

It should be noted that also in the setting process of the reference direction in step 41 described above, the x-axis, y-axis, and z-axis directions of the terminal apparatus 6 are corrected as in steps 221 and 222 described above, whereby the real space reference direction data Dd1 is updated using the corrected z-axis positive direction as the real space reference direction.

Next, the CPU 10 calculates the difference in horizontal angle between the real space reference direction and the current direction (step 223), and proceeds to the subsequent step. Here, the difference in horizontal angle described above is the difference in angle obtained by projecting onto a horizontal plane the difference in angle between the real space reference direction in real space (the initially set z-axis positive direction) and the z-axis positive direction indicated by the current direction data Dd2. The difference in horizontal angle described above indicates the angle by which the direction of the terminal apparatus 6 has changed from the initial attitude of the terminal apparatus 6 with respect to the vertical direction in real space (the direction in which the back surface of the terminal apparatus 6 is directed (the z-axis positive direction shown in FIG. 3)). For example, the CPU 10 calculates the difference in horizontal angle described above, using the real space reference direction indicated by the real space reference direction data Dd1 and the z-axis positive direction indicated by the current direction data Dd2.

Next, the CPU 10 calculates the difference in up-down angle between the horizontal direction in real space and the current direction (step 224), and proceeds to the subsequent step. For example, the CPU 10 calculates, as the difference in up-down angle, the difference in angle between the horizontal direction in real space and the z-axis positive direction, using the z-axis positive direction indicated by the current direction data Dd2.

Next, the CPU 10 calculates the operation indication direction relative to the virtual world reference direction, in accordance with the difference in horizontal angle calculated in step 223 described above and the difference in up-down angle calculated in step 224 described above (step 225), and ends the process of this subroutine. For example, the CPU 10 calculates the operation indication direction in the virtual world, using the virtual world reference direction indicated by the virtual world reference direction data De1, such that the difference in angle obtained by projecting the virtual world reference direction and the operation indication direction onto a horizontal plane in the virtual world is the difference in horizontal angle described above, and the virtual world reference direction and the operation indication direction have the same positional relationship (i.e., the positional relationships are such that when the z-axis positive direction has rotated to the left relative to the real space reference direction, also the operation indication direction rotates to the left relative to the virtual world reference direction). Further, the CPU 10 calculates the operation indication direction in the virtual world such that the difference in angle between the horizontal direction in the virtual world and the operation indication direction is the difference in up-down angle described above, and the horizontal direction in the virtual world and the operation indication direction have the same positional relationship (i.e., when the z-axis positive direction is directed downward relative to the horizontal direction in real space, also the operation indication direction is directed downward relative to the horizontal direction in the virtual world). Then, the CPU 10 updates the operation indication direction data De2 using the calculated operation indication direction.

Referring back to FIG. 18, after the operation indication direction calculation process in step 121 described above, the CPU 10 determines whether or not the operation indication direction is included in the barrel left-right operation range (step 122). When the operation indication direction is included in the barrel left-right operation range, the CPU 10 proceeds to the subsequent step 123. On the other hand, when the operation indication direction is not included in the barrel left-right operation range, the CPU 10 proceeds to the subsequent step 124. Here, as described with reference to FIG. 14A, the barrel left-right operation range is the range where the direction of the barrel of the water cannon is allowed to be changed to the left and right (in the horizontal direction) in accordance with the operation indication direction, and the barrel left-right operation range is set to a predetermined angular range about the virtual world reference direction. Then, in step 122 described above, the CPU 10 determines, using the virtual world reference direction indicated by the virtual world reference direction data De1 and the operation indication direction indicated by the operation indication direction data De2, whether or not the difference in angle obtained by projecting the virtual world reference direction and the operation indication direction onto a horizontal plane in the virtual world is included in the barrel left-right operation range.

In step 123, the CPU 10 sets the left-right direction of the barrel and the left-right direction of the first virtual camera in accordance with the operation indication direction calculated in step 121 described above, and proceeds to the subsequent step 126. For example, the CPU 10 sets the direction, obtained by projecting the operation indication direction indicated by the operation indication direction data De2 onto a horizontal plane in the virtual world, as it is to the left-right direction of the barrel and the left-right direction of the first virtual camera, to thereby update the barrel left-right direction data Df1 and the data concerning the left-right direction of the first virtual camera in the virtual camera data Dh, using the set left-right direction of the barrel and the set left-right direction of the first virtual camera.

On the other hand, in step 124, the CPU 10 sets the left-right direction of the barrel so as to be limited in the barrel left-right operation range, and proceeds to the subsequent step. For example, the CPU 10 sets the left-right direction of the barrel in the barrel left-right operation range so as to be closest to the direction obtained by projecting the operation indication direction indicated by the operation indication direction data De2 onto a horizontal plane in the virtual world, to thereby update the barrel left-right direction data Df1 using the set left-right direction of the barrel.

Next, the CPU 10 sets the left-right direction of the first virtual camera in accordance with the operation indication direction calculated in step 121 described above (step 125), and proceeds to the subsequent step 126. For example, the CPU 10 sets the direction, obtained by projecting the operation indication direction indicated by the operation indication direction data De2 onto a horizontal plane in the virtual world, as it is to the left-right direction of the first virtual camera, to thereby update the data concerning the left-right direction of the first virtual camera in the virtual camera data Dh, using the set left-right direction of the first virtual camera.

In step 126, the CPU 10 determines whether or not the operation indication direction is included in the barrel up-down operation range. When the operation indication direction is included in the barrel up-down operation range, the CPU 10 proceeds to the subsequent step 127. On the other hand, when the operation indication direction is not included in the barrel up-down operation range, the CPU 10 proceeds to the subsequent step 128. Here, as described with reference to FIG. 14B, the barrel up-down operation range is the range where the direction of the barrel of the water cannon is allowed to be changed upward and downward (in the vertical direction) in accordance with the operation indication direction, and the barrel up-down operation range is set to a predetermined angular range with respect to the horizontal direction in the virtual world. Then, in step 126 described above, the CPU 10 determines, using the operation indication direction indicated by the operation indication direction data De2, whether or not the difference in angle between the horizontal direction in the virtual world and the operation indication direction is included in the barrel up-down operation range.

In step 127, the CPU 10 sets the up-down direction of the barrel and the up-down direction of the first virtual camera in accordance with the operation indication direction calculated in step 121 described above, and proceeds to the subsequent step 130. For example, the CPU 10 sets the direction, obtained by projecting the operation indication direction indicated by the operation indication direction data De2 onto a vertical plane in the virtual world, as it is to the up-down direction of the barrel and the up-down direction of the first virtual camera, to thereby update the barrel up-down direction data Df2 and the data concerning the up-down direction of the first virtual camera in the virtual camera data Dh, using the set up-down direction of the barrel and the set up-down direction of the first virtual camera.

On the other hand, in step 128, the CPU 10 sets the up-down direction of the barrel so as to be limited in the barrel up-down operation range, and proceeds to the subsequent step. For example, the CPU 10 sets the up-down direction of the barrel in the barrel up-down operation range so as to be closest to the direction obtained by projecting the operation indication direction indicated by the operation indication direction data De2 onto a vertical plane in the virtual world, to thereby update the barrel up-down direction data Df2 using the set up-down direction of the barrel.

Next, the CPU 10 sets the up-down direction of the first virtual camera in accordance with the operation indication direction calculated in step 121 described above (step 129), and proceeds to the subsequent step 130. For example, the CPU 10 sets the direction, obtained by projecting the operation indication direction indicated by the operation indication direction data De2 onto a vertical plane in the virtual world, as it is to the up-down direction of the first virtual camera, to thereby update the data concerning the up-down direction of the first virtual camera in the virtual camera data Dh, using the set up-down direction of the first virtual camera.

In step 130, the CPU 10 determines whether or not the discharge of the discharge object is present. When the discharge of the discharge object is present, the CPU 10 proceeds to the subsequent step 131. On the other hand, when the discharge of the discharge object is not present, the CPU 10 ends the process of this subroutine. Here, the player object Po can discharge the discharge object such as the water W, using the water cannon in operation, and the discharge object is discharged from the barrel in the set direction of the barrel in accordance with a predetermined operation of the user (e.g., the operation of applying to the board-type controller 9 a load equal to or greater than a predetermined threshold). The state, determined in step 130 described above, where "the discharge of the discharge object is present" indicates the case where the predetermined operation is being performed (the case where the latest total load value indicated by the load value data Dc is equal to or greater than the predetermined threshold) and/or the case where the discharge object is discharged and moving in the virtual world (a discharge vector whose magnitude is other than 0 is set in the discharge vector data Dg3).

In step 131, the CPU 10 determines whether or not the total load value is equal to or greater than a predetermined threshold. Here, the threshold used in step 131 described above is a value set in advance for determining whether or not the user is performing a discharge operation using the board-type controller 9. When the value of the latest total load applied to the board-type controller 9 has become equal to or greater than the threshold, it is determined that the discharge operation is being performed. When, with reference to the latest total load value indicated by the load value data Dc, the total load value is equal to or greater than the predetermined threshold, the CPU 10 proceeds to the subsequent step 132. On the other hand, when the latest total load value is less than the predetermined threshold, the CPU 10 proceeds to the subsequent step 133.

In step 132, on the basis of the total load value and the direction of the barrel, the CPU 10 adds the data concerning the discharge object (the type of the discharge object, the amount of discharge, and the discharge vector), and proceeds to the subsequent step 133. For example, when the discharge operation of discharging the discharge object has been performed, the CPU 10 sets, in the barrel of the water cannon, the position of the discharge object to be newly discharged, and also sets the direction of the barrel of the water cannon to the direction of the discharge vector of the discharge object. Further, in accordance with the latest total load value indicated by the load value data Dc, the CPU 10 calculates the discharge velocity and the amount of discharge per unit time at and in which the discharge object is to be newly discharged. Specifically, the CPU 10 sets the discharge velocity and the amount of discharge per unit time such that the greater the latest total load value, the greater the discharge velocity, and the greater the amount of discharge per unit time. Further, with reference to the history of the total load value indicated by the load value data Dc, the CPU 10 sets a first discharge object (e.g., the water W) as the discharge object to be newly discharged when the amount of change from the total load value calculated in the most recent processing to the latest total load value is less than a predetermined value. The CPU 10 sets a second discharge object (e.g., the large ball formed of a mass of water having a greater amount than that of the water W) as the discharge object to be newly discharged when the amount of change is equal to or greater than the predetermined value. Then, the CPU 10 adds the object type data Dg1, the amount of discharge data Dg2, the discharge vector data Dg3, and the position data Dg4 that indicate the type, the amount of discharge, the discharge vector, and the position of the set discharge object, to the discharge object data Dg as data concerning new discharge object. Step 132 described above is thus repeated, whereby data concerning new discharge object is added to the discharge object data Dg.

It should be noted that step 132 described above is repeated in each processing cycle of the game apparatus body 5 when the latest total load value is equal to or greater than the predetermined threshold. In this case, a new discharge object is generated in each cycle. Accordingly, the cycle of repeating step 132 described above may be appropriately set in accordance with the times at which it is desired to generate a new discharge object in the virtual world. In this case, the process of step 131 described above is performed at the desired times, and the processes of steps 131 and 132 described above are not performed except at the desired times.

In step 133, the CPU 10 causes the discharge objects set in the discharge object data Dg to move on the basis of the respective discharge vectors, and ends the process of the subroutine. For example, on the basis of the discharge vectors set in the discharge object data Dg, the CPU 10 causes the discharge objects to move in the virtual world, and sets new positions of the discharge objects, to thereby update the position data Dg4 of the discharge objects using the set positions. Further, on the basis of the environment of the virtual world (the force of gravity, wind, the effects of other objects, and the like) where the discharge objects are placed, the CPU 10 corrects the discharge vectors of the discharge objects, to thereby update the discharge vector data Dg3 of the discharge objects using the corrected discharge vectors. It should be noted that when any of the discharge objects collides with another object due to the above movements, the CPU 10 sets data indicating that the discharge object has collided with said another object, and also deletes the data concerning the discharge object (the object type data Dg1, the amount of discharge data Dg2, the discharge vector data Dg3, and the position data Dg4) from the discharge object data Dg.

Step 132 described above is thus repeated, whereby new discharge objects are repeatedly set in the barrel of the water cannon operated by the player object Po, and also a discharge vector whose discharge direction is the direction of the barrel is set for each of the newly set discharge objects. Then, step 133 described above is repeated, whereby the positions of the discharge objects set in the discharge object data Dg are set so as to move in the virtual world on the basis of the discharge vectors correspondingly set for the discharge objects. For example, as shown in FIG. 20, discharge objects W1 through W15 move successively in the virtual world on the basis of discharge vectors Vw1 through Vw15 whose vector directions are each the direction of the barrel when the discharge object is discharged, and whose magnitudes are each the discharge velocity based on the total load value when the discharge object is discharged. Accordingly, when the user has performed the operation of changing the direction of the barrel while performing the discharge operation, discharge vectors are set so as to have directions different between the discharge objects discharged from the barrel. This results in causing the discharge objects W1 through W15 to move successively in a meandering manner in the virtual world. Here, the positions to be reached by the discharge objects in the virtual world are determined in an analog manner on the basis of the direction of the barrel at the time of the discharge and the discharge velocity based on the total load value at the time of the discharge. This makes it difficult for the user playing the game to predict the positions to be reached by the discharge objects. When, however, having consecutively discharged discharge objects, the user may cause the discharge objects to move successively, and thereby can predict, with reference to the positions reached by the previously discharged discharge objects, the positions to be reached by the discharge objects to be discharged thereafter.

Referring back to FIG. 17, after the player object setting process in step 83 described above, the CPU 10 sets parameters concerning the second virtual camera (step 84), and ends the process of this subroutine. For example, a terminal game image and a monitor game image are generated as, for example, three-dimensional CG images obtained by calculating a game space viewed from a virtual camera placed in the virtual world. Specifically, the first virtual camera for generating a terminal game image is placed at the position of the first-person point of view of the player object Po in the virtual world. Then, the first virtual camera is set such that the direction based on the left-right direction of the first virtual camera and the up-down direction of the first virtual camera that have been set in the processes of steps 123, 125, 127, and 129 described above is the direction of the line of sight of the first virtual camera, and the width direction of the first virtual camera is the horizontal direction in the virtual world. Further, the second virtual camera for generating a monitor game image is set in the same virtual world where the first virtual camera is set, the second virtual camera set in a fixed manner so as to include the state of the virtual world obtained by viewing from a distant bird's-eye view the player object Po placed in the virtual world. A terminal game image and a monitor game image are game images of the virtual world that are thus viewed from different points of view. This causes the game images of the virtual world viewed from the different points of view to be displayed on the LCD 61 and the monitor 2.

Referring back to FIG. 16, after the game control process in step 44, the CPU 10 and the GPU 32 generate a monitor game image to be displayed on the monitor 2 (step 45), and proceed to the subsequent step. For example, the CPU 10 and the GPU 32 read from the main memory the data indicating the result of the game control process performed in step 44, and read from the VRAM 34 the data used to generate a monitor game image. Then, the CPU 10 and the GPU 32 generate a game image using the read data, and store the generated monitor game image in the VRAM 34. Any monitor game image may be generated by any method so long as the monitor game image represents the result of the game control process performed in step 44. For example, the monitor game image may be a three-dimensional CG image generated by the steps of: placing the second virtual camera in the virtual world on the basis of the parameters concerning the second virtual camera that are indicated by the virtual camera data Dh; placing in the virtual world the player object Po that operates the water cannon, on the basis of the barrel direction data Df; placing the discharge object in the virtual world on the basis of the discharge object data Dg; and calculating the virtual world viewed from the second virtual camera. Specifically, the CPU 10 places the player object Po and the water cannon in the virtual world such that the barrel of the water cannon operated by the player object Po is directed in the direction of the barrel indicated by the barrel direction data Df. Further, the CPU 10 determines, on the basis of the type and the amount of discharge of the object that are indicated by the discharge object data Dg, the type and the size of the discharge object to be placed, and places the discharge object, on which the determinations have been made, in the virtual world on the basis of the position indicated by the discharge object data Dg.

Next, the CPU 10 and the GPU 32 generate a terminal game image to be displayed on the terminal apparatus 6 (step 46), and proceed to the subsequent step. For example, the CPU 10 and the GPU 32 read from the main memory the data indicating the result of the game control process performed in step 44, and read from the VRAM 34 the data used to generate a terminal game image. Then, the CPU 10 and the GPU 32 generate a terminal game image using the read data, and store the generated terminal game image in the VRAM 34. Similarly to the monitor game image, any terminal game image may be generated by any method so long as the terminal game image represents the result of the game control process performed in step 44. Further, the terminal game image may be generated by the same method as, or a different method from, that for the monitor game image. For example, the terminal game image may be generated as a three-dimensional CG image by the steps of: placing the first virtual camera in the virtual world on the basis of the parameters concerning the first virtual camera that are indicated by the virtual camera data Dh; placing in the virtual world the player object Po that operates the water cannon, on the basis of the barrel direction data Df; placing the discharge object in the virtual world on the basis of the discharge object data Dg; and calculating the virtual world viewed from the first virtual camera.

Next, the CPU 10 generates a monitor game sound to be output to the loudspeakers 2a of the monitor 2 (step 47), and proceeds to the subsequent step. For example, the CPU 10 causes the DSP 33 to generate a monitor game sound to be output from the loudspeakers 2a, in accordance with the result of the game control process performed in step 44. As an example, the CPU 10 causes the DSP 33 to generate a monitor game sound in which BGM or the like to be output from the monitor 2 is added to the voices and the action sounds of the objects, sound effects, and the like that are supposed to be heard on the basis of the position of the second virtual camera in the virtual world set in accordance with the result of the game control process in step 44.

Next, the CPU 10 generates a terminal game sound to be output to the loudspeakers 607 of the terminal apparatus 6 (step 48), and proceeds to the subsequent step. For example, the CPU 10 causes the DSP 33 to generate a terminal game sound to be output from the loudspeakers 607, in accordance with the result of the game control process performed in step 44. As an example, the CPU 10 causes the DSP 33 to generate a terminal game sound in which BGM or the like to be output from the terminal apparatus 6 is added to the voices and the action sounds of the objects, sound effects, and the like that are supposed to be heard on the basis of the position of the first virtual camera in the virtual world set in accordance with the result of the game control process in step 44. The terminal game sound may be the same as, or different from, the monitor game sound. Alternatively, the terminal game sound may be partially different from the monitor game sound (e.g., the terminal game sound and the monitor game sound include the same BGM and different sound effects). It should be noted that when the monitor game sound and the terminal game sound are the same, the terminal game sound generation step in step 48 may not need to be performed.

Next, the CPU 10 outputs the monitor game image and the monitor game sound to the monitor 2 (step 49), and proceeds to the subsequent step. For example, the CPU 10 transmits to the AV-IC 15 the data of the monitor game image stored in the VRAM 34 and the data of the monitor game sound generated by the DSP 33. In response to this, the AV-IC 15 transmits the data of the monitor game image and the data of the monitor game sound to the monitor 2 through the AV connector 16. This causes the monitor game image to be displayed on the monitor 2, and causes the monitor game sound to be output from the loudspeakers 2a.

Next, the CPU 10 transmits the terminal game image and the terminal game sound to the terminal apparatus 6 (step 50), and proceeds to the subsequent step. For example, the CPU 10 transmits to the codec LSI 27 the data of the terminal game image stored in the VRAM 34 and the data of the terminal game sound generated by the DSP 33. The codec LSI 27 performs a predetermined compression process on the transmitted data. The compressed data of the terminal game image and the compressed data of the terminal game sound are transmitted from the codec LSI 27 to the terminal communication module 28, and then transmitted from the terminal communication module 28 to the terminal apparatus 6 via the antenna 29. The data of the terminal game image and the data of the terminal game sound that have been transmitted from the game apparatus body 5 are received by the wireless module 610 of the terminal apparatus 6, and are subjected to a predetermined decompression process by the codec LSI 606. Then, the decompressed data of the terminal game image is output to the LCD 61, and the decompressed data of the terminal game sound is output to the sound IC 608. This causes the terminal game image to be displayed on the LCD 61, and causes the terminal game sound to be output from the loudspeakers 607.

Next, the CPU 10 determines whether or not the game is to be ended (step 51). Conditions for ending the game may be, for example: that particular conditions have been satisfied so that the game is over, or the game is completed; or that the user has performed an operation for ending the game. When the game is not to be ended, the CPU 10 returns to step 42 and repeats the same processing. On the other hand, when the game is to be ended, the CPU 10 ends the processing of the flow chart. Thereafter, the series of processes 42 through 51 is repeatedly performed until the CPU 10 determines in step 51 that the game is to be ended.

As described above, the processing described above makes it possible to display an image of the virtual world on the LCD 61 of the portable terminal apparatus 6 that allows a user to view a screen thereof while holding it, and also makes it possible to perform an operation on the virtual world in accordance with the attitude and the motion of the terminal apparatus 6. It is also possible to perform an operation using the board-type controller 9 in parallel with the operation using the terminal apparatus 6. Here, the operation using the board-type controller 9 can be performed by the feet of the user, and performed by the user mounted thereon. The operation using the board-type controller 9 can be easily performed in a simultaneous parallel manner with the operation of changing the attitude and the motion of the terminal apparatus 6, which is formed of an apparatus separate from the board-type controller 9.

In addition, based on the processing described above, the operation using the terminal apparatus 6 in the barrel left-right operation range changes the direction of the line of sight of the first virtual camera and the direction of the barrel of the water cannon to the left and right in accordance with the attitude and the motion of the terminal apparatus 6 that are obtained by yawing the direction of the terminal apparatus 6 to the left and right. Further, also the operation using the terminal apparatus 6 in the barrel up-down operation range changes the direction of the line of sight of the first virtual camera and the direction of the barrel of the water cannon in accordance with the attitude and the motion of the terminal apparatus 6 that are obtained by pitching the direction of the terminal apparatus 6 upward and downward. Accordingly, the operations using the terminal apparatus 6 in the barrel left-right operation range and the barrel up-down operation range change not only the direction of the line of sight of the virtual camera for generating the virtual world to be displayed on the terminal apparatus 6, but also the discharge direction in which the discharge object is to be discharged in the virtual world. These operations lead to an operation suitable for adjusting the position to be reached by the discharge object, and an operation suitable for changing the display range of the display performed on the LCD 61. On the other hand, the operations using the terminal apparatus 6 outside the barrel left-right operation range and outside the barrel up-down operation range change only the direction of the line of sight of the first virtual camera in accordance with the attitude and the motion of the terminal apparatus 6 that are obtained by yawing the direction of the terminal apparatus 6 to the left and right, and the attitude and the motion of the terminal apparatus 6 that are obtained by pitching the direction of the terminal apparatus 6 upward and downward. Accordingly, the operations using the terminal apparatus 6 outside the barrel left-right operation range and outside the barrel up-down operation range lead to an operation suitable for changing only the display range of the display performed on the LCD 61 with the discharge direction unchanged. At least the barrel left-right operation range and the barrel up-down operation range are thus set, whereby the user can perform various operations on the basis of the attitude and the motion of one device.

It should be noted that in the above descriptions, settings are made for the range for determining the attitude and the direction of the motion of the terminal apparatus 6 that are obtained by yawing the direction of the terminal apparatus 6 to the left and right (the barrel left-right operation range), and the range for determining the attitude and the direction of the motion of the terminal apparatus 6 that are obtained by pitching the direction of the terminal apparatus 6 upward and downward (the barrel up-down operation range). Alternatively, one range may be used, or three or more ranges may be used, to determine the above directions. For example, when the direction of the barrel of the water cannon changes only to the left and right in the virtual world, only the barrel left-right operation range may be set, and always only the attitude of the first virtual camera may be changed in accordance with the attitude and the motion of the terminal apparatus 6 that are obtained by pitching the direction of the terminal apparatus 6 upward and downward. Yet alternatively, a range may be further set in which the velocity of the change in the direction of the barrel of the water cannon is relatively small (e.g., ranges adjacent to the left and right sides of the barrel left-right operation range, or ranges adjacent to the top and bottom sides of the barrel up-down operation range), and the direction of the barrel may be controlled such that the velocity of the change in the direction of the barrel changes in accordance with the direction the terminal apparatus 6.

In the exemplary game described above, the virtual camera (first virtual camera) for generating an image to be displayed on the LCD 61 is controlled (the position, the direction, and the attitude of the virtual camera are controlled) on the basis of the attitude of the terminal apparatus 6. Such control makes it possible to provide the user with an image as if peeping at the virtual world through the LCD 61, and provide the user with a feeling as if being in the virtual world. Further, the operation using the attitude of the terminal apparatus 6 enables the operation of rotating the terminal apparatus 6 in two directions, such as a left-right swing (yaw) about the vertical direction (e.g., about the y-axis direction) and an upward and downward swing (pitch) about the left-right horizontal direction (e.g., about the x-axis direction), and therefore is suitable for controlling the virtual camera capable of making a similar movement also in the virtual world. Thus, the attitude of the virtual camera in the virtual world may be controlled so as to coincide with the attitude of the terminal apparatus 6 in real space, whereby it is possible to provide an image as if peeping in the direction desired by the user in the virtual world. It should be noted that in addition to the operation of rotating the terminal apparatus 6 in two directions described above, the virtual camera may be controlled so as to rotate about the direction of the line of sight in accordance with a left-right rotation (roll) about the front-back horizontal direction (e.g., about the z-axis direction). The addition of such control enables the operation of rotating the terminal apparatus 6 in three directions. Thus, the attitude of the virtual camera in the virtual world may be controlled so as to coincide with the attitude of the terminal apparatus 6 in real space, whereby it is possible to provide an image as if peeping in the direction desired by the user in the virtual world.

In addition, in the exemplary game described above, in accordance with the user taking action on the board-type controller 9, the player object takes action (e.g., a discharging action). That is, the user is provided, by an image displayed on the LCD 61, with a feeling as if being in the virtual world, and is additionally provided with an operation feeling as if the user themselves is a player character in real space. This enhances the feeling as if being in the virtual world.

In addition, in the exemplary game described above, the direction of the barrel of the water cannon operated by the player object Po displayed on the LCD 61 is controlled on the basis of the attitude of the terminal apparatus 6. Such control makes it possible to provide the user with an operation environment as if the terminal apparatus 6 is a water cannon, and also provide a feeling as if the user is the player object Po in the virtual world. Further, the operation using the attitude of the terminal apparatus 6 enables the operation of rotating the terminal apparatus 6 in two directions, such as a left-right swing (yaw) about the vertical direction (e.g., about the y-axis direction) and an upward and downward swing (pitch) about the left-right horizontal direction (e.g., about the x-axis direction), and therefore is suitable for controlling the player object Po capable of making a similar movement also in the virtual world. For example, in the exemplary game, a left-right swing (yaw) about the height direction along the LCD 61 of the terminal apparatus 6 (the y-axis direction) may be set to correspond to a left-right change (yaw) in the direction of the barrel, and an upward and downward swing (pitch) about the left-right direction along the LCD 61 (the x-axis direction) may be set to correspond to an upward and downward change (pitch) in the direction of the barrel, whereby it is possible to provide a shooting game of changing the direction of the barrel to the direction desired by the user in the virtual world.

In addition, in the exemplary game described above, the action of the player object Po discharging the discharge object (the presence or absence of the discharge of the discharge object, the amount of discharge and the discharge velocity in and at which the discharge object is to be discharged, and the type of the discharge object) is controlled in accordance with the load value (total load value) to be applied to the board-type controller 9. That is, it is possible to perform a discharge process based on an analog operation performed on the board-type controller 9. Accordingly, the user controls the action of one player object Po using a plurality of devices (the terminal apparatus 6 and the board-type controller 9). This makes it possible to perform an unprecedented operation, and also makes it possible to perform an analog operation on the action of the player object Po.

In addition, in the exemplary game described above, it is possible to set the perspective direction in the virtual world displayed on the LCD 61 of the terminal apparatus 6, as the direction of the barrel of the water cannon operated by the player object Po. This enables the user to set the direction of the barrel on the basis of the attitude of the terminal apparatus 6. Further, the virtual world is displayed on the LCD 61 such that the direction of the barrel is the perspective direction. This enables the operation of setting the direction of the barrel in an intuitive manner, which facilitates the setting of the direction of the barrel to the direction desired by the user.

In addition, in the exemplary game described above, the attitude (the direction of the barrel) of the water cannon operated by the player object Po and the attitude (the direction of the line of sight) of the first virtual camera for generating a virtual world image to be displayed on the LCD 61 are controlled on the basis of the attitude and the motion of the terminal apparatus 6. On the basis of the attitude and the motion of the terminal apparatus 6, however, the player object Po may be caused to move and the first virtual camera may be caused to move. For example, a moving angle and a moving distance may be calculated from changes in the attitude and the motion of the terminal apparatus 6, and the player object Po that operates the water cannon and/or the first virtual camera may be caused to move in the virtual world in accordance with the moving angle and the moving distance. Even when the player object Po and/or the first virtual camera thus move in the virtual world, the exemplary embodiment can be applied in a similar manner.

In addition, in the exemplary game described above, a virtual world image viewed from the first-person point of view of the player object Po is displayed on the LCD 61. Alternatively, an image of the virtual world in another form may be displayed on the LCD 61. For example, an image of the virtual world including at least the player object Po may be displayed on the LCD 61 of the terminal apparatus 6. As an example, it is possible to place the first virtual camera at a position behind and close to the player object Po, and display on the LCD 61 of the terminal apparatus 6 an image of the virtual world including at least the player object Po. Even in the exemplary game described above, only the attitude of the first virtual camera may possibly change in the state where the action of the player object Po is stopped because, outside the barrel left-right operation range and outside the barrel up-down operation range, the direction of the barrel is locked in each range. In this case, the direction of the line of sight of the first virtual camera may be set so as to view the part of the virtual world behind the player object Po such that the position of the player object Po is the point of view. Alternatively, the first virtual camera may be caused to move to a position in front of and close to the player object Po, or the first virtual camera may be set such that at least a part of the player object Po is included in the view volume.

In addition, in the exemplary game described above, when a virtual world image viewed from the first-person point of view of the player object Po is displayed on the LCD 61, a part of the player object Po (the barrel of the water cannon operated by the player object Po) is displayed. Alternatively, the player object Po may not be displayed at all. For example, even in the form where the player object Po is not displayed at all, an aim indicating the point to be reached by the discharge object in the virtual world may be displayed on the LCD 61. Yet alternatively, as described above, when discharge objects have been discharged, the state of the discharge objects being discharged successively in discharge order may be displayed.

In addition, in the above descriptions, as an example of the discharge object, the water W and the large ball formed of a mass of water having a greater amount than the water W are used. Alternatively, another type of object may be used as the discharge object. For example, the term "discharge object" used in the present specification is one that represents an object to be discharged or shot by the player object Po to hit another object with it, and examples of the "discharge object" may also include flames, bullets, shells, bombs, grenades, rockets, missiles, balls, arrows, beams, and laser beams in the virtual game world.

It should be noted that in the exemplary game described above, the exemplary processing is performed such that in accordance with the operation indication direction determined on the basis of the attitude of the terminal apparatus 6, the direction of the barrel and the attitude of the virtual camera are controlled in conjunction immediately after the determination. In accordance with the change in the operation indication direction, however, the direction of the barrel and/or the attitude of the first virtual camera may be controlled after a delay of a predetermined period. In this case, the virtual world may be displayed such that: after the direction of the barrel changes, the attitude of the first virtual camera changes so as to follow the direction of the barrel after the delay of the predetermined period; or after the attitude of the first virtual camera changes, the direction of the barrel changes so as to follow the change in the attitude after the delay of the predetermined period.

In addition, in the exemplary game described above, the game image displayed on the LCD 61 of the terminal apparatus 6 and the game image displayed on the monitor 2 are images both representing the state of the same virtual world, but are images different from each other in the point of view, and the range of view, toward the virtual world is viewed. This enables the user to view the virtual world displayed on the two display screens in different fields of view and different display ranges, and therefore enables the user to appropriately view a suitable game image depending on the state of the game. Further, the exemplary game described above enables the user to perform an operation while holding the terminal apparatus 6, to thereby change the direction of the barrel in accordance with the attitude and the position of the terminal apparatus 6 in real space, and also change an image displayed on the LCD 61 in accordance with the direction of the barrel. This makes it possible to provide a sense of presence in the virtual world to the user viewing an image displayed on the LCD 61 while holding the terminal apparatus 6. On the other hand, viewing only an image displayed on the LCD 61 may make it difficult to understand the position relative to the entire virtual world and the circumstance of the player object Po. The display of the virtual world in a relatively wide range on the monitor 2 can solve such a problem.

It should be noted that in the exemplary game described above, the second virtual camera for generating an image of the virtual world to be displayed on the monitor 2 is set in a fixed manner in the virtual world. Alternatively, the position and the attitude of the second virtual camera may be changed in accordance with the motion of the player object Po. As an example, an image of the virtual world to be displayed on the monitor 2 may be generated by controlling the attitude of the second virtual camera such that the direction in which the direction of the line of sight of the second virtual camera is projected onto a horizontal plane in the virtual world coincides with the direction in which the direction of the barrel or the operation indication direction is projected onto the horizontal plane.

In addition, the game system 1 allows the user to perform various games using the terminal apparatus 6 and the board-type controller 9 as operation means. The terminal apparatus 6 can be used as a controller that allows the user to provide an input by an operation based on the motion of the body of the terminal apparatus 6, a touch operation, a button operation, or the like, while it can be used as a portable display or a second display. Accordingly, the game system 1 achieves a wide range of games. That is, the terminal apparatus 6 functions as a display apparatus, and therefore, there may be a game system in which: the terminal apparatus 6 is used as display means while the monitor 2 and the controller 7 are not used; and the board-type controller 9 is used as operation means. Further, the terminal apparatus 6 functions as an operation device as well as a display apparatus, and therefore, there may be a game system in which the terminal apparatus 6 is used as display means while the monitor 2 and the controller 7 are not used, and the terminal apparatus 6 and the board-type controller 9 are used as operation means. Further, the terminal apparatus 6 functions as an operation device as well as a display apparatus, and therefore, there may be a game system in which the terminal apparatus 6 is used as display means while the monitor 2, the board-type controller 9, and the controller 7 are not used, and the terminal apparatus 6 is used as operation means.

In addition, in the exemplary embodiment, the terminal apparatus 6 functions as a so-called thin client terminal, which does not perform game processing. In the exemplary embodiment, however, at least a part of the series of steps in the game processing to be performed by the game apparatus body 5 may be performed by the terminal apparatus 6. As an example, the terminal game image generation process may be performed by the terminal apparatus 6. As another example, all the series of steps in the game processing to be performed by the game apparatus body 5 may be performed by the terminal apparatus 6. In this case, the terminal apparatus 6 functions as a processing device that performs the steps in the game processing, as well as a display apparatus, and therefore, there may be a game system in which: the terminal apparatus 6 is used as display means while the monitor 2, the game apparatus body 5, and the controller 7 are not used; the board-type controller 9 is used as operation means; and the terminal apparatus 6 is used as processing means. In this game system, only the terminal apparatus 6 and the board-type controller 9 are connected wirelessly or wired, and board operation data is transmitted from the board-type controller 9 to the terminal apparatus 6, thereby achieving various games. Further, it is needless to say that when the board-type controller 9 is not used either, the terminal apparatus 6 may be used as display means, operation means, and processing means.

In addition, in the above embodiment, attitude data (e.g., at least one piece of data output from the magnetic sensor 602, the acceleration sensor 603, and the gyro sensor 604) used to calculate the attitude and/or the motion of the terminal apparatus 6 (including the position and the attitude per se, or changes in the position and the attitude) is output from the terminal apparatus 6 to the game apparatus body 5, and the attitude and/or the motion of the terminal apparatus 6 are calculated by the information processing performed by the game apparatus body 5. The attitude and/or the motion of the terminal apparatus 6 to be calculated by the game apparatus body 5, however, may be calculated by the terminal apparatus 6. In this case, the data indicating the attitude and/or the motion of the terminal apparatus 6 that have been calculated by the terminal apparatus 6 (i.e., data indicating the position and the attitude per se of the terminal apparatus 6, or changes in the position and the attitude that have been calculated using the attitude data) is output from the terminal apparatus 6 to the game apparatus body 5, and the data is used in the information processing performed by the game apparatus body 5.

In addition, in the above descriptions, the terminal apparatus 6 and the game apparatus body 5 are connected by wireless communication, and the board-type controller 9 and the game apparatus body 5 are connected by wireless communication. Alternatively, wireless communication between devices may be performed in a form other than the above. As a first example, the terminal apparatus 6 functions as a relay device for another wireless communication. In this case, board operation data of the board-type controller 9 is wirelessly transmitted to the terminal apparatus 6, and the terminal apparatus 6 wirelessly transmits, to the game apparatus body 5, terminal operation data of the terminal apparatus 6 together with the received board operation data. In this case, while the terminal apparatus 6 and the game apparatus body 5 are directly connected by wireless communication, the board-type controller 9 is connected to the game apparatus body 5 via the terminal apparatus 6 by wireless communication. As a second example, the board-type controller 9 functions as a relay device for another wireless communication. In this case, terminal operation data of the terminal apparatus 6 is wirelessly transmitted to the board-type controller 9, and the board-type controller 9 wirelessly transmits, to the game apparatus body 5, board operation data of the board-type controller 9 together with the received terminal operation data. In this case, the board-type controller 9 and the game apparatus body 5 are directly connected by wireless communication, while the terminal apparatus 6 is connected to the game apparatus body 5 via the board-type controller 9 by wireless communication.

In addition, the terminal apparatus 6 and/or the board-type controller 9 may be electrically connected to the game apparatus body 5 via cables. In this case, the cables connected to the terminal apparatus 6 and/or the board-type controller 9 are connected to a connection terminal of the game apparatus body 5. As a first example, the terminal apparatus 6 and the game apparatus body 5 are electrically connected via a first cable, and the board-type controller 9 and the game apparatus body 5 are electrically connected via a second cable. As a second example, the terminal apparatus 6 and the game apparatus body 5 are electrically connected via a cable. In this case, board operation data of the board-type controller 9 may be wirelessly transmitted to the terminal apparatus 6 and then transmitted to the game apparatus body 5 via the cable. As a third example, the board-type controller 9 and the game apparatus body 5 are electrically connected via a cable. In this case, terminal operation data of the terminal apparatus 6 may be wirelessly transmitted to the board-type controller 9 and then transmitted to the game apparatus body 5 via the cable. Alternatively, terminal operation data of the terminal apparatus 6 may be wirelessly transmitted to the game apparatus body 5 directly from the terminal apparatus 6.

In addition, in the exemplary embodiment, the game system 1 includes one terminal apparatus 6 and one board-type controller 9. Alternatively, the game system 1 may be configured to include a plurality of terminal apparatuses 6 and a plurality of board-type controllers 9. That is, the game apparatus body 5 may be capable of wirelessly communicating with each terminal apparatus 6 and each type controller 9, and may transmit game image data, game sound data, and control data to each terminal apparatus, and receive terminal operation data, camera image data, microphone sound data, and board operation data from each terminal apparatus 6 and each board-type controller 9. When the game apparatus body 5 wirelessly communicates with the plurality of terminal apparatuses 6 and the plurality of board-type controllers 9, the game apparatus body 5 may perform the wireless communication in a time division manner or in a frequency division manner.

As described above, when the game system 1 includes a plurality of terminal apparatuses 6 and a plurality of board-type controllers 9, a plurality of users are allowed to play more games. For example, when the game system 1 includes two pairs of terminal apparatuses 6 and board-type controllers 9, two users are allowed to play a game simultaneously. Further, when the game system 1 includes two pairs of terminal apparatuses 6 and board-type controllers 9, the game system 1 includes three display apparatuses, and therefore can generate game images for three users to be displayed on the respective display apparatuses.

In addition, in the above descriptions, a plurality of load sensors 94 are provided in the board-type controller 9. Information of the position of the center of gravity of a load applied to the board-type controller 9, however, is not used in the above processing. Thus, at least one load sensor 94 may be provided in the board-type controller 9.

In addition, the exemplary embodiment is described using the stationary game apparatus 3. The exemplary embodiment, however, may be achieved by executing the information processing program according to the exemplary embodiment with an information processing apparatus such as a hand-held game apparatus or a general personal computer. Further, in another embodiment, the exemplary embodiment may be applied not only to a game apparatus but also to a given hand-held electronic device (e.g., a PDA (Personal Digital Assistant) or a mobile telephone), a personal computer, a camera, and the like. Any device may be connected to the terminal apparatus 6 and the board-type controller 9 wirelessly or wired, whereby the exemplary embodiment can be achieved.

In addition, in the above descriptions, the information processing is performed by the game apparatus body 5. At least a part of the processing steps in the information processing, however, may be performed by another apparatus provided outside the game system 1. For example, when the game apparatus body 5 is configured to communicate with another apparatus (e.g., a server or another game apparatus), the processing steps in the information processing may be performed by the game apparatus body 5 in combination with said another apparatus. As an example, said another apparatus performs the process of setting a player object, a virtual world, and the like, and data concerning the motion and the attitude of the player object is transmitted from the game apparatus body 5 to said another apparatus, whereby the information processing is performed. Then, image data indicating the virtual world generated by said other apparatus is transmitted to the game apparatus body 5, and the virtual world is displayed on the monitor 2 and the LCD 61. At least a part of the processing steps in the information processing is thus performed by another apparatus, whereby the same processing as the information processing is achieved. It should be noted that at least a part of the processing steps in the information processing may be performed by the board-type controller 9 (the microcomputer 100). Further, the above information processing can be performed by one processor or by a cooperation of a plurality of processors, the one processor or the plurality of processors included in an information processing system including at least one information processing apparatus. Further, in the exemplary embodiment, the processes shown in the above flow charts are performed as a result of the CPU 10 of the game apparatus body 5 executing a predetermined program. Alternatively, a part or all of the processes may be performed by a dedicated circuit included in the game apparatus body 5.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

In addition, the shape of the game apparatus body 5 described above, the shapes of the terminal apparatus 6, the controller 7, and the board-type controller 9, and the shapes, the number, the placement, or the like of the various operation buttons and sensors are merely illustrative, and the exemplary embodiment can be achieved with other shapes, numbers, placements, and the like. Further, the processing orders, the setting values, the display forms, the criterion values, and the like that are used in the information processing described above are also merely illustrative, and it is needless to say that the exemplary embodiment can be achieved with other orders, display forms, and values.

In addition, the information processing program (the game program) described above may be supplied to the game apparatus body 5 not only from an external storage medium such as the optical disk 4, but also via a wireless or wired communication link. Further, the information processing program may be stored in advance in a nonvolatile storage device of the game apparatus body 5. It should be noted that examples of an information storage medium for storing the information processing program may include a CD-ROM, a DVD, given another optical disk storage medium similar to these, a flexible disk, a hard disk, a magnetic optical disk, and a magnetic tape, as well as a nonvolatile memory. Furthermore, the information storage medium for storing the information processing program may be a nonvolatile semiconductor memory or a volatile memory. Such storage media can be defined as storage media readable by a computer or the like. For example, a computer or the like is caused to read and execute programs stored in each of the storage media, and thereby can be caused to provide the various functions described above.

While some exemplary systems, exemplary methods, exemplary devices, and exemplary apparatuses have been described in detail, the foregoing description is in all aspects illustrative and not restrictive. It is understood that numerous other modifications and variations can be devised without departing from the spirit and scope of the appended claims. It is understood that the scope of the exemplary embodiment should be interpreted only by the appended claims. It is also understood that one skilled in the art can implement the exemplary embodiment in the equivalent range on the basis of the description of the exemplary embodiment and common technical knowledge, from the description of the specific embodiments. It should be understood that when used in the present specification, components and the like described in singular form with the words "a" and "an" before them do not exclude the plurality of these components. Furthermore, it should be understood that terms used in the present specification have meanings generally used in the art unless otherwise specified. Therefore, unless otherwise defined, all the jargons and technical terms have the same meanings as those generally understood by one skilled in the art of the exemplary embodiment. In the event of any contradiction, the present specification (including meanings defined herein) has priority.

A storage medium having stored thereon an information processing program, an information processing apparatus, an information processing system, and an information processing method according to the exemplary embodiment, when an image of a virtual world is displayed on a display apparatus that allows a user to view a screen thereof while holding it and an operation is performed on the virtual world in accordance with the attitude and the motion of the display apparatus, can facilitate another operation to be performed in parallel with the operation, and therefore are suitable for use as an information processing program, an information processing apparatus, an information processing system, and an information processing method that perform processing based on the operation and the like.

What is claimed is:

1. A non-transitory computer-readable storage medium having stored thereon an information processing program to be executed by a computer of an information processing apparatus configured to display an image on a portable display apparatus that outputs at least data based on an attitude and/or a motion of the portable display apparatus body, the information processing program causing the computer to perform functionality comprising:
   determining, on the basis of the attitude and/or motion data output from the portable display apparatus, whether or not a direction of a predetermined axis set in the portable display apparatus is included in a predetermined range;
   controlling, when the direction of the predetermined axis is included in the predetermined range, an action of an object placed in a virtual world in accordance with the direction of the predetermined axis;
   controlling, when the direction of the predetermined axis is included in the predetermined range or present outside the predetermined range, an action of a first virtual camera, for generating an image of the virtual world, in accordance with the direction of the predetermined axis; and
   displaying on the portable display apparatus a first image representing the virtual world viewed from the first virtual camera,
   wherein a direction of the object corresponds to the attitude and/or motion of the portable display device until the predetermined axis is outside the predetermined range, where a direction of the virtual camera continues to correspond to the attitude and/or motion of the portable display device even when the predetermined axis is outside the predetermined range.

2. The non-transitory computer-readable storage medium having stored thereon the information processing program according to claim 1, wherein
   the determination of whether or not the direction of the predetermined axis is included in the predetermined range includes
   determining, on the basis of the data output from the portable display apparatus, whether or not the direction of the predetermined axis in a left-right direction in real space is included in a first range set in the left-right direction, and
   when it has been determined that the direction of the predetermined axis in the left-right direction in real space is included in the first range, the action of the object is controlled such that on the basis of the direction of the predetermined axis in the left-right direction in real space, the object rotates and/or moves in a left-right direction in the virtual world.

3. The non-transitory computer-readable storage medium having stored thereon the information processing program according to claim 2, wherein
   the determination of whether or not the direction of the predetermined axis is included in the predetermined range includes
   determining, on the basis of the data output from the portable display apparatus, whether or not the direction of the predetermined axis in an up-down direction in real space is included in a second range set in the up-down direction, and
   when it has been determined that the direction of the predetermined axis in the up-down direction in real space is included in the second range, the action of the object is controlled such that on the basis of the direction of the predetermined axis in the up-down direction in real space, the object rotates and/or moves in an up-down direction in the virtual world.

4. The non-transitory computer-readable storage medium having stored thereon the information processing program according to claim 3, wherein
   the first range has an angular range of a predetermined size, and
   the second range has an angular range of a size different from the size of the angular range of the first range.

5. The non-transitory computer-readable storage medium having stored thereon the information processing program according to claim 3, wherein
   the first range is a range having the same angular ranges in a left-right direction about a reference direction in real space, and
   the second range is a range having angular ranges different from each other in an up-down direction with respect to a horizontal direction in real space.

6. The non-transitory computer-readable storage medium having stored thereon the information processing program according to claim 1, wherein
   when it has been determined that the direction of the predetermined axis is included in the predetermined range, an attitude of the first virtual camera is controlled such that a direction of a line of sight of the first virtual camera is the same as a direction of the object in the virtual world.

7. The non-transitory computer-readable storage medium having stored thereon the information processing program according to claim 1, wherein
   the action of the object is controlled on the basis of a change in the direction of the predetermined axis, and
   the action of the first virtual camera is controlled on the basis of the change in the direction of the predetermined axis.

8. The non-transitory computer-readable storage medium having stored thereon the information processing program according to claim 7, wherein
   the action of the object is controlled such that the greater the change in the direction of the predetermined axis, the greater the object moves, and
   the action of the first virtual camera is controlled such that the greater the change in the direction of the predetermined axis, the greater the first virtual camera moves.

9. The non-transitory computer-readable storage medium having stored thereon the information processing program according to claim 1, wherein
   the action of the object is controlled such that the object rotationally moves in accordance with an angle of the predetermined axis, and
   the action of the first virtual camera is controlled such that the first virtual camera rotationally moves in accordance with the angle of the predetermined axis.

10. The non-transitory computer-readable storage medium having stored thereon the information processing program according to claim 1, the information processing program further causing the computer to perform functionality comprising:

calculating an attitude and/or a motion of the portable display apparatus on the basis of the data output from the portable display apparatus, wherein on the basis of the attitude and/or the motion of the portable display apparatus, it is determined whether or not the direction of the predetermined axis is included in the predetermined range.

11. The non-transitory computer-readable storage medium having stored thereon the information processing program according to claim 10, wherein the attitude and/or the motion of the portable display apparatus are calculated with respect to a predetermined direction in real space, on the basis of the attitude and/or the motion of the portable display apparatus with respect to the predetermined direction in real space, the action of the object is controlled with respect to a direction that corresponds to the predetermined direction and is set in the virtual world, and on the basis of the attitude and/or the motion of the portable display apparatus with respect to the predetermined direction in real space, the action of the first virtual camera is controlled with respect to the direction that corresponds to the predetermined direction and is set in the virtual world.

12. The non-transitory computer-readable storage medium having stored thereon the information processing program according to claim 11, wherein the attitude and/or the motion of the portable display apparatus are calculated with respect to a direction of gravity in real space, using the direction of gravity as the predetermined direction, on the basis of the attitude and/or the motion of the portable display apparatus with respect to the direction of gravity in real space, the action of the object is controlled with respect to a direction of gravity set in the virtual world, and on the basis of the attitude and/or the motion of the portable display apparatus with respect to the direction of gravity in real space, the action of the first virtual camera is controlled with respect to the direction of gravity set in the virtual world.

13. The non-transitory computer-readable storage medium having stored thereon the information processing program according to claim 12, wherein at least the attitude and/or the motion of the portable display apparatus that are obtained by rotating the portable display apparatus about the direction of gravity in real space are calculated, at least a range about the direction of gravity in real space is set as the predetermined range, and on the basis of the attitude and/or the motion of the portable display apparatus that are obtained by rotating the portable display apparatus about the direction of gravity in real space, it is determined whether or not the direction of the predetermined axis is included in the predetermined range, on the basis of the attitude and/or the motion of the portable display apparatus that are obtained by rotating the portable display apparatus about the direction of gravity in real space, the action of the object is controlled such that the object rotates about the direction of gravity set in the virtual world, and on the basis of the attitude and/or the motion of the portable display apparatus that are obtained by rotating the portable display apparatus about the direction of gravity in real space, the action of the first virtual camera is controlled such that the first virtual camera rotates about the direction of gravity set in the virtual world.

14. The non-transitory computer-readable storage medium having stored thereon the information processing program according to claim 12, wherein at least the attitude and/or the motion of the portable display apparatus that are obtained by swinging the portable display apparatus upward and downward about a horizontal direction perpendicular to the direction of gravity in real space are calculated, at least a range about the horizontal direction in real space is set as the predetermined range, and on the basis of the attitude and/or the motion of the portable display apparatus that are obtained by swinging the portable display apparatus upward and downward about the horizontal direction in real space, it is determined whether or not the direction of the predetermined axis is included in the predetermined range, on the basis of the attitude and/or the motion of the portable display apparatus that are obtained by swinging the portable display apparatus upward and downward about the horizontal direction in real space, the action of the object is controlled such that the object swings upward and downward about a horizontal direction that corresponds to the horizontal direction in real space and is set in the virtual world, and on the basis of the attitude and/or the motion of the portable display apparatus that are obtained by swinging the portable display apparatus upward and downward about the horizontal direction in real space, the action of the first virtual camera is controlled such that the first virtual camera swings upward and downward about the horizontal direction that corresponds to the horizontal direction in real space and is set in the virtual world.

15. The non-transitory computer-readable storage medium having stored thereon the information processing program according to claim 10, wherein at least the attitude and/or the motion of the portable display apparatus that are obtained by rotating the portable display apparatus about each of a first axis and a second axis that are orthogonal to a perspective direction of, and perpendicular to, a display screen of the portable display apparatus are calculated, the first image displayed on the display screen, each of a range about the first axis and a range about the second axis is set as the predetermined range, and on the basis of the attitude and/or the motion of the portable display apparatus that are obtained by rotating the portable display apparatus about each of the first axis and the second axis, it is determined whether or not the direction of the predetermined axis is included in each predetermined range, when it has been determined that the direction of the predetermined axis is included in the predetermined range about the first axis, the action of the object is controlled such that in accordance with the attitude and/or the motion of the portable display apparatus that are obtained by rotating the portable display apparatus about the first axis, the object rotates about an axis that corresponds to the first axis and is set in the virtual world, when it has been determined that the direction of the predetermined axis is included in the predetermined range about the second axis, the action of the object is controlled such that in accordance with the attitude and/or the motion of the portable display apparatus that are obtained by rotating the portable display apparatus about the second axis, the object rotates about an axis that corresponds to the second axis and is set in the virtual world, and the action of the first virtual camera is controlled such that in accordance with the attitude and/or the motion of the portable display apparatus that are obtained by rotating the portable display apparatus about each of the first axis and the second axis, the first virtual camera rotates about each of axes that correspond to the first axis and the second axis and are orthogonal to a direction of a line of sight of the first virtual camera.

16. The non-transitory computer-readable storage medium having stored thereon the information processing program according to claim 15, wherein at least the attitude and/or the motion of the portable display apparatus that are obtained by rotating the display apparatus about each of an axis along a width direction of the display screen and an axis along a height direction of the display screen are calculated, each axis being orthogonal to the perspective direction, each of a range about the axis along the width direction and a range about the axis along the height direction is set as the predetermined range, and on the basis of the attitude and/or the motion of the portable display apparatus that are obtained by rotating the portable display apparatus about each of the axis along the width direction and the axis along the height direction, it is determined whether or not the direction of the predetermined axis is included in each predetermined range, when it has been determined that the direction of the predetermined axis is included in the predetermined range about the axis along the width direction, the action of the object is controlled such that in accordance with the attitude and/or the motion of the portable display apparatus that are obtained by rotating the portable display apparatus about the axis along the width direction, the object rotates about a horizontal axis that corresponds to the axis along the width direction and is set in the virtual world, when it has been determined that the direction of the predetermined axis is included in the predetermined range about the axis along the height direction, the action of the object is controlled such that in accordance with the attitude and/or the motion of the portable display apparatus that are obtained by the portable display apparatus about the axis along the height direction, the object rotates about a vertical axis that corresponds to the axis along the height direction and is set in the virtual world, and the action of the first virtual camera is controlled such that: in accordance with the attitude and/or the motion of the portable display apparatus that are obtained by rotating the portable display apparatus about the axis along the width direction, the first virtual camera rotates about a horizontal axis that is orthogonal to a direction of a line of sight of the first virtual camera and is included in the virtual world; and in accordance with the attitude and/or the motion of the portable display apparatus that are obtained by rotating the portable display apparatus about the axis along the height direction, the first virtual camera rotates about a vertical axis in the virtual world.

17. The non-transitory computer-readable storage medium having stored thereon the information processing program according to claim 10, wherein the calculation of the attitude and/or the motion of the portable display apparatus includes:

setting a reference direction of the portable display apparatus in real space; and calculating, on the basis of the data output from the portable display apparatus, a difference in left-right angle about a vertical direction in real space between a current direction of the predetermined axis and the reference direction, and a difference in up-down angle about a horizontal direction in real space between the current direction of the predetermined axis and the horizontal direction, the determination of whether or not the direction of the predetermined axis is included in the predetermined range includes:

determining whether or not the difference in left-right angle is included in a first range set about the vertical direction in real space; and determining whether or not the difference in up-down angle is included in a second range set about the horizontal direction in real space, when it has been determined that the difference in left-right angle is included in the first range, the action of the object is controlled such that the object rotates and/or moves in a left-right direction in the virtual world on the basis of the difference in left-right angle, when it has been determined that the difference in up-down angle is included in the second range, the action of the object is controlled such that the object rotates and/or moves in an up-down direction in the virtual world on the basis of the difference in up-down angle, and the action of the first virtual camera is controlled such that: the first virtual camera rotates and/or moves in a left-right direction in the virtual world on the basis of the difference in left-right angle; and the first virtual camera rotates and/or moves, on the basis of the difference in up-down angle, in an up-down direction and about a left-right direction that is orthogonal to a direction of a line of sight of the first virtual camera and is included in the virtual world.

18. The non-transitory computer-readable storage medium having stored thereon the information processing program according to claim 1, wherein image data indicating the first image is output to the portable display apparatus, and the portable display apparatus configured to:

acquire the image data output from the information processing apparatus, and display the first image indicated by the acquired image data.

19. The non-transitory computer-readable storage medium having stored thereon the information processing program according to claim 18, the information processing program further causing the computer to perform functionality comprising:

generating compression image data by compressing the image data indicating the first image, wherein the generated compression image data is output to the portable display apparatus, the portable display apparatus is configured to:

acquire the compression image data output from the information processing apparatus, decompress the compression image data to obtain the image data indicating the first image, and display the first image indicated by the image data that has been acquired and has been decompressed.

20. The non-transitory computer-readable storage medium having stored thereon the information processing program according to claim 1, wherein
besides the first image, a second image representing the virtual world viewed from a second virtual camera is further displayed on another display apparatus connected to the information processing apparatus.

21. The non-transitory computer-readable storage medium having stored thereon the information processing program according to claim 20, the information processing program further causing the computer to perform functionality comprising:
generating compression image data by compressing the image data indicating the first image, wherein
the generated compression image data is output to the portable display apparatus, and, besides the compression image data, image data indicating the second image is output to said another display apparatus without being compressed, and
the portable display apparatus configured to:
acquire the compression image data output from the information processing apparatus;
decompress the compression image data to obtain the image data indicating the first image; and
display the first image indicated by the image data that has been acquired and has been decompressed.

22. The non-transitory computer-readable storage medium having stored thereon the information processing program according to claim 20, the information processing program further causing the computer to perform functionality comprising:
setting, on the basis of a position of the object in the virtual world, the second virtual camera, for generating an image of the virtual world, at a position different from a position of the first virtual camera such that the object is included in the second image.

23. The non-transitory computer-readable storage medium having stored thereon the information processing program according to claim 22, wherein
the second virtual camera is set at a position further away from the object than the first virtual camera is from the object, and
a range wider than a range of the virtual world represented by the first image is displayed as the second image on said another display apparatus.

24. The non-transitory computer-readable storage medium having stored thereon the information processing program according to claim 22, wherein
the second virtual camera is set at a position of viewing the object from a bird's-eye view in the virtual world, and
an image obtained by viewing from a bird's-eye view the object placed in the virtual world is displayed as the second image on said another display apparatus.

25. The non-transitory computer-readable storage medium having stored thereon the information processing program according to claim 1, wherein
the portable display apparatus includes at least one of a gyro sensor and an acceleration sensor, and
on the basis of data output from the at least one of the gyro sensor and the acceleration sensor, it is determined whether or not the direction of the predetermined axis is included in the predetermined range.

26. An information processing apparatus configured to display an image on a portable display apparatus that outputs at least data based on an attitude and/or a motion of the portable display apparatus body, the information processing apparatus comprising at least one processor, the apparatus configured to:
determine, on the basis of the attitude and/or motion data output from the portable display apparatus, whether or not a direction of a predetermined axis set in the portable display apparatus is included in a predetermined range;
control, when the direction of the predetermined axis is included in the predetermined range, an action of an object placed in a virtual world in accordance with the direction of the predetermined axis;
control, when the direction of the predetermined axis is included in the predetermined range or present outside the predetermined range, an action of a first virtual camera, for generating an image of the virtual world, in accordance with the direction of the predetermined axis; and
display on the portable display apparatus a first image representing the virtual world viewed from the first virtual camera,
wherein a direction of the object corresponds to the attitude and/or motion of the portable display device until the predetermined axis is outside the predetermined range, where a direction of the virtual camera continues to correspond to the attitude and/or motion of the portable display device even when the predetermined axis is outside the predetermined range.

27. An information processing system including a plurality of apparatuses configured to communicate with each other, the information processing system configured to display an image on a portable display apparatus that outputs at least data based on an attitude and/or a motion of the portable display apparatus body, the information processing system comprising:
a processing system having at least one processor, the processing system configured to:
determine, on the basis of the attitude and/or motion data output from the portable display apparatus, whether or not a direction of a predetermined axis set in the portable display apparatus is included in a predetermined range,
control, when the direction of the predetermined axis is included in the predetermined range, an action of an object placed in a virtual world in accordance with the direction of the predetermined axis,
control, when the direction of the predetermined axis is included in the predetermined range or present outside the predetermined range, an action of a first virtual camera, for generating an image of the virtual world, in accordance with the direction of the predetermined axis, and
display on the portable display apparatus a first image representing the virtual world viewed from the first virtual camera,
wherein a direction of the object corresponds to the attitude and/or motion of the portable display device until the predetermined axis is outside the predetermined range, where a direction of the virtual camera continues to correspond to the attitude and/or motion of the portable display device even when the predetermined axis is outside the predetermined range.

28. An information processing method performed by a processor or a corporation of a plurality of processors included in an information processing system including at least one information processing apparatus configured to display an image on a portable display apparatus that outputs at least data based on an attitude and/or a motion of the portable display apparatus body, the information processing method comprising:
- determining, on the basis of the attitude and/or motion data output from the portable display apparatus, whether or not a direction of a predetermined axis set in the portable display apparatus is included in a predetermined range;
- controlling, when the direction of the predetermined axis is included in the predetermined range, an action of an object placed in a virtual world in accordance with the direction of the predetermined axis;
- controlling, when the direction of the predetermined axis is included in the predetermined range or present outside the predetermined range, an action of a first virtual camera, for generating an image of the virtual world, in accordance with the direction of the predetermined axis; and
- displaying on the portable display apparatus a first image representing the virtual world viewed from the first virtual camera,
- wherein a direction of the object corresponds to the attitude and/or motion of the portable display device until the predetermined axis is outside the predetermined range, where a direction of the virtual camera continues to correspond to the attitude and/or motion of the portable display device even when the predetermined axis is outside the predetermined range.

* * * * *